(12) United States Patent
Errico et al.

(10) Patent No.: US 8,214,741 B2
(45) Date of Patent: Jul. 3, 2012

(54) SYNCHRONIZATION OF VIDEO AND DATA

(75) Inventors: James Errico, Portland, OR (US);
Baoxin Li, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 2648 days.

(21) Appl. No.: 10/155,269

(22) Filed: May 22, 2002

(65) Prior Publication Data

US 2003/0182620 A1   Sep. 25, 2003

Related U.S. Application Data

(60) Provisional application No. 60/365,915, filed on Mar. 19, 2002.

(51) Int. Cl.
*G06F 3/048* (2006.01)
(52) U.S. Cl. ..................................................... 715/719
(58) Field of Classification Search ............... 715/500.1, 715/719, 720, 723, 201
See application file for complete search history.

(56) References Cited

U.S. PATENT DOCUMENTS

| | | | |
|---|---|---|---|
| 4,183,056 A | 1/1980 | Evans et al. | |
| 4,253,108 A | 2/1981 | Engel | |
| 4,298,884 A | 11/1981 | Reneau | |
| 4,321,635 A | 3/1982 | Tsuyuguchi | |
| 4,324,402 A | 4/1982 | Klose | |
| 4,520,404 A | 5/1985 | Von Kohorn | |
| 4,729,044 A | 3/1988 | Kiesel | |
| 4,937,685 A | 6/1990 | Barker et al. | |
| 5,012,334 A | 4/1991 | Etra | |
| 5,027,400 A | 6/1991 | Baji et al. | |
| 5,101,364 A | 3/1992 | Davenport et al. | |
| 5,109,482 A | 4/1992 | Bohrman | |
| 5,148,154 A | 9/1992 | MacKay et al. | |
| 5,200,825 A | 4/1993 | Perine | |
| 5,222,924 A | 6/1993 | Shin et al. | |
| 5,223,924 A | 6/1993 | Strubbe | |
| 5,241,671 A | 8/1993 | Reed et al. | |
| 5,270,922 A | 12/1993 | Higgins | |
| 5,288,069 A | 2/1994 | Matsumoto | |
| D348,251 S | 6/1994 | Hendricks | |
| 5,333,091 A | 7/1994 | Iggulden et al. | |
| 5,339,393 A | 8/1994 | Duffy et al. | |
| D354,059 S | 1/1995 | Hendricks | |
| 5,381,477 A | 1/1995 | Beyers, II et al. | |
| 5,404,316 A | 4/1995 | Klingler et al. | |

(Continued)

FOREIGN PATENT DOCUMENTS

EP     0 854 645     7/1998

(Continued)

OTHER PUBLICATIONS

Gong, Yihong, et al, "Video Summarization Using Singular Value Decomposition", Computer Vision and Pattern Recognition, 2000 Proceedings, vol. 2, Jun. 2000, pp. 1-7.*

(Continued)

*Primary Examiner* — Laurie Ries
(74) *Attorney, Agent, or Firm* — Chernoff Vilhauer McClung & Stenzel

(57) ABSTRACT

A system including a video stream and a data stream. The system synchronizes the data stream to different portions of the video stream.

6 Claims, 17 Drawing Sheets

U.S. PATENT DOCUMENTS

| | | |
|---|---|---|
| 5,410,344 A | 4/1995 | Graves et al. |
| 5,424,770 A | 6/1995 | Schmelzer et al. |
| 5,434,678 A | 7/1995 | Abecassis |
| 5,444,499 A | 8/1995 | Saitoh |
| 5,452,016 A | 9/1995 | Ohara et al. |
| 5,459,830 A | 10/1995 | Ohba et al. |
| 5,483,278 A | 1/1996 | Strubbe et al. |
| D368,263 S | 3/1996 | Hendricks |
| 5,521,841 A | 5/1996 | Arman et al. |
| 5,550,965 A | 8/1996 | Gabbe et al. |
| 5,559,549 A | 9/1996 | Hendricks et al. |
| 5,589,945 A | 12/1996 | Abecassis |
| 5,600,364 A | 2/1997 | Hendricks et al. |
| 5,600,573 A | 2/1997 | Hendricks et al. |
| 5,600,781 A | 2/1997 | Root et al. |
| 5,610,653 A | 3/1997 | Abecassis |
| 5,634,849 A | 6/1997 | Abecassis |
| 5,635,982 A | 6/1997 | Zhang et al. |
| D381,991 S | 8/1997 | Hendricks |
| 5,654,769 A | 8/1997 | Ohara et al. |
| 5,659,350 A | 8/1997 | Hendricks et al. |
| 5,664,046 A | 9/1997 | Abecassis |
| 5,664,227 A | 9/1997 | Mauldin et al. |
| 5,675,752 A | 10/1997 | Scott et al. |
| 5,682,195 A | 10/1997 | Hendricks et al. |
| 5,682,460 A | 10/1997 | Hyziak et al. |
| 5,684,918 A | 11/1997 | Abecassis |
| 5,694,163 A | 12/1997 | Harrison |
| 5,696,869 A | 12/1997 | Abecassis |
| 5,696,965 A | 12/1997 | Dedrick |
| 5,710,884 A | 1/1998 | Dedrick |
| 5,717,814 A | 2/1998 | Abecassis |
| 5,717,879 A | 2/1998 | Moran et al. |
| 5,717,923 A | 2/1998 | Dedrick |
| 5,724,472 A | 3/1998 | Abecassis |
| 5,727,129 A | 3/1998 | Barrett et al. |
| 5,732,216 A | 3/1998 | Logan et al. |
| 5,734,853 A | 3/1998 | Hendricks et al. |
| 5,751,953 A | 5/1998 | Shiels et al. |
| 5,758,257 A | 5/1998 | Herz et al. |
| 5,758,259 A | 5/1998 | Lawler |
| 5,761,881 A | 6/1998 | Wall |
| 5,764,916 A | 6/1998 | Busey et al. |
| 5,774,357 A | 6/1998 | Hoffberg et al. |
| 5,774,666 A * | 6/1998 | Portuesi ............... 725/110 |
| 5,778,108 A | 7/1998 | Coleman, Jr. |
| 5,781,188 A | 7/1998 | Amiot et al. |
| 5,794,210 A | 8/1998 | Goldhaber et al. |
| 5,797,001 A | 8/1998 | Augenbraun et al. |
| 5,798,785 A | 8/1998 | Hendricks et al. |
| 5,805,733 A | 9/1998 | Wang et al. |
| 5,809,426 A | 9/1998 | Radojeric et al. |
| 5,821,945 A | 10/1998 | Yeo et al. |
| 5,822,537 A | 10/1998 | Katseff et al. |
| 5,828,809 A | 10/1998 | Chang et al. |
| 5,828,839 A | 10/1998 | Moncreiff |
| 5,835,087 A | 11/1998 | Herz et al. |
| D402,310 S | 12/1998 | Hendricks |
| 5,848,396 A | 12/1998 | Gerace |
| 5,857,190 A | 1/1999 | Brown |
| 5,861,881 A | 1/1999 | Freeman et al. |
| 5,867,226 A | 2/1999 | Wehmeyer et al. |
| 5,867,386 A | 2/1999 | Hoffberg et al. |
| 5,875,107 A | 2/1999 | Nagai et al. |
| 5,875,108 A | 2/1999 | Hoffberg et al. |
| 5,877,821 A * | 3/1999 | Newlin et al. ............ 348/724 |
| 5,878,222 A | 3/1999 | Harrison |
| 5,892,536 A | 4/1999 | Logan et al. |
| 5,900,867 A | 5/1999 | Schindler et al. |
| 5,901,246 A | 5/1999 | Hoffberg et al. |
| 5,903,454 A | 5/1999 | Hoffberg et al. |
| 5,907,324 A | 5/1999 | Larson et al. |
| 5,913,013 A | 6/1999 | Abecassis |
| 5,913,030 A | 6/1999 | Lotspiech et al. |
| 5,920,300 A | 7/1999 | Yamazaki et al. |
| 5,920,360 A | 7/1999 | Coleman, Jr. |
| 5,920,477 A | 7/1999 | Hoffberg et al. |
| 5,923,365 A | 7/1999 | Tamir et al. |
| 5,926,624 A | 7/1999 | Katz et al. |
| 5,930,783 A | 7/1999 | Li et al. |
| 5,933,811 A | 8/1999 | Angles et al. |
| 5,945,988 A | 8/1999 | Williams et al. |
| 5,956,026 A | 9/1999 | Ratakonda |
| 5,956,037 A | 9/1999 | Osawa et al. |
| 5,958,006 A | 9/1999 | Eggleston et al. |
| 5,959,681 A | 9/1999 | Cho |
| 5,959,697 A | 9/1999 | Coleman, Jr. |
| 5,969,755 A | 10/1999 | Courtney |
| 5,973,683 A | 10/1999 | Cragun et al. |
| 5,977,964 A | 11/1999 | Williams et al. |
| 5,986,690 A | 11/1999 | Hendricks |
| 5,986,692 A | 11/1999 | Logan et al. |
| 5,987,211 A | 11/1999 | Abecassis |
| 5,990,927 A | 11/1999 | Hendricks et al. |
| 5,990,980 A | 11/1999 | Golin |
| 5,995,094 A | 11/1999 | Eggen et al. |
| 5,995,095 A | 11/1999 | Ratakonda |
| 6,002,833 A | 12/1999 | Abecassis |
| 6,005,565 A | 12/1999 | Legall et al. |
| 6,005,597 A | 12/1999 | Barrett et al. |
| 6,006,265 A | 12/1999 | Rangan et al. |
| 6,011,895 A | 1/2000 | Abecassis |
| 6,014,183 A | 1/2000 | Hoang |
| 6,020,883 A | 2/2000 | Herz et al. |
| 6,021,419 A | 2/2000 | Clarke et al. |
| 6,029,195 A | 2/2000 | Herz |
| 6,038,367 A | 3/2000 | Abecassis |
| 6,041,323 A | 3/2000 | Kubota |
| 6,049,821 A | 4/2000 | Theriault et al. |
| 6,052,554 A | 4/2000 | Hendricks et al. |
| 6,055,018 A | 4/2000 | Swan |
| 6,055,569 A | 4/2000 | O'Brien et al. |
| 6,060,167 A | 5/2000 | Morgan et al. |
| 6,064,385 A | 5/2000 | Sturgeon et al. |
| 6,064,449 A | 5/2000 | White et al. |
| 6,067,401 A | 5/2000 | Abecassis |
| 6,070,167 A | 5/2000 | Qian et al. |
| 6,072,934 A | 6/2000 | Abecassis |
| 6,076,166 A | 6/2000 | Moshfeghi et al. |
| 6,078,917 A | 6/2000 | Paulsen, Jr. et al. |
| 6,078,928 A | 6/2000 | Schnase et al. |
| 6,081,278 A | 6/2000 | Chen |
| 6,081,750 A | 6/2000 | Hoffberg et al. |
| 6,088,455 A | 7/2000 | Logan et al. |
| 6,088,722 A | 7/2000 | Herz et al. |
| 6,091,886 A | 7/2000 | Abecassis |
| RE36,801 E | 8/2000 | Logan et al. |
| 6,100,941 A | 8/2000 | Dimitrova et al. |
| 6,115,709 A | 9/2000 | Gilmour et al. |
| 6,122,657 A | 9/2000 | Hoffman, Jr. et al. |
| 6,128,624 A | 10/2000 | Papiemiak et al. |
| 6,133,909 A | 10/2000 | Schein et al. |
| 6,137,486 A | 10/2000 | Yoshida et al. |
| 6,141,041 A | 10/2000 | Carlbom et al. |
| 6,141,060 A | 10/2000 | Honey et al. |
| 6,144,375 A | 11/2000 | Jain et al. |
| 6,151,444 A | 11/2000 | Abecassis |
| D435,561 S | 12/2000 | Pettigrew et al. |
| 6,157,377 A | 12/2000 | Shah-Nazaroff et al. |
| 6,160,989 A | 12/2000 | Hendricks et al. |
| 6,161,142 A | 12/2000 | Wolfe et al. |
| 6,163,316 A | 12/2000 | Killian |
| 6,163,779 A | 12/2000 | Mantha et al. |
| 6,169,542 B1 | 1/2001 | Hooks et al. |
| 6,177,931 B1 | 1/2001 | Alexander et al. |
| 6,181,335 B1 | 1/2001 | Hendricks et al. |
| 6,185,625 B1 | 2/2001 | Tso et al. |
| 6,195,497 B1 | 2/2001 | Nagasaka et al. |
| 6,198,767 B1 | 3/2001 | Greenfield et al. |
| 6,199,076 B1 | 3/2001 | Logan et al. |
| 6,201,536 B1 | 3/2001 | Hendricks et al. |
| 6,208,805 B1 | 3/2001 | Abecassis |
| 6,212,527 B1 | 4/2001 | Gustman |
| 6,215,526 B1 | 4/2001 | Barton et al. |
| 6,216,129 B1 | 4/2001 | Eldering |
| 6,219,837 B1 | 4/2001 | Yeo et al. |
| 6,226,678 B1 | 5/2001 | Mattaway et al. |

| Patent No. | Date | Inventor |
|---|---|---|
| 6,230,172 B1 | 5/2001 | Purnaveja et al. |
| 6,230,501 B1 | 5/2001 | Bailey, Sr. et al. |
| 6,233,289 B1 | 5/2001 | Fredrickson |
| 6,233,389 B1 | 5/2001 | Barton et al. |
| 6,233,586 B1 | 5/2001 | Chang et al. |
| 6,233,590 B1 | 5/2001 | Shaw et al. |
| 6,236,395 B1 | 5/2001 | Sezan et al. |
| 6,240,406 B1 | 5/2001 | Tannen |
| 6,252,544 B1 | 6/2001 | Hoffberg |
| 6,253,203 B1 | 6/2001 | O'Flaherty et al. |
| 6,269,216 B1 | 7/2001 | Abecassis |
| 6,275,268 B1 | 8/2001 | Ellis et al. |
| 6,286,140 B1 | 9/2001 | Ivanyi |
| 6,286,141 B1 | 9/2001 | Browne et al. |
| 6,289,165 B1 | 9/2001 | Abecassis |
| 6,298,482 B1 | 10/2001 | Seidman et al. |
| 6,304,665 B1 | 10/2001 | Cavallaro et al. |
| 6,304,715 B1 | 10/2001 | Abecassis |
| 6,311,189 B1 | 10/2001 | deVries et al. |
| 6,317,718 B1 | 11/2001 | Fano |
| 6,317,881 B1 | 11/2001 | Shah-Nazaroff et al. |
| 6,320,624 B1 | 11/2001 | Ayer et al. |
| 6,324,338 B1 | 11/2001 | Wood et al. |
| 6,339,842 B1 | 1/2002 | Fernandez et al. |
| 6,342,904 B1 | 1/2002 | Vasudevan et al. |
| 6,353,444 B1 | 3/2002 | Katta et al. |
| 6,363,160 B1 | 3/2002 | Bradski et al. |
| 6,363,380 B1 | 3/2002 | Dimitrova |
| 6,370,504 B1 | 4/2002 | Zick et al. |
| 6,370,688 B1 | 4/2002 | Hejna, Jr. |
| 6,374,404 B1 | 4/2002 | Brotz et al. |
| 6,405,371 B1 | 6/2002 | Oosterhout et al. |
| 6,412,008 B1 | 6/2002 | Fields et al. |
| 6,418,168 B1 | 7/2002 | Narita |
| 6,421,680 B1 | 7/2002 | Kumhyr et al. |
| 6,425,133 B1 | 7/2002 | Leary |
| 6,426,761 B1 | 7/2002 | Kanevsky et al. |
| 6,426,974 B2 | 7/2002 | Takahashi et al. |
| 6,438,579 B1 | 8/2002 | Hosken |
| 6,439,572 B1 | 8/2002 | Bowen |
| 6,446,261 B1 | 9/2002 | Rosser |
| 6,470,378 B1 | 10/2002 | Tracton et al. |
| 6,480,667 B1 | 11/2002 | O'Connor |
| 6,487,390 B1 | 11/2002 | Virine et al. |
| 6,490,320 B1 | 12/2002 | Vetro et al. |
| 6,498,783 B1 | 12/2002 | Lin |
| 6,522,342 B1 | 2/2003 | Gagnon et al. |
| 6,530,082 B1 | 3/2003 | Del Sesto et al. |
| 6,535,639 B1 | 3/2003 | Uchihachi et al. |
| 6,542,546 B1 | 4/2003 | Vetro et al. |
| 6,543,053 B1 | 4/2003 | Li et al. |
| 6,546,555 B1 | 4/2003 | Hjelsvold et al. |
| 6,549,643 B1 | 4/2003 | Toklu et al. |
| 6,553,178 B2 | 4/2003 | Abecassis |
| 6,556,767 B2 | 4/2003 | Okayama et al. |
| 6,571,279 B1 | 5/2003 | Herz et al. |
| 6,578,075 B1 | 6/2003 | Nieminen et al. |
| 6,581,207 B1 | 6/2003 | Sumita et al. |
| 6,587,127 B1 | 7/2003 | Leeke et al. |
| 6,593,936 B1 | 7/2003 | Huang et al. |
| 6,594,699 B1 | 7/2003 | Sahai et al. |
| 6,597,859 B1 | 7/2003 | Leinhart et al. |
| 6,611,876 B1 | 8/2003 | Barrett et al. |
| 6,614,987 B1 | 9/2003 | Ismail et al. |
| 6,621,895 B1 | 9/2003 | Giese |
| 6,628,302 B2 | 9/2003 | White et al. |
| 6,637,032 B1 | 10/2003 | Feinleib |
| 6,650,705 B1 | 11/2003 | Vetro et al. |
| 6,658,095 B1 | 12/2003 | Yoakum et al. |
| 6,665,423 B1 | 12/2003 | Mehrotra et al. |
| 6,675,158 B1 | 1/2004 | Rising et al. |
| 6,678,635 B2 | 1/2004 | Tovinkere et al. |
| 6,678,659 B1 | 1/2004 | Van Kommer |
| 6,681,395 B1 | 1/2004 | Nishi |
| 6,691,126 B1 | 2/2004 | Syeda-Mahmood |
| 6,697,523 B1 * | 2/2004 | Divakaran et al. ............ 382/173 |
| 6,704,929 B1 | 3/2004 | Ozer et al. |
| 6,724,933 B1 | 4/2004 | Lin et al. |
| 6,741,655 B1 | 5/2004 | Chang et al. |
| 6,754,904 B1 | 6/2004 | Cooper et al. |
| 6,754,906 B1 | 6/2004 | Finseth et al. |
| 6,763,522 B1 | 7/2004 | Kondo et al. |
| 6,766,362 B1 | 7/2004 | Miyasaka et al. |
| 6,774,917 B1 | 8/2004 | Foote et al. |
| 6,792,047 B1 | 9/2004 | Bixby et al. |
| 6,810,200 B1 | 10/2004 | Aoyama et al. |
| 6,813,775 B1 | 11/2004 | Finseth et al. |
| 6,820,278 B1 | 11/2004 | Ellis |
| 8,829,781 | 12/2004 | Bhagavath at al. |
| 6,868,440 B1 | 3/2005 | Gupta et al. |
| 6,880,171 B1 | 4/2005 | Ahmad et al. |
| 6,898,762 B2 | 5/2005 | Ellis et al. |
| 6,909,743 B1 | 6/2005 | Ward et al. |
| 6,925,455 B2 * | 8/2005 | Gong et al. ............... 706/45 |
| 6,931,595 B2 | 8/2005 | Pan et al. |
| 6,934,964 B1 | 8/2005 | Schaffer et al. |
| 6,961,954 B1 | 11/2005 | Maybury et al. |
| 6,970,510 B1 | 11/2005 | Wee et al. |
| 6,971,105 B1 | 11/2005 | Weber et al. |
| 6,981,129 B1 | 12/2005 | Boggs et al. |
| 6,983,478 B1 | 1/2006 | Grauch et al. |
| 6,990,679 B2 | 1/2006 | Curreri |
| 6,993,245 B1 | 1/2006 | Harville |
| 7,003,792 B1 | 2/2006 | Yuen |
| 7,026,964 B2 | 4/2006 | Baldwin et al. |
| 7,027,516 B2 | 4/2006 | Anderson et al. |
| 7,046,851 B2 | 5/2006 | Keaton et al. |
| 7,055,168 B1 | 5/2006 | Errico et al. |
| 7,065,709 B2 | 6/2006 | Ellis et al. |
| 7,096,481 B1 | 8/2006 | Forecast et al. |
| 7,096,486 B1 | 8/2006 | Ukai et al. |
| 7,127,735 B1 | 10/2006 | Lee et al. |
| 7,130,866 B2 | 10/2006 | Schaffer |
| 7,136,710 B1 | 11/2006 | Hoffberg et al. |
| 7,146,626 B1 | 12/2006 | Arsenault et al. |
| 7,150,030 B1 | 12/2006 | Eldering et al. |
| 7,155,510 B1 | 12/2006 | Kaplan |
| 7,185,355 B1 | 2/2007 | Ellis et al. |
| 7,199,798 B1 | 4/2007 | Echigo et al. |
| 7,249,366 B1 | 7/2007 | Flavin |
| 7,260,304 B1 | 8/2007 | Harradine et al. |
| 7,260,564 B1 | 8/2007 | Lynn et al. |
| 7,296,285 B1 | 11/2007 | Jun et al. |
| 7,343,381 B2 | 3/2008 | Shin |
| 7,380,262 B2 | 5/2008 | Wang et al. |
| 7,454,775 B1 | 11/2008 | Schaffer et al. |
| 2001/0030664 A1 | 10/2001 | Shulman et al. |
| 2001/0043744 A1 | 11/2001 | Hieda |
| 2002/0010618 A1 | 1/2002 | Pellegrinelli et al. |
| 2002/0013943 A1 | 1/2002 | Haberman et al. |
| 2002/0018594 A1 | 2/2002 | Xu et al. |
| 2002/0026345 A1 | 2/2002 | Juels |
| 2002/0059594 A1 | 5/2002 | Rasmussen et al. |
| 2002/0069218 A1 | 6/2002 | Sull et al. |
| 2002/0079165 A1 | 6/2002 | Wolfe |
| 2002/0080162 A1 | 6/2002 | Pan et al. |
| 2002/0083473 A1 | 6/2002 | Agnihotri et al. |
| 2002/0087403 A1 | 7/2002 | Meyers et al. |
| 2002/0087967 A1 | 7/2002 | Conkwright et al. |
| 2002/0088009 A1 | 7/2002 | Dukiewicz et al. |
| 2002/0093591 A1 | 7/2002 | Gong et al. |
| 2002/0097165 A1 | 7/2002 | Hulme |
| 2002/0104087 A1 | 8/2002 | Schaffer et al. |
| 2002/0108112 A1 | 8/2002 | Wallace et al. |
| 2002/0120929 A1 | 8/2002 | Schwalb et al. |
| 2002/0131764 A1 | 9/2002 | David et al. |
| 2002/0133412 A1 | 9/2002 | Oliver et al. |
| 2002/0140719 A1 | 10/2002 | Amir et al. |
| 2002/0141619 A1 | 10/2002 | Standridge et al. |
| 2002/0156909 A1 * | 10/2002 | Harrington ............... 709/231 |
| 2002/0157121 A1 | 10/2002 | Kuhn |
| 2002/0178135 A1 | 11/2002 | Tanaka |
| 2002/0184220 A1 | 12/2002 | Teraguchi et al. |
| 2002/0190991 A1 * | 12/2002 | Efran et al. ............... 345/475 |
| 2002/0194589 A1 | 12/2002 | Cristofalo et al. |
| 2003/0001880 A1 | 1/2003 | Holtz et al. |
| 2003/0007555 A1 * | 1/2003 | Divakaran et al. ....... 375/240.01 |
| 2003/0026592 A1 | 2/2003 | Kawahara et al. |

| | | | |
|---|---|---|---|
| 2003/0033288 | A1 | 2/2003 | Shanahan et al. |
| 2003/0066068 | A1 | 4/2003 | Gutta et al. |
| 2003/0067554 | A1 | 4/2003 | Klarfeld et al. |
| 2003/0072440 | A1 | 4/2003 | Murray et al. |
| 2003/0081937 | A1 | 5/2003 | Li |
| 2003/0084448 | A1 | 5/2003 | Soundararajan |
| 2003/0084450 | A1 | 5/2003 | Thurston et al. |
| 2003/0088872 | A1 | 5/2003 | Maissel et al. |
| 2003/0093792 | A1 | 5/2003 | Labeeb et al. |
| 2003/0105682 | A1 | 6/2003 | Dicker et al. |
| 2003/0167467 | A1 | 9/2003 | Allen et al. |
| 2003/0172374 | A1 | 9/2003 | Vinson et al. |
| 2003/0177503 | A1 | 9/2003 | Sull et al. |
| 2003/0182663 | A1 | 9/2003 | Gudorf et al. |
| 2003/0187650 | A1 | 10/2003 | Moore et al. |
| 2003/0226152 | A1 | 12/2003 | Billmaier et al. |
| 2003/0229900 | A1 | 12/2003 | Reisman |
| 2004/0003041 | A1 | 1/2004 | Moore et al. |
| 2004/0015569 | A1 | 1/2004 | Lonnfors et al. |
| 2004/0017389 | A1 | 1/2004 | Pan et al. |
| 2004/0030750 | A1 | 2/2004 | Moore et al. |
| 2004/0032486 | A1 | 2/2004 | Shusman |
| 2004/0088289 | A1 | 5/2004 | Xu et al. |
| 2004/0098754 | A1 | 5/2004 | Vella et al. |
| 2004/0125124 | A1 | 7/2004 | Kim et al. |
| 2004/0125877 | A1 | 7/2004 | Chang et al. |
| 2004/0197088 | A1 | 10/2004 | Ferman et al. |
| 2004/0227768 | A1 | 11/2004 | Bates et al. |
| 2004/0231003 | A1 | 11/2004 | Cooper et al. |
| 2004/0250272 | A1 | 12/2004 | Durden et al. |
| 2005/0021784 | A1 | 1/2005 | Prehofer |
| 2005/0028194 | A1 | 2/2005 | Elenbaas et al. |
| 2005/0055713 | A1 | 3/2005 | Lee et al. |
| 2005/0102202 | A1 | 5/2005 | Linden et al. |
| 2005/0131906 | A1 | 6/2005 | Shin |
| 2005/0251827 | A1 | 11/2005 | Ellis et al. |
| 2005/0262542 | A1 | 11/2005 | DeWeese et al. |
| 2006/0129544 | A1 | 6/2006 | Yoon et al. |
| 2007/0011148 | A1 | 1/2007 | Burkey et al. |

FOREIGN PATENT DOCUMENTS

| | | |
|---|---|---|
| EP | 0 878964 | 11/1998 |
| EP | 1250807 | 10/2002 |
| GB | 2 325 537 | 11/1998 |
| JP | 08125957 | 5/1996 |
| JP | 09322154 | 12/1997 |
| JP | 2000-229577 | 8/2000 |
| JP | 2001-036861 | 2/2001 |
| JP | 2001-085717 | 3/2001 |
| JP | 2001-206550 | 7/2001 |
| JP | 2002-503896 | 2/2002 |
| WO | WO 94/14284 | 6/1994 |
| WO | WO 98/56188 | 12/1998 |
| WO | WO 99/01984 | 1/1999 |
| WO | WO 99/04143 | 1/1999 |
| WO | WO 99/12194 | 3/1999 |
| WO | WO 99/65237 | 12/1999 |
| WO | WO 01/50753 | 7/2001 |

OTHER PUBLICATIONS

Gong, Yihong, et al, "Video Summarization With Minimal Visual COntent Redundancies", IEEE, 2001, pp. 362-365.*
Li, Francis C., et al, "Browsing Digital Video", The Future Is Here, CHI Letters, vol. 2, Issue 1, Apr. 2000, pp. 169-176.*
Uchihashi, Shingo, et al, "Video Manga: Generating Semantically Meaningful Video Summaries", Proceedings of the Seventh ACM International Conference on Multimedia (Part 1), Oct. 1999, pp. 383-392.*
"User Preference Description for MPEG-7;" ISO/IEC JTC1/SC29/WG11, MPEG 99/MXXXX, Maui, Hawaii, Dec. 1999, pp. 1-18.
"A Proposal for User Preference Descriptions in MPEG-7;" ISO/IEC JTC1SC29/WG11 M5222, MPEG 99, Oct. 4, 1999, pp. 1-6.
Michael G. Christel, Alexander G. Hauptmann, Adrienne S. Warmack, Scott A. Crosby, "Adjustable Filmstrips and Skims as Abstractions for a Digital Video Library," Computer Science Department, Carnegie Mellon University, Pittsburgh, PA 15213 USA.
Peng Xu, et al., "Algorithms and System for High-Level Structure Analysis and Event Detection in Soccer Video," Columbia University, ADVENT—Technical Report #111, Jun. 2001.
Keith Millar and David White, "A Schema for TV-Anytime: Segmentation Metadata AN195," NDS Contribution from MyTV, NDS Limited 2000, 27 pages.
Keith Millar et al., "A Schema for TV-Anytime Segmentation Metadata AN195rl myTV project," NDS Systems Division, NDS Limited 2000, 28 pages.
S.E. Levinson, L. R. Rabiner, and M. M. Sondhi, "An Introduction to the Application of the Theory of Probabilistic Functions of a Markov Process to Automatic Speech Recognition," Copyright 1983 American Telephone and Telegraph company, The Bell system Technical Journal, vol. 62, No. 4, Apr. 1983, pp. 1035-1074.
Dennis Yow, et al., "Analysis and Presentation of Soccer Highlights from Digital Video," To appear in the Proceedings, Second Asian Conference on Computer Vision (ACCV '95).
Drew D. Saur, et al. "Automated Analysis and Annotation of Basketball Video," SPIE vol. 3022, pp. 176-187, 1997.
Hao Pan, et al., "Automatic Detection of Replay Segments in Broadcast Sports Programs by Detection of Logos in Scene Transitions," 2002 IEEE, pp. IV-3385-IV-3388.
Yihong Gong, et al., "Automatic Parsing of TV soccer Programs," 1995 IEEE, pp. 167-174.
Jonathan D. Courtney, "Automatic Video Indexing via Object Motion Analysis," Pattern Recognition, vol. 30, No. 4, pp. 607-625, 1997.
Yong Rui, et al. "Automatically Extracting Highlights for TV Baseball Programs," ACM Multimedia 2000 Los Angeles, CA, USA, pp. 105-115.
Nuno Vasconcelos and Andrew Lippman, "Bayesian Modeling of Video Editing and Structure: Semantic Features for Video Summarization and Browsing," 1998 IEEE, pp. 153-157.
Padhraic Smyth,."Belief Networks, Hidden Markov Models, and Markov Random Fields: a Unifying View," To appear in Pattern Recognition Letters, 1998, Information and Computer Science Department, University of California, Irvine, CA 92697-3425, Mar. 20, 1998.
Franklin Reynolds, et al. "Composite Capability/Preference Profiles (CC/PP): A user side framework for content negotiation," W3C Note Jul. 27, 1999, http://www.w3.org/1999/07/NOTE-CCPP-19990727/, 15 pages.
T. Lambrou, et al., "Classification of Audio Signals Using Statistical Features on Time and Wavelet Transform Domains," 1998 IEEE, pp. 3621-3624.
Joshua Alspector,et al., "Comparing Feature-based and Clique-based User Models for Movie Selection," Digital Libraries 98, Pittsburgh, PA, Copyright ACM 1998, pp. 11-18.
Rainer Lienhart, "Comparison of Automatic Shot Boundary Detection Algorithms," Part of the IS&T/SPIE conference on Storage and Retrieval for Image and Video Databases VII, San Jose, CA, Jan. 1999, SPIE vol. 3656, pp. 290-301.
John Canny, "A Computational Approach to Edge Detection" IEEE Transactions on Pattern Analysis and Machine Intelligence, vol. PAMI-8, No. 6, Nov. 1986, IEEE 1986, pp. 679-698.
Richard Qian et al., "A Computational Approach to Semantic Event Detection," 1999 IEEE, pp. 200-206.
F. Arman, et al., "Content-based Browsing of Video Sequences," to appear in the Proceedings of ACM International Conference on Multimedia '94, Oct. 15-20, San Francisco, CA, 7 pages.
Hongjiang Zhang, et al. "Content-Based Video Browsing Tools," SPIE vol. 2417, 1995, pp. 389-398.
Stephen W. Smoliar, et al. "Content-Based Video Indexing and Retrieval," 1994 IEEE, pp. 62-72.
Stefan Eickeler, et al., "Content-based Video Indexing of TV Broadcast News Using Hidden Markov Models," Proceedings of IEEE International Conference on Acoustics, Speech, and Signal Processing, Phoenix, AZ, 1999, 4 pages.
Kathy Bohrer and Bobby Holland, editors. "Customer Profile Exchange (CPExchange) Specification," Oct. 20, 2000, Version 1.0, International digital Enterprise Alliance, Inc. (IDEAlliance), pp. 1-127.
Jane Hunter (DSTC Pty Ltd), Editor, "DDL Working Draft 3.0," ISO/IEC JTC1/SC29/WG11 N3391, MPEG 00/ May 2000 (Geneva), 23 pages.

Vikrant Kobla, et al. "Detection of Slow-Motion Replay Sequences for Identifying Sports Videos," Laboratory for Language and Media Processing, University of Maryland, College Park, MD 20742-3275. USA, 6 pages.

Richard J. Qian, et al. "Description Schemes for Consumer Video Applications," Proposal ID 429, ISO/IEC JTC1/SC29/WG11—MPEG-7 Proposal, Feb. 1999.

Zhu Liu and Qian Huang, "Detecting News Reporting Using Audio/Visual Information," 1999 IEEE, pp. 324-328.

Y Kawai. "Detection of Replay Scenes in Broadcasted Sports Video by focusing on digital Video Effects," IEICE (D-II), vol. J84-D-II, No. 2, pp. 432-435, Feb. 2001, (In Japanese), pp. 432-437.

Vikrant Kobla, et al., "Detection of Slow-Motion Replay Sequences for Identifying Sports Videos," Laboratory for Language and Media Processing, University of Maryland, College Park, MD 20742-3275, USA, pp. 135-140.

H. Pan, et al. "Detection of Slow-Motion Replay Segments in sports Video for Highlights Generation," Proceedings of IEEE International Conference on Acoustics, Speech, and signal Processing, Salt Lake City, UT, 2001, 4 pages.

Alan E Bell, "The dynamic digital disk," IEEE Spectrum, Oct. 1999, pp. 28-35.

Baoxin Li and M. Ibrahim Sezan, "Event Detection and Summarization in Sports Video," Sharp Laboratories of America, 5750 NW Pacific Rim Blvd., Camas, WA 98607, USA, 5 pages.

Minerva Yeung, "Extracting Story Units from Long Programs for Video Browsing and Navigation," Proceedings of Multimedia 1996, 1998 IEEE, pp. 296-304.

Boon-Lock Yeo et al., "On the Extraction of DC Sequence from MPEG Compressed Video," 1995 IEEE, pp. 260-263.

FAP Specifications, MPEG-4 Compliant Facial Animation, http://www.dsp.dist.unige.it/~pok/RESEARCH/MPEG/fapsepc.htm 4 pages.

Frank R. Kschischang, et al., "Factor Graphs and the Sum-Product Algorithm," IEEE Transactions on Information Theory, vol. 47, No. 2, Feb. 2001, pp. 498-519.

John S. Boreczky, et al. "A Hidden Markov Model Framework for Video Segmentation Using Audio and Image Features," Proceedings of IEEE International Conference on Acoustics, Speech, and Signal Processing, Seattle, WA, 1998, 4 pages.

Wayne Wolf, "Hidden Markov Model Parsing of Video Programs," Proceedings of the 1997 IEEE International Conference on Acoustics, Speech, and Signal Processing (ICASSP '97), pp. 2609-2611.

Bilge Gunsel, et al., "Hierarchical Temporal video Segmentation and content Characterization," Dept. of Electrical Engineering and Center for Electronic Imaging Systems, University of Rochester, Rochester, NY 14627, SPIE vol. 3229, 1997.

M. R. Naphade, et al. "A High-Performance Shot Boundary Detection Algorithm Using Multiple Cues," Proceedings of IEEE International Conference on Image Processing. Chicago, IL, 1998, pp. 884-887.

Josh Bernoff, "How Cable TV Can Beat Satellite," WholeView TechStrategy Rsearch, Apr. 2002 Forrester Research, Inc., 400 Technology Square, Cambridge, MA 02139 USA.

Vikrant Kobla, et al., "Identifying sports videos using replay, text, and camera motion features," Laboratory for Language and Media Processing, University of Maryland, College Park, MD 20742-3275, USA, Date Unknown.

B. B. Chaudhuri, et al., "Improved fractal geometry based texture segmentation technique," IEE Proceedings-E, vol. 140, No. 5, Sep. 1993, pp. 233-241.

Toshio Kawashima, et al., "Indexing of Baseball Telecast for Content-based Video Retrieval," Dept. of Information engineering, Hokkaido University, Kita-13, Nishi-8, Sapporo, 060-8628, Japan, 1998 IEEE, pp. 871-874.

Nathaniel J. Thurston, et al. "Intelligent Audience guidance: The New Paradigm in Television Navigation," Predictive Networks, Inc., Feb. 21, 2002, 9 pages.

Dulce Ponceleon, et al. "Key to Effective Video Retrieval: Effective Cataloging and Browsing" ACM Multimedia '98, Bristol, UK, 1998, pp. 99-107.

Henry Lieberman, et al. "Let's Browse: A collaborative Web Browsing Agent," Massachusetts Institute of Technology, 20 Ames Street #E15-305, Cambridge, MA 02139, USA, Copyright ACM 1999, pp. 65-68.

Noboru Babaguchi, et al., "Linking Live and Replay Scenes in Broadcasted Sports Video," ACM Multimedia Workshop, Marina Del Rey, CA, USA, Copyright ACM 2000, pp. 205-208.

Giridharan Iyengar, et al., "Models for automatic dassification of video sequences," SPIE vol. 3312, 1997, pp. 216-227.

Nevenka Dimitrova, et al., "Motion Recovery for Video Content Classification," ACM Transactions on Information Systems, vol. 13, No. 4, Oct. 1995, pp. 408-439.

DDL Group, "MPEG-7 Description Definition Language Document V 2," ISO/IEC JTC1/SC29/WG11/N2997, Oct. 1999/Melbourne, 56 pages.

Description Scheme Group, "MPEG-7 Description Schemes (V0.5)," ISO/IEC JTC1/SC29/WG11 N2844, MPEG 99, Jul. 1999, Vancouver, pp. 1-59.

Description Scheme Group, "MPEG-7 Generic AV Description Schemes (V0.7)," MPEG 99, Oct. 1999, Melbourne.

AHG on MPEG7 Media/Meta DSs and Harmonization with other SCHEMES, "MPEG-7 Media/Meta DSs upgrade (V0.2)," ISO/IEC JTC1/SC29/WG11 MXXXX, MPEG 99 Oct. 1999, Melbourne, pp. 1-17.

Peter Van Beek, et al, Editors, "MPEG-7 Multimedia Description Schemes WD (Version 3.0)," ISO/IEC JTC1/SC 29/WG 11/N3411, May 2000, Geneva.

Peter Van Beek, et al., Editors, "MPEG-7 Multimedia Description Schemes XM (Version 3.0)," ISO/IEC JTC1/SC29/WG 11/N3410, May 2000, Geneva.

P. Van Beek et al., "MPEG-7 Requirements for Description of Users," ISO/IEC JTC1/SC29/WG11, MPEG99/4601, Mar. 1999, 5 pages.

F. Pereira, Editor, "MPEG-7 Requirements Document V.9," ISO/IEC JTC1/SC29/WG11/N2859, Jul. 1999/Vancouver (Canada).

Sylvie Jeannin. et al., Editors. "MPEG-7 Visual part of eXperimentation Model Version 6.0," ISO/IEC JTC1/SC29/WG11/N3398, Geneva, Jun. 2000.

Kaushal Kurapati, et al., "A Multi-Agent TV Recommender," Adaptive Systems Department, Philips Research Briarcliff, 345 Scarborough Rd., Briarcliff Manor, NY 10510, USA, Date Unknown.

Jane Hunter (DSTC Pty Ltd.). "Text of ISO/IEC CD 15938-2 Information technology—Multimedia content description interface—Part 2 Description definition language," ISO/IEC JTC1/SC29/WG11 N3702, MPEG 00/3702, Oct. 2000 (La Baule).

"Information Technology—Multimedia Content Description Interface—Part 5: Multimedia Description Schemes," ISO/IEC JTC 1/SC 29 N 3705, Nov. 17, 2000, ISO/IEC CD 15938-5.

Peter Van Beek, et al., "Text of 15938-5 FCD Information Technology—Multimedia Content Description Interface—Part 5 Multimedia Description Schemes," ISO/IEC JTC 1/SC 29 N3966 Mar. 12, 2001, 500 pages.

Yao Wang, et al., "Multimedia Content Analysis," IEEE Signal Processing Magazine. Nov. 2000, pp. 12-35.

Mark T. Maybury, et al., "Multimedia Summaries of Broadcast News," Advanced Information Systems Center, The MITRE Corporation, 202 Burlington Road, Bedford, MA 01730, USA, pp. 442-449.

Shinichi Satoh, et al., "Name-It: Association of Face and Name in Video," School of Computer Science, Carnegie Mellon University, Pittsburgh, PA 15213, Dec. 20, 1996, 19 pages.

Stuart J. Golin, "New metric to detect wipes and other gradual transitions in . . ." Part of the IS&T/SPIE Conference on Visual communications and Image Processing '99, San Jose, CA Jan. 1999, SPIE vol. 3653, pp. 1464-1474.

Ullas Gargi, et al., "Transactions Letters: Performance Characterization of Video-Shot-Change Detection Methods," IEEE Transactions on Circuits and Systems for Video Technology, vol. 10, No. 1, Feb. 2000. 13 pages.

Michael Ehrmantraut, et al., "The Personal Electronic Program guide—Towards the Pre-selection of Individual TV Programs," 1996 ACM, pp. 243-250.

Marc Light, et al., "Personalized Multimedia Information Access," Communications of the ACM, vol. 45, No. 5, May 2002, pp. 54-59.

Kyoungro Yoon, et al., "Proposal of Usage History DS," ISO/IEC JTC1/SC29/WG11, MPEG00/M6259, Jul. 2000, Beijing.

Michael T. Chan, et al., "Real-Time Lip Tracking and Bimodal Continuous Speech Recognition," Rockwell Science Center, 1049 Camino Dos Rios, Thousand Oaks, CA 91360, 6 pages, date unknown.

Boon-Lock Yeo, et al., "Retrieving and Visualizing Video," Communications of the ACM, Dec. 1997, vol. 40, No. 12, pp. 43-52.

H.B. Lu, et al., "Robust Gradual Scene Change Detection," Proceedings of IEEE International Conference on Image Processing, Kobe, Japan, 1999, 5 pages.

Richard J. Qian, et al., "A Robust Real-Time Face Tracking Algorithm," Sharp Laboratories of America, 5750 N.W. Pacific Rim Blvd., Camas, WA 98607, 1998 IEEE, pp. 131-135.

Lexing Lie, "Segmentation and Event Detection in Soccer Audio," EE 6820 Project, Soccer Audio, May 15, 2001, 9 pages.

Riccardo Leonardi, et al., "Content-Based Multimedia Indexing and Retrieval: Semantic Indexing of Multimedia Documents," IEEE 2002, pp. 44-51.

R. W. Picard, "A Society of Models for Video and Image Libraries," IBM Systems Journal, vol. 35, Nos. 3 & 4, 1996, pp. 292-312.

Alberto Del Bimbo, et al., "A Spatial Logic for Symbolic Description of Image Contents," Journal of Visual Languages and Computing (1994) 5, pp. 267-286.

Jin-Soo Lee, et al. Editors, "Specification of The UsageHistory DS," ISO/IEC JTC 1/SC 29/WG 11/M5748, Mar. 2000, Noordwijkerhout, pp. 1-6.

Lexing Xie, et al., "Structure Analysis of Soccer Video with Hidden Markov Models," Department of Electrical Engineering, Columbia University, New York, NY, 4 pages.

Selim Aksoy, et al., "Textural Features for Image Database Retrieval" Intelligent Systems Laboratory, Department of Electrical Engineering, University of Washington, Seattle, WA 98195-2500, 5 pages.

B. S. Manjunath, et al., "Texture Features for Browsing and Retrieval of Image Data," IEEE Transactions on Pattern Analysis and Machine Intelligence, vol. 18, No. 8, Aug. 1996, pp. 837-842.

Richard W. Conners, et al., "A Theoretical comparison of Texture Algorithms," IEEE Transactions on Pattern Analysis and Machine Intelligence, vol. PAMI-2, No. 3, May 1980, pp. 204-222.

Noboru Babaguchi, "Towards Abstracting Sports Video by Highlights," ISIR, Osaka University, Ibaraki, Osaka 567-0047, Japan, 2000 IEEE, pp. 1519-1522.

Stephen S. Intille, "Tracking Using a Local Closed-World Assumption: Tracking in the Football Domain," MIT Media Lab Perceptual computing group Technical Report No. 296, pp. 1-62.

Lawrence R. Rabiner, "A Tutorial on Hidden Markov Models and Selected Applications in Speech Recognition," Proceedings of the IEEE, vol. 77, No. 2, Feb. 1989, pp. 257-288.

Jim Stroud, "TV Personalization: A Key Component of Interactive TV," The Carmel Group, 2001, 9 pages.

Ted Lewis, "UbiNet: The Ubiquitous Internet Will Be Wireless,"DaimlerChrysler Research & Technology North America, 3 pages, date unknown.

Richard O. Duda et al., "Use of the Hough Transformation to Detect Lines and Curves in Pictures," Communications of the ACM, Jan. 1972, vol. 15, No. 1, pp. 11-15.

"User Preference Descriptions for MPEG-7," ISO/IEC JTC1/SC29/WG11, MPEG 99/MXXXX, Maui, Hawaii, Dec. 1999, pp. 1-18.

Rainer Lienhart, et al., "Video Abstracting," Communications of the ACM, Dec. 1997/ vol. 40, No. 12, pp. 55-62.

Michael A. Smith, et al., "Video Skimming for Quick Browsing based on Audio and Image Characterization," School of Computer Science, Carnegie Mellon University, Pittsburgh, PA 15213, Jul. 30, 1995, 24 pages.

Daniel Dementhon, et al., "Video summarization by Curve Simplification," Language and Media Processing (LAMP), University of Maryland, College Park, MD 20742-3275, 1998 ACM, pp. 211-218.

Chung-Lin Huang, et al., "Video summarization using Hidden Markov Model," Electrical Engineering Department, National Tsing-Hua University, Hsin-Chu, Taiwan, ROC, 2001 IEEE, pp. 473-477.

Ken Masumitsu, et al., "Video Summarization Using Reinforcement Learning in Eigenspace," IBM Research, Tokyo Research Laboratory, 1623-14; Shimotsuruma, Yamato-shi, Kanagawa, Japan, 4 pages.

Minerva M. Yeung, et al., "Video visualization for Compact Presentation and Fast Browsing of Pictorial Content," IEEE Transactions on circuits and Systems for Video Technology, vol. 7, No. 5, Oct. 1997, pp. 771-785.

Stephen S. Intille, et al., "Visual Tracking Using closed-Worlds,", MIT Media Laboratory Perceptual computing Section Technical Report No. 294, Nov. 1994, pp. 1-18.

Leszek Cieplinski, et al. "Visual Working Draft 3.0," ISO/IEC JTC1/SC29/WG11/N3399, Jun. 2000 (Geneva), 92 pages.

Sunghoon Choi, et al., "Where are the ball and players?: Soccer Game Analysis with Color-based Tracking and Image Mosaick," Dept. of EE, Pohang University of Science and Technology, San 31 Hyoja Dong, Pohang, 790-784, Republic of Korea, pp. 1-15.

http://web.archive.org/web/20001017172449/http://www.pvi-inc.com/.

David Beech, et al., editors, "XML Schema Part 1: Structures," http://www.w3.org/1999/05/06-xmlscheme-1/, W3C Working Draft, May 6, 1999, 67 pages.

Paul V. Birch, et al., editors, "SML Schema Part 2: Datatypes, World Wide Web Consortium Working Draft," May 6, 1999, http://www.w3.org/1999/05/06-xmlschema-2/, 37 pages.

Kimber, Don, et al., "FlyAbout: Spatially Indexed Panoramic Video", Multimedia '01: Proceedings of the Ninth ACM International Conference on Multimedia, Oct. 2001, pp. 339-347.

Miller, et al., "News On-Demand for Multimedia Networks", Multimedia '93, Proceedings of the first ACM International Conference on Multimedia, (Sep. 1993), pp. 1-11.

Yuichi Yagawa et al., "TV Program Planning Agent using Analysis Method of User's Taste", Technical report of IEICE, vol. 98, No. 437, AI98-54-61, Dec. 1, 1998.

* cited by examiner

| Code | Description | PitchFld | PitchStp |
|---|---|---|---|
| 1B | Single | ✓ | |
| 2B | Double | ✓ | |
| 3B | Triple | ✓ | |
| B | Ball | | ✓ |
| B1B | Bunt Single | ✓ | |
| B2B | Bunt Double | ✓ | |
| B3B | Bunt Triple | ✓ | |
| BA | Balk ball | | ✓ |
| BER | Batter reached on Error (batter to first) | ✓ | |
| BES | Batter reached on Error (batter credited with sacrifice) | ✓ | |
| BEF | Batter reached on Error (batter credited with sacrifice fly) | ✓ | |
| BF | Bunted Foul | ✓ | |
| BFC | Batter's Fielder's Choice (runners safe) | ✓ | |
| BFO | Batter's Fielder's Choice (runner Out) | ✓ | |
| BFS | Batter's Felder's Choice (batter Safe and credited with sacrifice) | ✓ | |
| BGB | Bunt Ground out | ✓ | |
| BI | Batter's Interference (batter out) | | |
| BPU | Bunt Pop out | ✓ | |
| CI | Catcher's Interference (batter to first, error on catcher) | | ✓ |
| F | Foul ball | ✓ | |
| FLY | Fly Out | ✓ | |
| FOU | Foul Out | ✓ | |
| GRO | Ground Out | ✓ | |
| HBB | Hit by Batted Ball (batter to first) | ✓ | |
| HBP | Hit By Pitch | | ✓ |
| HBO | Hit By Own batted ball (batter out) | ✓ | |
| HR | Home Run | ✓ | |
| I | Intentional ball | | ✓ |
| IHR | Inside the park Home Run | ✓ | |
| ILL | Illegally batted ball (batter out) | ✓ | |
| KWP | Strikeout batter safe, Wild Pitch | | ✓ |
| KPB | Strikeout batter safe, Passed Ball | | ✓ |
| KER | Strikeout batter safe, Error | | ✓ |
| KFC | Strikeout batter safe, Fielder's Choice | | ✓ |
| LIN | Line Out | ✓ | |
| POP | Pop out | ✓ | |
| SAC | Sacrifice | ✓ | |
| SF | Sacrifice Fly | ✓ | |
| SL | Strike Looking | | ✓ |
| SS | Strike Swinging | | ✓ |

FIG. 13A

| Code | Description | Base-Steal |
|---|---|---|
| ADF | Advancing on Force | |
| ADP | Advancing on Play | |
| BAR | Balk | |
| BFR | Batter Fielder's choice Runner movement | |
| BI | Batter's Interference | |
| CS | Caught Stealing | ✓ |
| HBR | Hit by Batted Ball Runner movement | |
| ER | Error | |
| FC | Fielder's Choice | |
| IN | Fielder's Indifference | |
| OB | Obstruction | |
| PB | Passed Ball | |
| PO | Pick Off | |
| RFC | Runner's Fielder's Choice | |
| RI | Runner Interference | |
| SB | Stolen Base | ✓ |
| TH | Throw | |
| WP | Wild Pitch | |

FIG. 13B

| NYY 3 | SEA 2 | ▲ 5TH | 0 OUT | 1-2 | FOX |
BASEBALL
FIG. 14
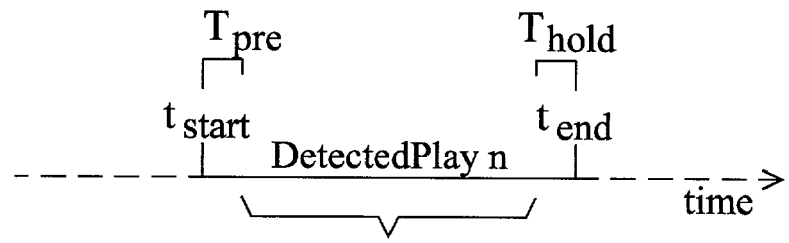
FOOTBALL
FIG. 15
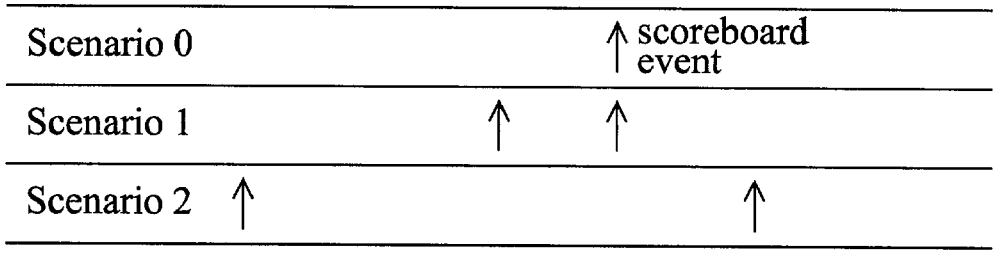
FIG. 16

Table 1  Arc Transition Matrix

| 2, ... | 0.0 | $0.1^n$ | 0.0 |
|---|---|---|---|
| 1 | 0.01 | 1.0 | $0.1^n$ |
| 0 | 0.0 | 0.5 | 0.0 |
|   | 0 | 1 | 2, ... |

| | H | B | S | I |
|---|---|---|---|---|
| I | 0.2 | 0.2 | 0.2 | 1.0 |
| S | 0.2 | 0.2 | 1.0 | 0.4 |
| B | 0.2 | 1.0 | 0.4 | 0.4 |
| H | 1.0 | 0.4 | 0.4 | 0.4 |

| NumTransArc: $n_a$ |
|---|
| $x_0, y_0$ |
| ... |
| $x_{n-1}, y_{n-1}$ |

FIG. 21

| NumTickerSyncType: $n_x$ |
|---|
| $syncLabel_0$ |
| ... |
| $syncLabel_{n-1}$ |

FIG. 22

| NumPlaySyncType: $n_y$ |
|---|
| $syncLabel_0$ |
| ... |
| $syncLabel_{n-1}$ |

FIG. 23

| NumTrans: $n_t$ | |
|---|---|
| $p_0$ | $TransDesc_0$ |
| ... | ... |
| $p_{n-1}$ | $TransDesc_{n-1}$ |

FIG. 24

| NumScoreBoardTrans: $n_s$ | | |
|---|---|---|
| $d_0$ | $p_0$ | $TransDesc_0$ |
| ... | ... | ... |
| $d_{n-1}$ | $p_{n-1}$ | $TransDesc_{n-1}$ |

FIG. 25

SYNCHRONIZATION OF VIDEO AND DATA

The application claims the benefit of provisional application Ser. No. 60/365,915 filed Mar. 19, 2002 entitled METHOD FOR SYNCHRONIZING VIDEO STREAMS AND ASSOCIATED VIDEO SUMMARIES WITH INDEPENDENTLY GENERATED METADATA ANNOTATIONS.

BACKGROUND OF THE INVENTION

The present invention relates to synchronization of video and data.

The amount of video content is expanding at an ever increasing rate, some of which includes sporting events. Simultaneously, the available time for viewers to consume or otherwise view all of the desirable video content is decreasing. With the increased amount of video content coupled with the decreasing time available to view the video content, it becomes increasingly problematic for viewers to view all of the potentially desirable content in its entirety. Accordingly, viewers are increasingly selective regarding the video content that they select to view. To accommodate viewer demands, techniques have been developed to provide a summarization of the video representative in some manner of the entire video. Video summarization likewise facilitates additional features including browsing, filtering, indexing, retrieval, etc. The typical purpose for creating a video summarization is to obtain a compact representation of the original video for subsequent viewing.

There are two major approaches to video summarization. The first approach for video summarization is key frame detection. Key frame detection includes mechanisms that process low level characteristics of the video, such as its color distribution, to determine those particular isolated frames that are most representative of particular portions of the video. For example, a key frame summarization of a video may contain only a few isolated key frames which potentially highlight the most important events in the video. Thus some limited information about the video can be inferred from the selection of key frames.

The second approach for video summarization is directed at detecting events that are important for the particular video content. Such techniques normally include a definition and model of anticipated events of particular importance for a particular type of content. The video summarization may consist of many video segments, each of which is a continuous portion in the original video, allowing some detailed information from the video to be viewed by the user in a time effective manner. Such techniques are especially suitable for the efficient consumption of the content of a video by browsing only its summary. Such approaches facilitate what is sometimes referred to as "semantic summaries".

BRIEF DESCRIPTION OF THE DRAWINGS

FIGS. 13A and 13B illustrates SportsTicker data feeds.
FIG. 14 illustrates exemplary baseball scoreboard.
FIG. 15 illustrates exemplary football scoreboard.
FIG. 16 illustrates a bounding of the scoreboard state for an individual detected play.
FIG. 21 illustrates valid transition arcs.
FIG. 22 illustrates sync types for the X axis.
FIG. 23 illustrates sync types for the Y axis.
FIG. 24 illustrates transition probabilities for all combination of a given sync types for X and Y.
FIG. 25 illustrates a scoreboard transition matrix.

DETAILED DESCRIPTION OF THE PREFERRED EMBODIMENT

Sumo Wrestling

Figure 1:
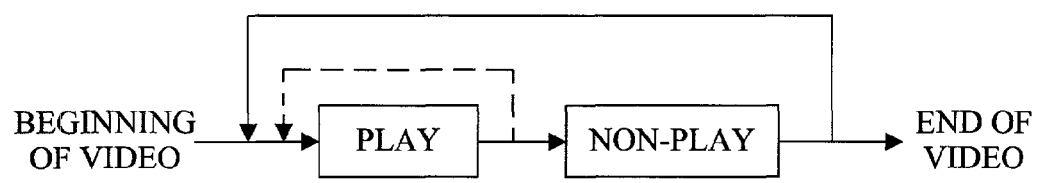
FIG. 1 is an exemplary flowchart for play and non-play detection.

Sumo, the national sport of Japan, is tremendously popular in eastern Asia and is growing in popularity elsewhere in the world. Sumo is a sport comprising bouts in which two contestants meet in a circular ring 4.55 meters in diameter. The rules of Sumo are uncomplicated. After the contestants and a referee have entered the circular ring, the bout begins with an initial charge—called a "tachiai"—where each contestant rushes towards, then collides with, the other. The bout will end when one of the contestant loses by either stepping outside the circular ring or touching the ground with any part of the contestant's body other than the soles of the feet. Aside from a limited number of illegal moves, such as gouging the opponent's eyes, striking with a closed fist, or intentionally pulling at the opponent's hair, there are no rules that govern a sumo bout.

Sumo participants may compete against each another in one of a number of tournaments. Japan sponsors six sanctioned Grand Sumo tournaments, held in odd-numbered months throughout the year, in which competitive sumo contestants face one another with the opportunity for advancement in rank. Sumo contestants are ranked under a strict meritocracy; winning bouts in these sanctioned tournaments improves a competitor's rank while losing bouts diminishes that rank. Aside from the six sanctioned tournaments, a number of exhibition tournaments—called Jungyo—are scheduled throughout the year.

Though a sumo tournament will typically take place over several weeks with bouts scheduled throughout each day, most bouts of interest, i.e. those involving higher ranked contestants, are scheduled to begin late afternoon when live television broadcasts of the tournament occur. These portions of the sumo tournaments usually last 2-3 hours each day and are often video recorded for later distribution or for re-broadcast.

Though such a video of a sumo tournament might typically last about 2-3 hours, only about ten minutes turns out to include time during which two players are in a bout. An individual sumo bout is brief; the typical bout will end with the initial collision, though a rare bout might last two to three minutes. Interspersed between bouts are a large number of ceremonies that precede and follow each bout.

Though brief, the time intervals during which a bout is proceeding are intense and can captivate those in the viewing audience, many of whom are able to identify a myriad of named sumo techniques that may occur in rapid succession. Such techniques include a "kekaeshi" (a foot-sweep), a "kubinage" (a head-lock throw), and an "izori" (a technique where a contestant crouches below the opponent's rush, grabbing one of the opponent's legs, lifting the opponent upon the shoulders and falling backwards), as well as some sixty five to seventy more named sumo techniques or occurrences.

The remaining time during the sumo tournament is typically not exciting to watch on video. Such time would include for example inter-bout changes of players, pre-bout exercises and ceremonies, post-bout ceremonies and in the case of broadcast, nearly endless commercials. While it may indeed be entertaining to sit in an arena for several hours for a sumo tournament, many people who watch a video of a sumo tournament find it difficult to watch all of the tournament, even if they are rabid fans. Further, the tournaments are held during daytime hours, hence many fans are unable to attend a tournament or to watch a live broadcast due to work. Such fans may nonetheless be interested in watching specific bouts or some other condensed version of the tournament. Thus a video summarization of the sumo tournament that provides a summary of the tournament having a duration shorter than the original sumo video, may be appealing to many people. The video summarization should provide nearly the same level of the excitement (e.g. interest) that the original game provided.

Baseball

A typical baseball game lasts about 3 hours of which only about one hour turns out to include time during which the ball is in action. The time during which the ball is in action is normally the exciting part of the game, such as for example, pitching the ball to the batter, hitting a home run, hitting the ball, running the bases, a pitch to first base, pitching a "foul" ball, pitching a "strike" ball, pitching a "ball", fouling the ball to the bleachers, catching a pop fly, etc. The remaining time during the baseball game is typically not exciting to watch on video, such as for example, nearly endless commercials, the time during which the players change from batting to fielding, the time during which the players walk to the plate, the time during which the players walk around between innings, the time during which the manager talks to the pitcher, the time during which the umpire cleans home plate, the time during which the batter swings the bat in practice, the time during which the batter just waits for the pitcher, the time during which the spectators are viewed in the bleachers, the time during which the commentators talk, etc. While it may indeed be entertaining to sit in a stadium for three hours for a one hour baseball game, many people who watch a video of a baseball game find it difficult to watch all of the game, even if they are loyal fans. A video summarization of the baseball video, which provides a summary of the game having a duration shorter than the original baseball video, may be appealing to many people. The video summarization should provide nearly the same level of the excitement (e.g. interest) that the original game provided.

Football

A typical football game lasts about 3 hours of which only about one hour turns out to include time during which the ball is in action. The time during which the ball is in action is normally the exciting part of the game, such as for example, a kickoff, a hike, a pass play, a running play, a punt return, a punt, a field goal, etc. The remaining time during the football game is typically not exciting to watch on video, such as for example, nearly endless commercials, the time during which the players change from offense to defense, the time during which the players walk onto the field, the time during which the players are in the huddle, the time during which the coach talks to the quarterback, the time during which the yardsticks are moved, the time during which the ball is moved to the spot, the time during which the spectators are viewed in the bleachers, the time during which the commentators talk, etc. While it may indeed be entertaining to sit in a stadium for three hours for a one hour football game, many people who watch a video of a football game find it difficult to watch all of the game, even if they are loyal fans. A video summarization of the football video, which provides a summary of the game having a duration shorter than the original football video, may be appealing to many people. The video summarization should provide nearly the same level of the excitement (e.g. interest) that the original game provided.

Video Content Including Sports

It may be observed that many different types of video content, including for example sporting events, include a game or activity that lasts a significant period of time of which only a relatively short duration of which turns out to include time during which interesting activity is occurring. The time during which interesting action is occurring is normally the exciting part of the game, such as for example, a kickoff, a hike, a pass play, a running play, a punt return, a punt, a field goal, etc. The remaining time during the video content is typically not exciting to watch on video, such as for example, nearly endless commercials, the time during which the players change from offense to defense, the time during which the players walk onto the field, the time during which the players are in the huddle, the time during which the coach talks to the quarterback, the time during which the yardsticks are moved, the time during which the ball is moved to the spot, the time during which the spectators are viewed in the bleachers, the time during which the commentators talk, inter-bout changes of players, pre-bout exercises and ceremonies, post-bout ceremonies, the time during which the players change from batting to fielding, the time during which the players walk to the plate, the time during which the players walk around between innings, the time during which the manager talks to the pitcher, the time during which the umpire cleans home plate, the time during which the batter swings the bat in practice, the time during which the batter just waits for the pitcher, the time during which the spectators are viewed in the bleachers, the time during which the commentators talk, etc. While it may indeed be entertaining to watch for several hours for a one hour activity, many people who watch a video of a sporting event find it difficult to watch all of the event, even if they are loyal fans. A video summarization of the video, such as sporting videos, which provides a summary of the event having a duration shorter than the original video, may be appealing to many people. The video summarization should provide nearly the same level of the excitement (e.g. interest) that the original game provided.

Play Selection

After consideration of the difficulty of developing highly sophisticated models of a video to analyze the content of the video, as the sole basis upon which to create a summarization, the present inventors determined that this technique is not the most preferred technique. In contrast to attempting to detect particular model sequences, the present inventors determined that the desirable segments in terms of understanding, following, or even appreciating the game is limited. These important portions occur semi-periodically and sparsely during the game, but they contain the moments of intense action and are the essence of a game. The remaining time is typically less important. Therefore preferably the events are selected based upon a "play". A "play" may be defined as a sequence of events defined by the rules of the event. In particular, and in one aspect, the sequence of events of a "play" may generally include the time between which the players set up to start an activity and the time during which the activity is completed. A play may also selectively include certain pre-activity ceremonies or events. Normally the "play" should include a related series of activities that could potentially result in a victory by one contestant and a loss by the other contestant.

It is to be understood that the temporal bounds of a particular type of "play" does not necessarily start or end at a particular instance, but rather at a time generally coincident with the start and end of the play or otherwise based upon, at least in part, a time (e.g., event) based upon a play. A summarization of the video is created by including a plurality of video segments, where the summarization includes fewer frames than the original video from which the summarization was created. A summarization that includes a plurality of the plays of the event provides the viewer with a shorted video sequence while permitting the viewer to still enjoy the event because most of the exciting portions of the video are provided, preferably in the same temporally sequential manner as in the original video. In addition, it is to be understood that although summarization often achieves compression at the same time, it is different from video coding which aims at representing the original video with less data. In fact, summarization may be considered more concerned about the compact representation of the "content" in the video, whereas video coding is more concerned about representing the video signal itself as accurately and as bandwidth-efficient as possible. It is to be understood that any type of summarization technique, such as a resulting set of frames less than the original set of frames, may be used together with the data, described later.

Play Detection

Referring to FIG. 1, a model of a class of sports video in terms of play is shown. The play portion is a basic segment of time during which an important action occurs in the game. The non-play is a segment of time during which a non-important action occurs in the game, or otherwise not determined to be a play. The inner loop illustrated in dashed lines indicates the possibility that two plays may occur consecutively or with a relatively short time period between the two plays.

Figure 2:
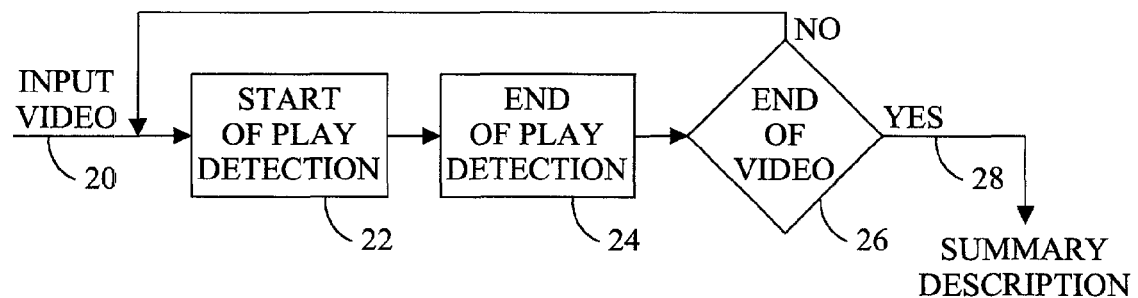
FIG. 2 is an exemplary flowchart for play detection.
Figure 3:
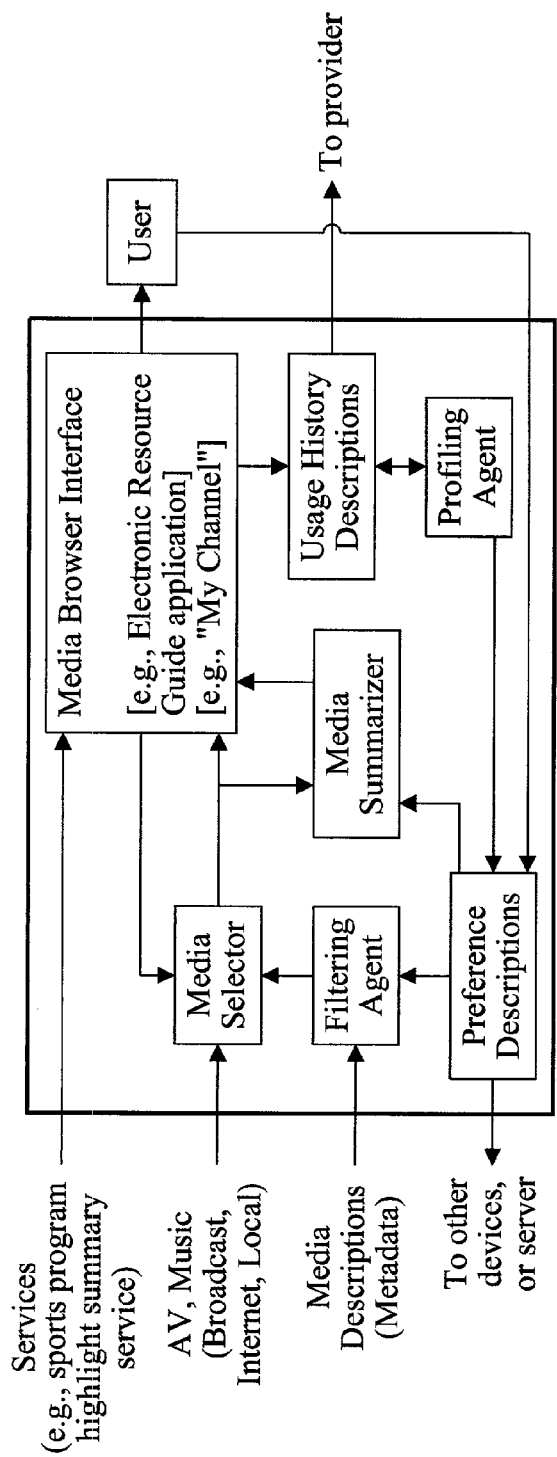
FIG. 3 is an exemplary MPEG7 compliant browser.

Referring to FIG. 2, a procedure for summarization of a video includes receiving a video sequence 20 that includes material to be summarized, where the content preferably includes at least a portion of a game or sporting event. Block 22 detects the start of a play of a video segment of a plurality of frames of the video. After detecting the start of the play, block 24 detects the end of the play, thereby defining a segment of video between the start of the play and the end of the play, namely, a "play". Block 26 then checks to see if the end of the video (or the portion to be processed) has been reached. If the end of the video has not been reached block 26 branches to block 22 to detect the next play. Alternatively, if the end of the video has been reached then block 26 branches to the summary description 28. The summary description defines those portions of the video sequence 20 that contain the relevant segments for the video summarization. The summary description may be compliant with the MPEG-7 Summary Description Scheme or TV-Anytime Segmentation Description Scheme. A compliant media browser, such as shown in FIG. 3, may apply the summary description to the input video to provide summarized viewing of the input video without modifying it. Alternatively, the summary description may be used to edit the input video and create a separate video sequence. The summarized video sequence may comprise the selected segments which excludes at least a portion of the original video other than the plurality of segments. Preferably, the summarized video sequence excludes all portions of the original video other than the plurality of segments.

Figure 4:
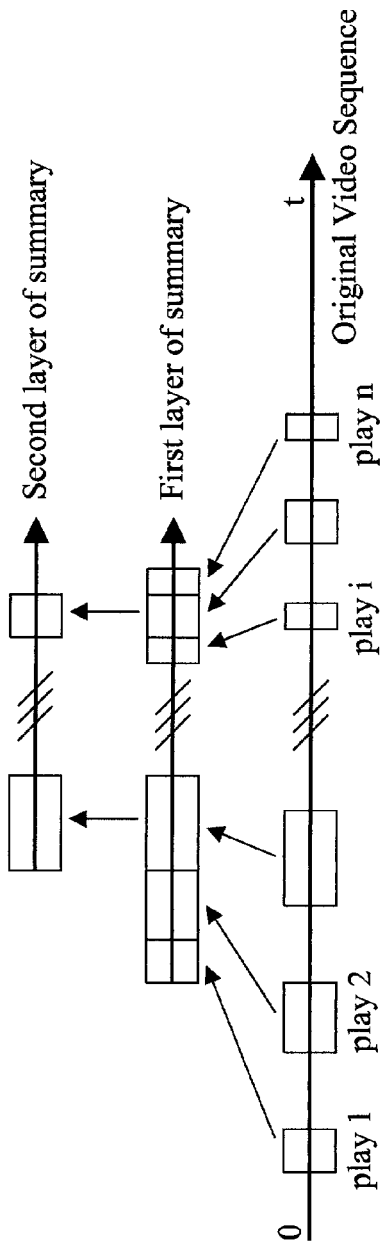
FIG. 4 illustrates hierarchical summaries.
Figure 5A:
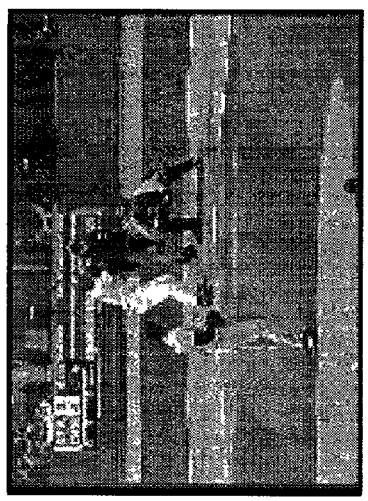
FIGS. 5A-5F illustrates the start of a baseball play.
Figure 5B:
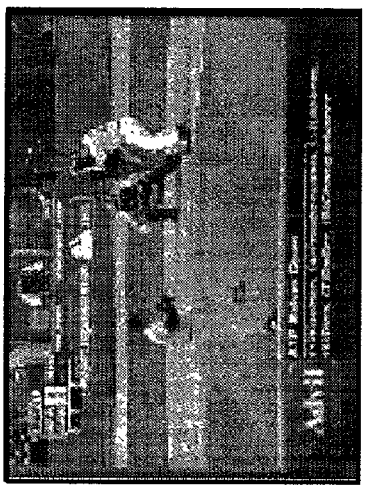
Figure 5C:
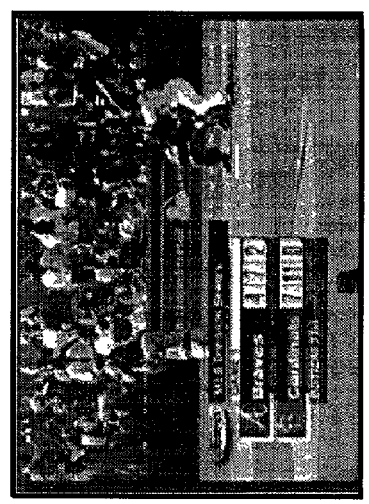
Figure 5D:
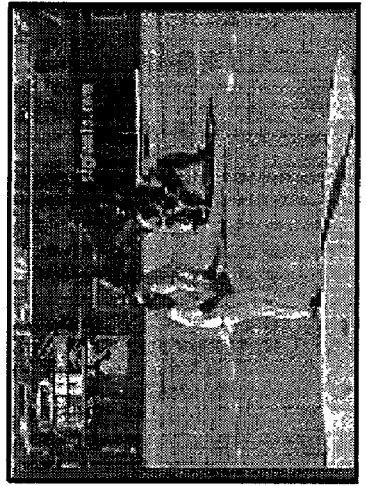
Figure 5E:
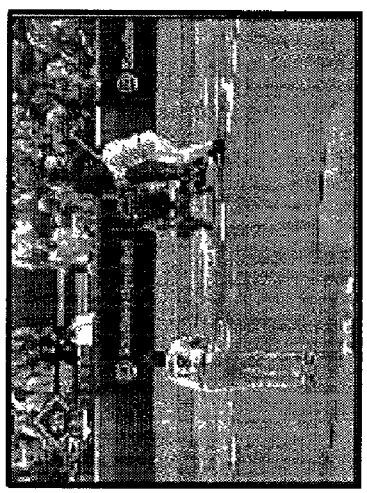
Figure 5F:
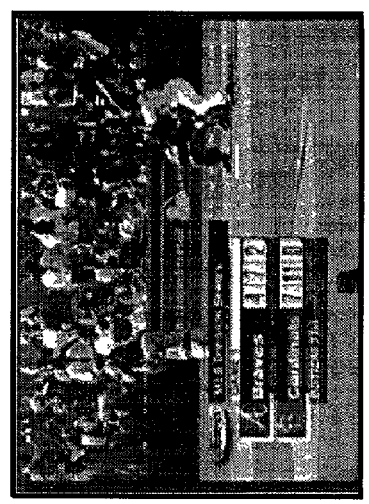

FIG. 2 is intended to show a basic procedure for obtaining such a summary, where the summary description contains only the start and end points of the detected plays. The summarization shown in FIG. 2 is primarily a low-level one, though in more complex situations it may contain other information, i.e. names of contestants etc. The benefit of a low-level summary is that it provides sufficient detail for people to appreciate a game from the summary. The low-level summary may then form the basis for a higher level summarization, if desired, as shown in FIG. 4. As one example, a higher level summary can be obtained by keeping only those plays receiving loud audience acclaims, achieved by adding an audio analysis procedure. Alternatively, in combination with a caption detection/recognition module, a summary can be obtained of only those plays containing a specific contestant. A yet higher summary level may contain only key frames from the plays for indexing purposes.

One component of the summarization procedure depicted in FIGS. 1 and 2 is the detection of an event, or "play." If the start and end points of all plays are detected, then the system may string all the plays together to obtain a summary from the original video and perform some post processing to smooth the transition boundaries, such as using dissolving techniques to reduce abrupt change between plays and smoothing the audio filed for better auditory effects. Further, the summary should ideally contain only those segments comprising a "play" as earlier defined, thus providing a compact representation of the original tournament. With a compact representation the user can spend less time watching it while maintaining most of the excitement of the original game.

One of the difficulties in the detection of a "play" in a sporting broadcast is the detection of the events. However, the present inventors have come to the realization that for sporting broadcasts, and other broadcasts, the general video capturing and production patterns that have been adopted by virtually all of the broadcast companies permits the detection of the events. Hence, relatively low-level visual features may be used for event detection that are relatively invariant.

With the summarization being determined based upon low-level characteristics of the video, the system should detect an event (e.g., a play). In contrast to a generic summarization scheme which uses for example color histograms as the cue for key frame detection or scene classification, the different plays may contain colors which sweep a large range of color (in terms of histogram), yet all the frames belong to the same event, and may be used to form an uninterrupted video clip. Of course, generic summarization schemes may likewise be used.

Baseball Play Detection

The present inventors then considered how to detect a "play" from a baseball video in a robust, efficient, and computationally effective manner. After extensive analysis of a typical baseball game it was determined that a baseball game is usually captured by cameras positioned at fixed locations around the baseball field, with each camera typically capable of panning, tilting, and zooming. Each play in a baseball game normally starts with the pitcher releasing the ball, such as toward the catcher or toward one of the basemen. Further, a pitching scene, in which the pitcher is about to throw the ball, is usually captured from a camera location behind the pitcher. This camera angle is typically used because it is easier to observe the movements of all of the parties involved (the pitcher, the batter, the catcher, and the umpire) from this viewpoint. Thus a play typically starts with a frame such as shown in FIGS. 5A-5F.

While an attempt to determine a pitching scene may include complex computationally intensive analysis of the frame(s) to detect the pitcher, the batter, the catcher, and the umpire, together with appropriate motion, this generally results in a marginally robust pitching scene detection. To overcome this limitation the present inventors were dumbfounded to recognize that the lower portion of a typical pitching frame includes at least one region of generally green colors (grass or artificial turf), and at least one region of generally brown colors (e.g., soil). Normally the lower portion of a typical pitching frame for different fields includes these colors because the pitching mound and batting region are soil, with the region in between being grass or artificial turf. In addition, a typical pitching frame includes two regions of generally brown and/or two regions of generally green. A frame with one region of each color is sufficient.

Also, the present inventors observed that a typical pitching frame includes at least three regions of different colors arranged in alternating dominant horizontally oriented bands. Further, these three or more different color regions are typically generally green and generally brown in color. It is to be understood that the colors may be different depending on the particular anticipated colors, and that all the colors may be different. Depending on the camera angle the pitching scene may have the generally green color at the bottom of the frame or may have the generally brown color at the bottom of the frame. The colors preferably alternate between generally green (or brown) and generally brown (or green). There may be regions of other colors in addition to the generally green and generally brown. Accordingly, the preferred criteria is that the colors should be dominant along the horizontal axis while alternating in the vertical direction for a lower portion of the frame. In addition, the lower portion of the frame may be defined as the lower 75% of the frame, the lower 66% of the frame, the lower 50% of the frame, or the lower 30% of the frame, if desired. It is to be understood that the regions may be arranged in other patterns, as desired. Also, it is to be understood that the location of these regions within the frame may be arranged at other portions of the frame, such as the middle third of the frame, the upper third of the frame, the lower third of the frame, the right half of the frame, the left half of the frame, the central region of the frame, etc. An alternative characterization may be identification of at least three regions of sufficient spatial coherence and sufficient horizontal extent.

Figure 6:
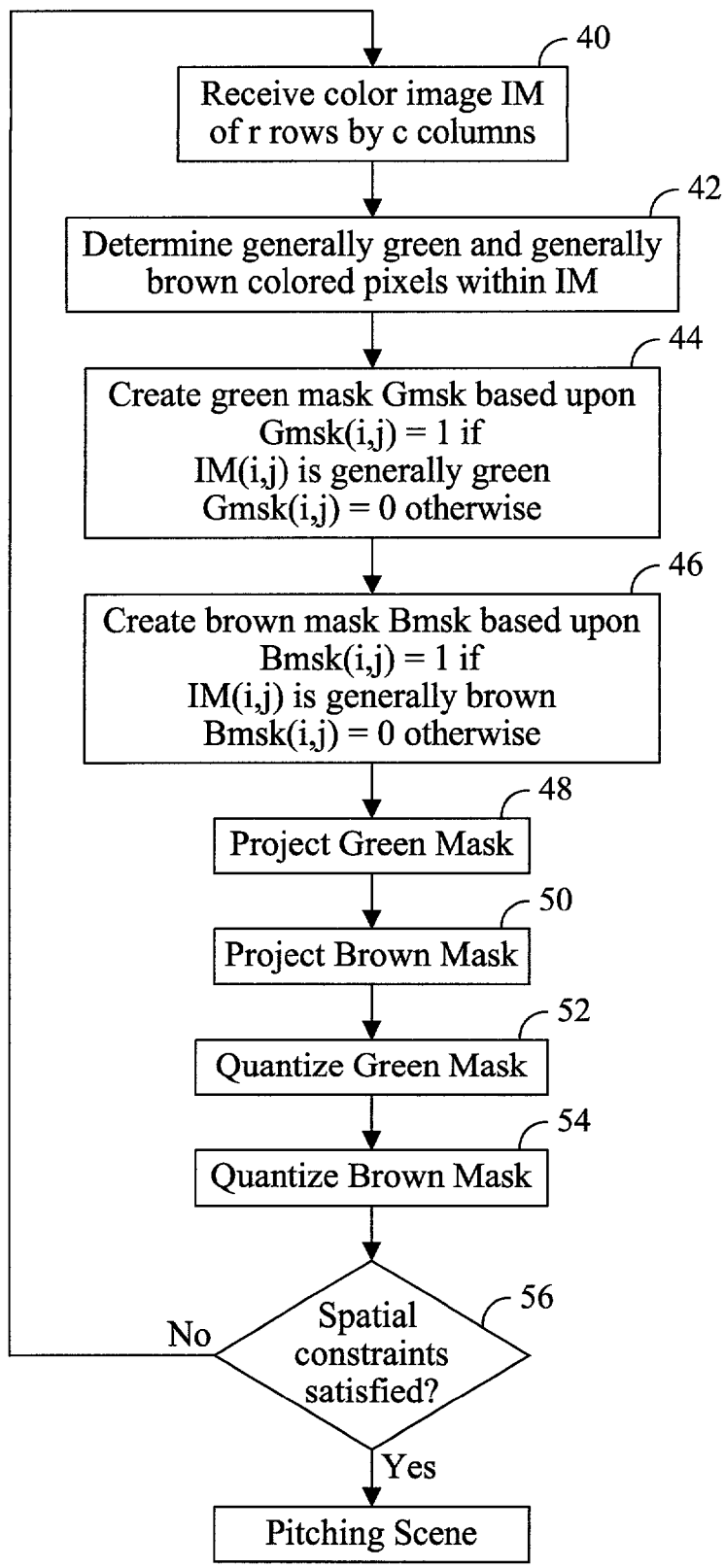
FIG. 6 illustrates one technique for play detection for baseball.

Referring to FIG. 6, based on these observations, the following technique may be used for detecting the pitching scene. Block 40 receives a color image IM of r rows by c columns. Block 42 determines the generally green and generally brown colored pixels within the color image IM. Block 44 creates a green mask Gmsk, with each location assigned a value based upon whether or not the corresponding pixel was generally green. In essence, the Gmsk identifies those pixels of the color image IM that are sufficiently green. Block 46 creates a brown mask Bmsk, with each location assigned a value based upon whether or not the corresponding pixel was generally brown. In essence, the Bmsk identifies those pixels of the color image IM that are sufficiently brown. The result of blocks 44 and 46 is to identify those regions of the color image IM that have colors of interest.

Block 48 projects the green mask Gmsk onto the vertical axis, such as in the manner of a histogram. The green projection may be calculated as Gproj(i)=

$$\frac{1}{c}\sum_j Gmsk(i, j) \quad \text{for } i = 1, \ldots, r.$$

The projection on the vertical axis Gproj(i) is suitable for identification of significant horizontal regions of the image that correlate to regions of the color image IM that are sufficiently green. Block 50 projects the brown mask Bmsk onto the vertical axis, such as in the manner of a histogram. The brown projection may be calculated as Bproj(i)=

$$\frac{1}{c}\sum_j Bmsk(i, j) \quad \text{for } i = 1, \ldots, r.$$

The projection on the vertical axis Bproj(i) is suitable for identification of significant horizontal regions of the image that correlate to regions of the color image IM that are sufficiently brown. The projection technique is used to identify those regions of sufficient spatial coherence and sufficient horizontal extent. It is to be understood that other techniques may likewise be used.

Block 52 quantizes (e.g., binarizes) the green projection. The quantized green projection may be calculated as Gproj(i)=1 if Gproj(i)>p1 and Gproj(i)=0 otherwise, where p1 is a threshold value (static or dynamic). Block 54 quantizes (e.g. binarizes) the brown projection. The quantized brown projection may be calculated as Bproj(i)=1 if Bproj(i)>p1 and Bproj(i)=0 otherwise, where p1 is a threshold value. The green and brown projections, and especially the binarized green and brown projections, are especially suitable for determining whether the peaks in Gproj and Bproj satisfy the spatial constraints of a pitching scene in block 56. In other words, the desired pattern of generally brown and generally green regions is determined within the frame. If the spatial constraints are satisfied then the frame is considered a pitching frame. If the spatial constrains are not satisfied then the frame is not considered a pitching frame. After extensive testing it has been determined that scenes other than a pitching scene is not likely to have the same constraints, and accordingly such a constraint will be relatively accurate at detecting pitching scenes.

Figure 7:
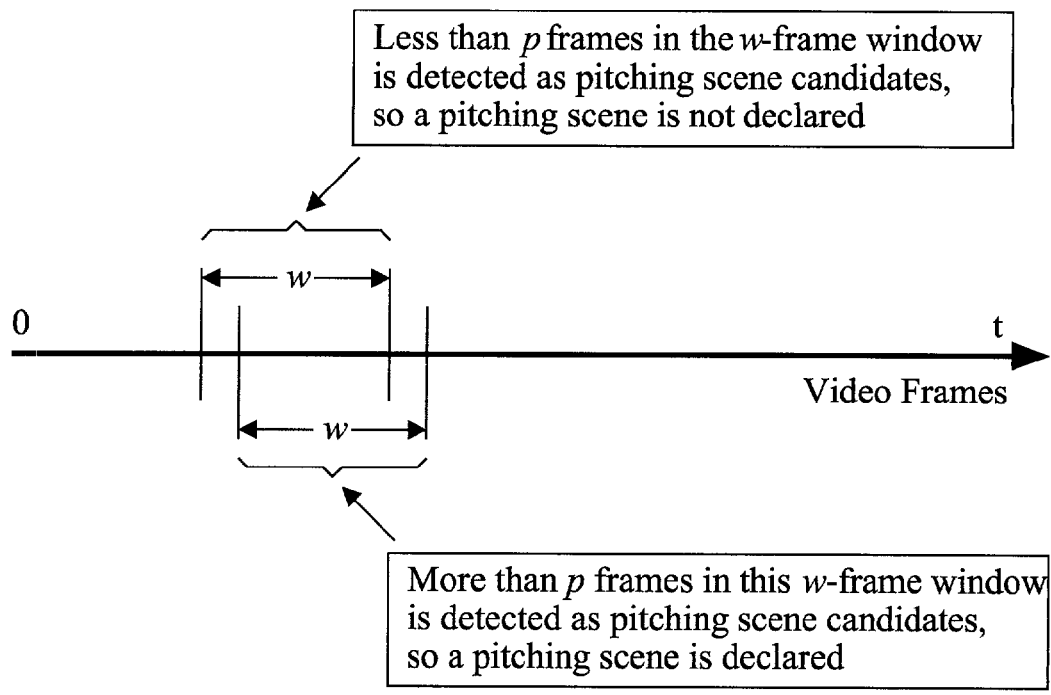
FIG. 7 illustrates a temporal frame validation technique.

After further consideration, the present inventors determined that if a pitching scene and accordingly a play segment is identified after locating only one candidate frame, then the system may be susceptible to false positives. By examining a set of consecutive frames (or other temporally related frames) and accumulating evidence, the system can reduce the false positive rate. Referring to FIG. 7, the following approach may be used to achieve temporal evidence of accumulation: when detecting a pitching scene, a sliding window of width w is used (e.g., w frames are considered at the same time). A pitching scene is declared only if more than p out of the w frames in the current window are determined to be pitching scene candidates, as previously described. A suitable value of p is such that p/w=70%. Other statistical measures may be used of a fixed number of frames or dynamic number of frames to more accurately determine pitching scenes.

Figure 8:
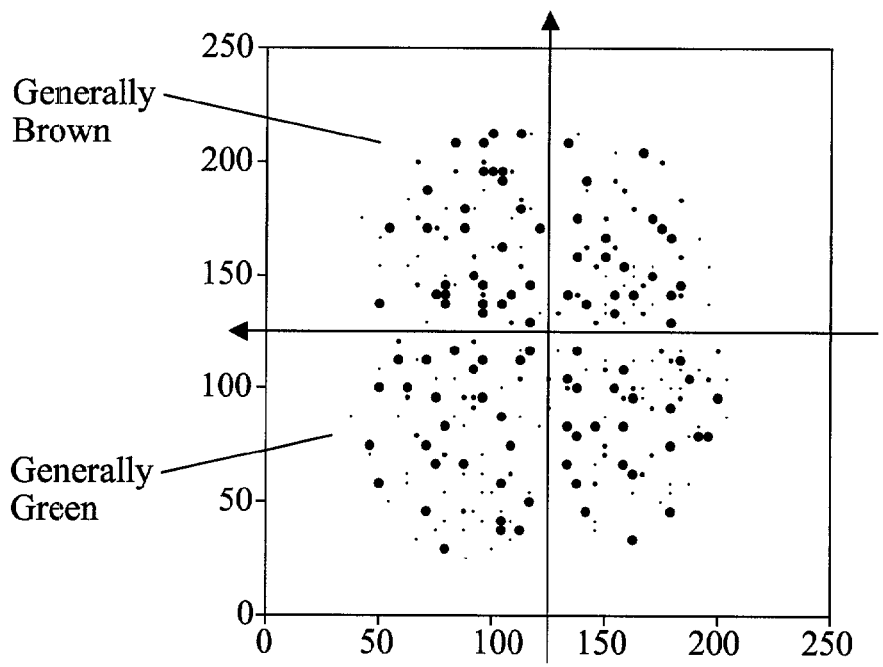
FIG. 8 illustrates color selection for plays.

To define the "generally green" color and the "generally brown" color any color space may be used. The preferred color space is the YUV color space because it may be used without excessive computational complexity. In the event that the input video is a MPEG stream, then the Y, U, V components are directly available after decoding, without further color space conversion. Also, a wide range of green and brown colors can be defined by the lower left quadrant and upper left quadrant of the U-V plane, respectively, as illustrated in FIG. 8. Thus, it is computationally efficient to determine the green and brown masks by comparing the U and V signals to a fixed value, such as 128.

While the start of a "play" may be defined as a pitching scene the end of a play, according to the rules of baseball, can end in a variety of different ways. For example, the play can end with the batter missing the ball, the play can end with a home run, the play can end if the ball is fouled away, the play can end with the batter being thrown out at first base, the play can end with the batter being thrown out at second base, and the play can end with the batter being ejected from the game. Image analysis techniques may be used to analyze the image content of the frames after a pitching frame to attempt to determine what occurred. Unfortunately, with the nearly endless possibilities and the difficulty of interpreting the content of the frames, this technique is at least, extremely difficult and computationally intensive. In contrast to attempting to analyze the content of the subsequent frames of a potential play, the present inventors determined that a more efficient manner for the determination of the extent of a play in baseball is to base the end of the play on camera activities. After analysis of a baseball video the present inventors were surprised to determine that the approximate end of a play may be modeled by scene changes, normally as a result of switching to a different camera or a different camera angle. The different camera or different camera angle may be modeled by determining the amount of change between the current frame (or set of frames) to the next frame (or set of frames).

Figure 9:
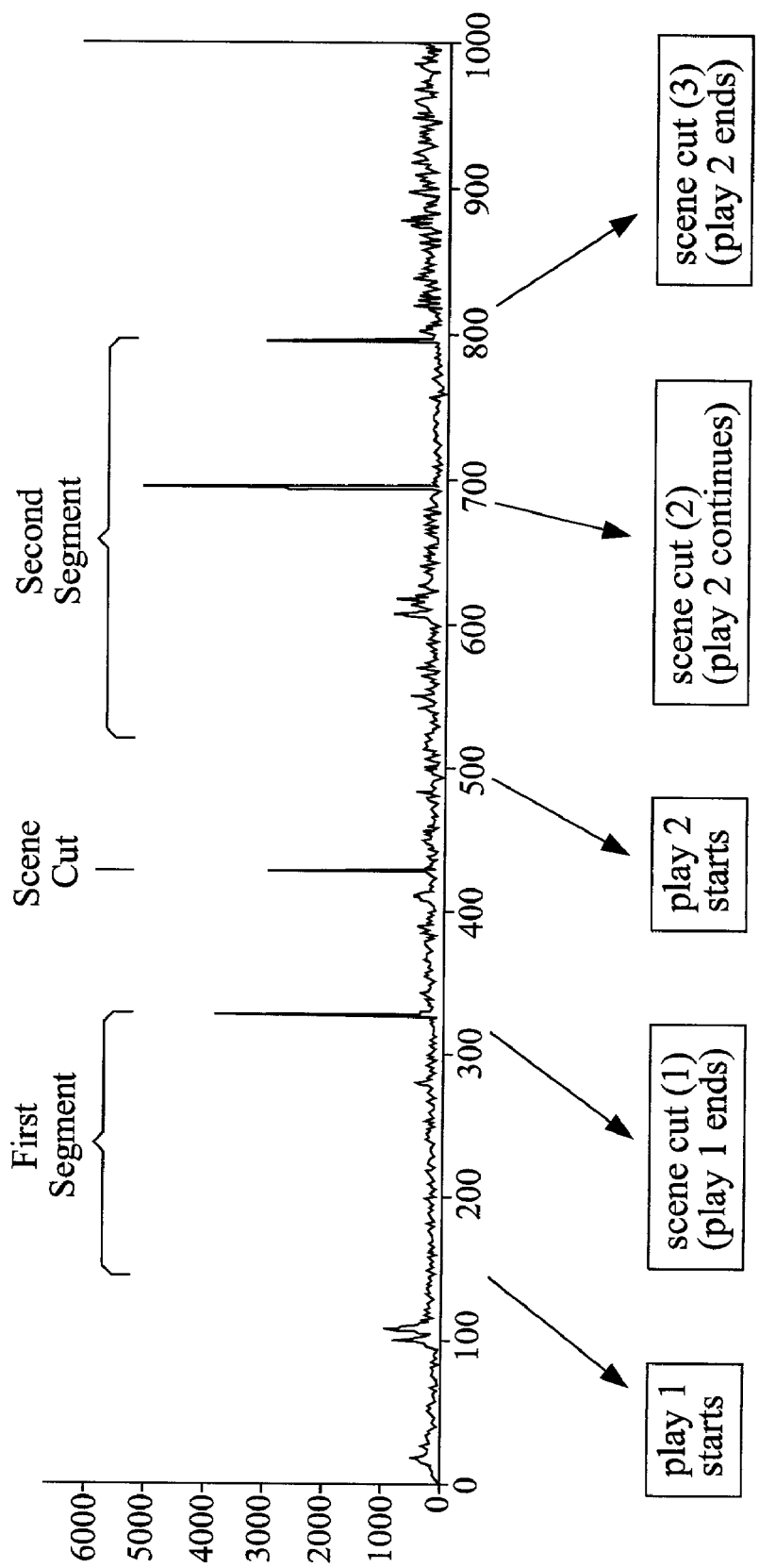
FIG. 9 illustrates the frame breaks between plays.

Referring to FIG. 9, a model of the amount of change between frames using a color histogram difference technique for an exemplary 1,000 frame video baseball clip is shown. The peaks typically correspond to scene cuts. The system may detect a pitching scene at around frame 170. In this particular video clip the batter did not swing, and after the catcher caught the ball, there is a scene cut at frame 322. Accordingly, a first segment may be defined from frame 170 to frame 322. After the pitcher was ready for another throw, the camera was switched back resulting in a scene cut at frame 428. A new pitching scene was detected at frame 520. This time the batter hit the ball, and the camera was switched to follow the flying ball which resulted in scene cut 2. In this case, the play continues, until another scene cut (scene cut 3) when the current play ends and another camera break occurs. As it may be observed, the scene cut (1) properly identifies the end of the first segment in the first pitching scene, while the scene cut (2) does not properly identify the end of the second segment in the second pitching scene. Accordingly, for a more accurate representation of the play it is desirable to distinguish between scene cuts where the play continues and scene cuts where the play ends or has ended. To make this determination, the present inventors determined that most scene cuts where the play continues occurs when the camera is still looking primarily at the field. In this case, the play should continue until a scene cut occurs where the camera is not looking at the field. If after the scene cut the camera is not looking at the field, then the current play ends. The field may be detected in any manner, such as the frame having sufficient generally green or generally brown colors. A flow chart of the technique for detecting the end of a play is shown in FIG. 9.

As previously noted the scene cuts may be detected by thresholding the color histogram differences. The selection of the an appropriate threshold level to determine scene cuts may be based on a fixed threshold, if desired. The appropriate threshold level may be calculated for each baseball video, either after processing a segment of the video or otherwise dynamically while processing the video. One measure of the threshold level may be based upon the mean m and the standard deviation $\sigma$ of the frame-to-frame color histogram differences from the whole video. The threshold can be calculated as $m+c\sigma$ where c is a constant. It has been found that c=5 or 6 covers practically almost all the clean scene cuts. For robustness, after a clean cut has been detected at frame k, the system may further compute the color histogram difference between frame k−1 and k+1. This difference should be at least comparable to that between k−1 and k. Other comparisons may likewise be used to determine if the difference is a false positive. Otherwise the cut at k may be a false positive. This concept may be generalized to testing the color histogram difference between k−c and k+c, with c being a small positive integer (number of frames).

Even with the aforementioned technique there may be some false detections which do not correspond to a real play. Also, there are situations in which a play is broken into two segments due to for example, dramatic lighting fluctuations (mistaken by the system as a scene cut). Some of these problems can be remedied by post-processing. One example of a suitable post processing technique is if two plays are only separated by a sufficiently short time duration, such as less than a predetermined time period, then they should be connected as a single play. The time period between the two detected plays may be included within the total play, if desired. Even if the two detected plays are separated by a short time period and the system puts the two plays together, and they are in fact two separate plays, this results in an acceptable segment (or two plays) because it avoids frequent audio and visual disruptions in the summary, which may be objectionable to some viewers. Another example of a suitable post processing technique is that if a play has a sufficiently short duration, such as less than 3 seconds, then the system should remove it from being a play because it is likely a false positive. Also, post-processing may be applied to smoothen the connection between adjacent plays, for both video and audio.

Although most plays start with a pitching scene illustrated in FIG. 5, one of the potential plays in baseball starts with a different camera angle, namely, the one for base-stealing. Typically the base stealing camera is directed toward first base (though second and third base are likewise possible). The detection technique may be used to likewise readily detect base stealing frames as the start of a play. In this case the colors tend to be a region of generally brown for the mound, generally green for the field, and generally brown for the field. However, the size of the brown regions are significantly different, which may be used as a basis to characterize the field. Also, the regions tend to encompass the entire frame (or majority).

While very loose color definitions for the colors is permitted, it is possible to calibrate the colors for a specific game. Calibrated colors permits more accurate play detection for a particular video. The calibration may be performed by a human operator or by the system with the assistance of a human operator. The system may perform automatic calibration by using appropriate statistical techniques. A simple technique is as follows. If the system has obtained a set of pitching scene candidates, the system can estimate the color histograms for green and brown colors, respectively, from these candidates. Under the assumption that most of the candidates are true pitching scene frames, the system can detect statistical outliers in this set. The system then uses the remaining candidate frames to estimate the specifics of the colors. With the green and brown colors calibrated, the system can perform both the start-of-play detection and the end-of-play detection more accurately.

At times the pitcher is ready to pitch but the batter is sometimes not yet in position and it takes the batter considerable time to get into position. In this case, the resulting play and thus the summary will contain significant time during which the batter is getting ready. To further refine the start of the play, a batter position module may be used. The module detects whether there are multiple sufficient gaps in the highest green region, and preferably whether the gaps shift with time. The gaps are readily observable in the green mask. If more than two sufficient gaps exist or the gaps shift with time, then the batter is typically not ready. Otherwise the batter is ready.

Sporting Event Detection

It may be observed different sporting activities typically have different scenes that indicate the start of a "play". However, if the scenes that indicate the start of a "play" are captured by a fixed camera angle, or otherwise a camera angle that provides an identifiable set of generally invariant characteristics of a scene, then the system may more readily identify the start of a play. It may likewise be observed that the end of the "play" may be characterized by a scene transition. In fact for a particular class of sporting events, the use of a fixed camera angle is normally done, since only one (or a few) camera angle(s) are suitable for capturing the action of all the parties involved. Moreover, professional video production normally includes a camera break (resulting in a scene transition) after an event has finished. It is to be understood, that the general techniques described herein may likewise be applied to other types of video content, including other sports and non-sports content.

Video Data Streams

There exists various sources of data, such as textual based data, that describes the content within a video, such as a video including sporting events. Typically a sports video vendor, such as ESPN, with knowledge of the sporting event will produce data streams (e.g., a file or otherwise containing descriptive data) of information that describe sports video. These data streams are sometimes provided together with the live sports video, albeit normally delayed a few seconds to minutes, or otherwise a data stream made available at a later time corresponding to a particular sports video. One particular type of data stream is provided under the trade name, SportsTicker. SportsTicker includes a defined data structure within which is included data related to the sports video as a whole. For example, the SportsTicker may indicate that the pitcher just threw a strike, the pitcher threw a ball, player statistics, and summary information of a period such as an inning.

Figure 10:
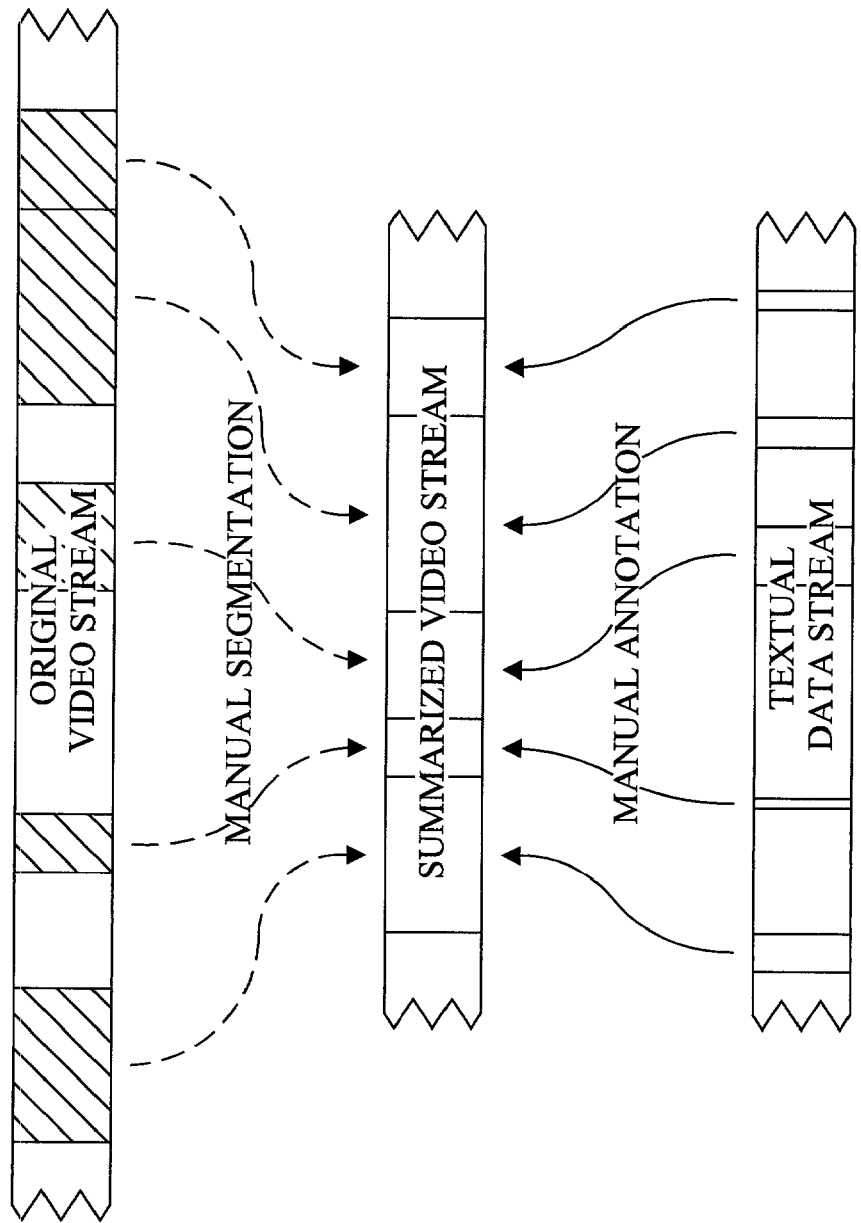
FIG. 10 is an exemplary flow chart for determining the end of a play.

Typically the sports video is presented to the viewer in a suitable fashion, such as presenting key frames, presenting portions as the result of event detection, and presenting portions as a result of "play" detection. Referring to FIG. 10, traditionally, the processing of video data into a processed video stream of more "relevant" data has involved the manual processing of the video by trained technicians. To this processed video stream the technician may manually associate particular portions of a data stream, such as a set of text from the SportsTicker, with the particular frames of the video. The manual association of portions of the data stream to the video stream is a time consuming processing of determining portions of the data stream that may be relevant to the processed video stream and thereafter manually forming some association between the frames of the video and the data stream.

The present inventors considered the existing data streams and came to the realization that the data streams are not inherently suitable for automated association with different portions of the video stream because the data streams are created at different times for different purposes, namely one for viewing and one for informational purposes or otherwise for commentators. In addition, the resulting processed video stream has a different time base (start and end times of different segments) than the original video stream and the processed video stream as a different frequency (the start and end spacing between different segments) than the original video stream. Also, the data stream has a different time base and frequency than the original video stream because they are not synchronized in any manner, and further the data stream has an even further distant time base and frequency than the processed video stream. In addition, there are gaps in the sequence of potentially relevant events in the processed video stream as a result of the particular selection of events by a technician manually creating the summary. Likewise, there are gaps in the sequence of potentially relevant events in the data stream as a result of the party inputting the data selectively including data regarding events, leaving out events that are normally included, events that are simply not included within the data stream such as replays within SportsTicker data or an attempted steal not detected within the processed video stream. Moreover, there exists false detection or inclusion of additional events within the processed video stream and data stream which further complicate the correlation between the processed video stream and the data stream. If synchronization clues could be determined from the processed video and the data stream, the resulting synchronization clues are periodically in conflict and are not considered reliable. Accordingly, there is no 1-to-1 correlation between events of the data stream and the processed sports video. One or more of these considerations may be present depending on the particular data stream and video stream.

One potential solution to these nearly endless problems involves making the data stream dependant on the video stream or otherwise the video stream dependant on the data stream. This dependancy may be created by manually annotating the video stream (the annotations are dependent on the video stream), or otherwise manually segmenting the video stream by using an annotation list as a basis (the video segmentation becomes dependent on the annotations). Another potential solution is to use a summarized video stream and manually associate a set of independently generated annotations to some of these segments. In either case, it is a time consuming activity to create these associations. The manual association permits accurate and defined associations to be achieved, limited to the accuracy of the operator.

The present inventors considered the manual annotation to be an unacceptable solution to the aforementioned problems because of the time involved in its creation and the desirability of having the capability to quickly annotate video streams. Quick annotating of the video streams may be needed to re-broadcast the video stream or summarized video stream within minutes after the actual real-time event occurred. In addition, it is not cost effective to manually annotate a large amount of video content, especially under extreme time constraints. After extensive consideration the present inventors came to the realization that the video content includes information, added by the content provider in the video prior to being broadcast, that may be used as the basis of automatic synchronization of the video stream to the data stream. In particular, the present inventors came to the realization that optical character recognition of the scoreboard or otherwise the scoring information provided by the content provider prior to broadcasting the content may provide useful clues regarding the events occurring within the video broadcast or summary of the video broadcast. It is to be understood that references to free from manual association merely relates to an automated process for all or merely a portion of the synchronization process, for all or a portion of the video.

Figure 11:
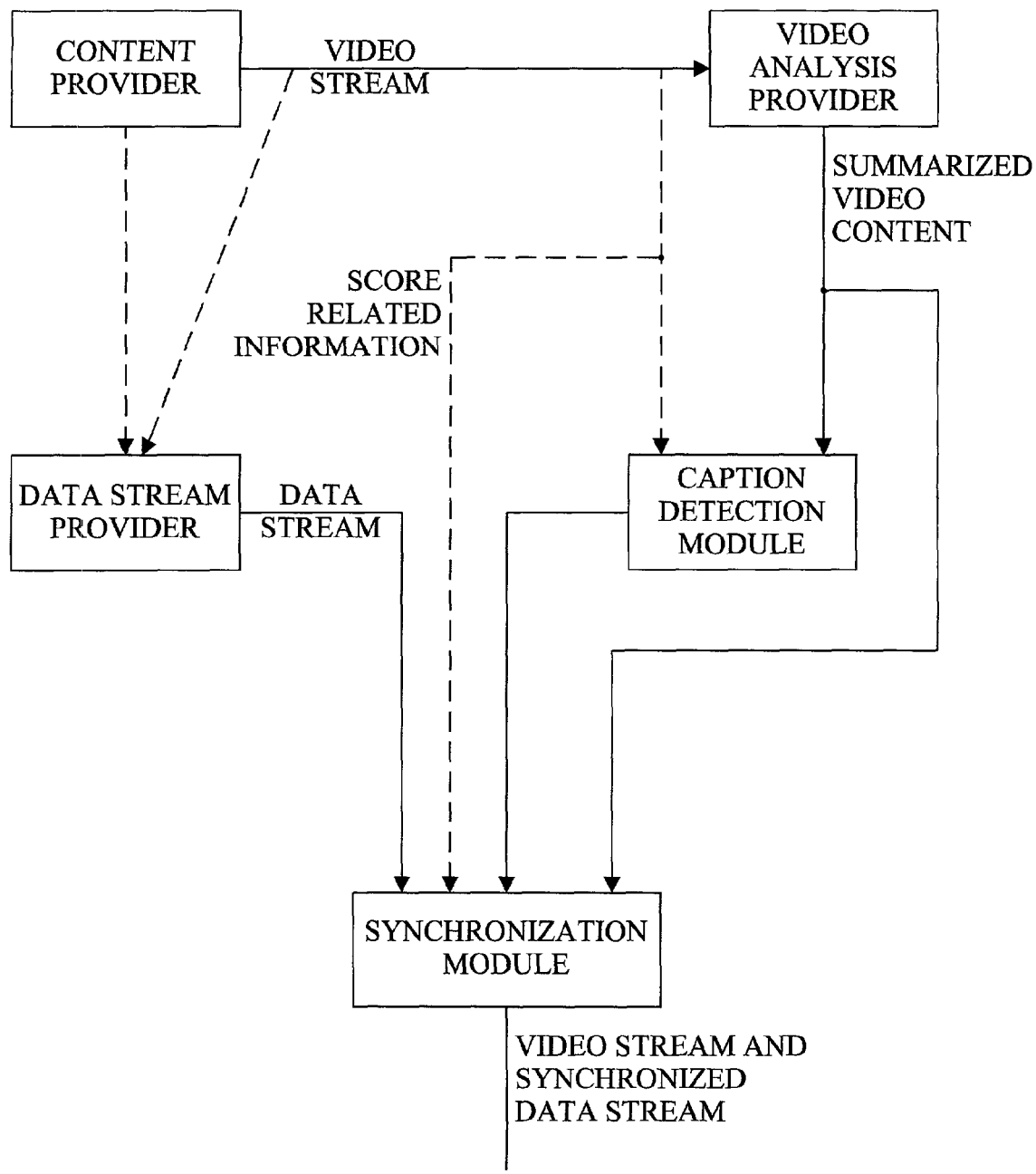
FIG. 11 illustrates manual association of a video stream and a data stream.

Referring to FIG. 11, a video stream may be provided by the content provider. A data stream provider may view the video stream and create a data stream providing information related to the content of the video stream. The data stream is normally generally temporal in nature, in that, the data temporally later in the data stream typically relates to events occurring later within the video stream. A video analysis provider may receive the video stream and create a video stream that is a summary of the original broadcast. Typically the video stream is likewise generally temporal in nature, in that, the data temporally later in the video stream relates to events occurring within the video stream that occur later. More than one video stream may be used, as desired. A caption detection module may process portions of the original video stream or summarized video stream to obtain score related information of the events occurring within the video using any suitable image processing technique, such as optical character recognition. The resulting score related information, together with the summarized video stream (or original video stream), and the data stream are synchronized by a synchronization module. The output of the synchronization module is the video stream synchronized to the data stream (or vice versa), which is preferably MPEG7 or TV-Anytime compliant XML syntax. Preferably, the data stream is time stamped in some manner to the associated video stream, such as a time offset, absolute time from the start, frame number, frame offset from previous time stamp, etc. The synchronization may include any suitable association between the video stream and the data stream.

Figure 12:
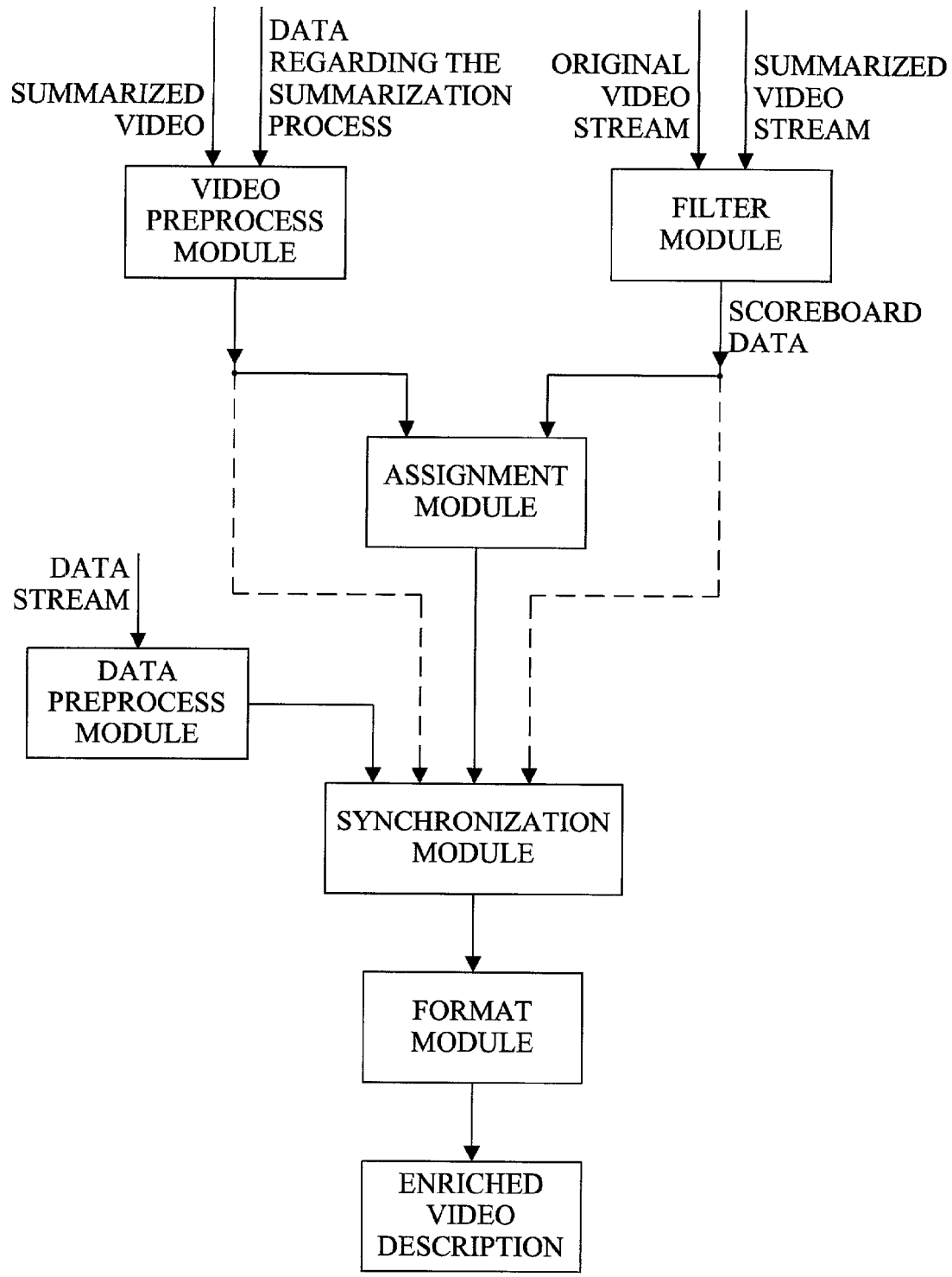
FIG. 12 illustrates automated association of a video stream and a data stream.

Referring to FIG. 12, one example of the synchronization system is illustrated in greater detail. The video pre-process module extracts potential synchronization points from the summarization process of the video stream. Together with the start and stop points of individual "plays" of the video summarization, the video summarization process may likewise be used to characterize the potential content of a video segment. For example, the video summarization process may detect the pitch of a ball, which may indicate that the following segment is a ball, a steal, or a strike. For example, the video summarization process may detect the pitch of the ball followed by scenes of the field, which may indicate that the following segment is a ball, a steal, a hit of the ball, and not likely indicate a strike. In this manner, the processing of the video may provide indications of the likely type of content represented thereby, albeit not always with absolute confidence.

The filter module extracts potential synchronization points from processing of the video stream itself, such as the original video stream or the summarized video stream. The synchronization points may be obtained from, for example, the character recognition of the scoreboard. The scoreboard information provides insight into the potential type of plays that have occurred. For example, if the scoreboard of a previous segment or at the start of a segment indicates $2^{nd}$ ball, $1^{st}$ strike, $1^{st}$ out and then changes to $3^{rd}$ ball, $1^{st}$ strike, $1^{st}$ out, then the segment between is likely indicative of an activity that results in an additional ball, such as a hitting foul ball or a ball outside of the strike zone. As another example, if the scoreboard of a previous segment or at the start of a segment indicates $2^{nd}$ ball, $2^{nd}$ strike, $1^{st}$ out, and then changes to 0 ball, 0 strike, $2^{nd}$ inning, then the segment between is likely indicative of an activity that results in an additional strike, such as the batter swinging but missing the ball, the batter hitting a pop fly, the batter being thrown out at a base. As yet another example, if the scoreboard of a previous segment or at the start of a segment indicates $1^{st}$ ball, $1^{st}$ strike, 0 out and then changes to 0 ball, 0 strike, $2^{nd}$ out, then the segment between is likely indicative of an activity that results in an additional "out" such as the batter hitting a pop fly, and the batter being thrown out at a base. Furthermore, the scoreboard may likewise indicate the changes of innings, whether the top or bottom of an inning, and the score. Also, the scoreboard may likewise indicate changes in the applicable properties that indicate multiple outs (double or triple play) or otherwise indicate a change that may be the result of multiple plays. In any event, the scoreboard may be used to further characterize the likely possibilities as a result of the different segments. The scoreboard data is of course different for different sports. It is to be understood that the data obtained from the filter module may provide indications of the likely type of content represented thereby, albeit not always with absolute confidence.

An assignment module may attribute a set of likely synchronization characteristics to portions of the video stream, such as for example, a video frame, a set of frames, or a segment for the summary based on information from the video pre-process module and/or the filter module.

A data pre-process module extracts potential synchronization points of the data stream, which may be one or more auxiliary data streams. The synchronization points may be obtained from, for example, processing the data stream to obtain data that may characterize a segment of the summary, a set of frames, or a video frame. The selected data provides insight into the potential type of plays that occurred. It is to be understood that the data obtained from the data pre-process module may provide indications of the likely type of content represented thereby, albeit not always with absolute confidence.

A synchronization module merges the data from the assignment module and the pre-process module, both of which indicate potential characteristics of the video, albeit not always with absolute confidence. Thereafter, a format module may transform the data to a more appropriate format, such as MPEG7, if desired. The resulting video stream may thereafter be enriched by the associated data stream. It is to be understood that the synchronization data may be related to a frame, a segment, a play, a collection of plays and/or frames or between plays or frames. Also, the synchronization data may vary with different sports and broadcast norms.

It became evident to the present inventors that the merging of video streams (summarized or non-summarized) and nonsynchronized data streams using an automated technique is a plausible goal if synchronization information can be obtained from the video, such as by the summarization techniques and/or video analysis, and synchronization information can be obtained from the data stream. Further, synchronization of such disparate video streams and data streams may have been previously considered infeasible because it is difficult, if not impossible, to synchronize such streams with a 100 percent degree of confidence thus resulting in an inaccurate synchronization. However, the present inventors came to the realization that the merging of the video stream and data stream with 100 percent accuracy is not necessary because having the data stream generally synchronized to the appropriate portion of the video and/or video summary is sufficient for presentation purposes.

If the system is less than fully confident (e.g., non-deterministic) about a portion of the merged data, the system may still complete the merging of the data with the video.

First, if the system can associate a first portion of the data stream to a first portion of the video stream with a relatively high degree of confidence and can associate a second portion of the data stream to a second portion of the video stream with a relatively high degree of confidence, then all or a portion of the data between the first and second portions of the data stream may be associated with all or a portion of the video stream between the first and second portions of the video stream.

Second, if the system can associate a first portion of the data stream to a first portion of the video stream with a relatively high degree of confidence and can associate a second portion of the data stream to a second portion of the video stream with a relatively high degree of confidence, then the data between the first portion and the second portion of the data stream may be simply omitted.

Third, the system may associate a first portion of the data stream to a first portion of the video stream with a first degree of confidence, may associate a second portion of the data stream to a second portion of the video stream with a second degree of confidence, and may associate a third portion of the data stream to a third portion of the video stream with a third degree of confidence. Further, the level of confidence may be based upon, at least in part, the likelihood that the corresponding event in the video is within x number of plays or otherwise the proximity in the video. For example, the data may indicate a 70% probability that the data is within x number of plays or frames. Any system that denotes a likeliness of proximity may be used. In addition, if the user is presented with multiple pieces of data corresponding to the same segment of the video then the data with the highest likelihood may be differentiated (e.g., highlighted) in some manner with respect to the other data. This permits the viewer to be focused on the data that is most likely. The first, second, and third degrees of confidence may be the same, two different degrees of confidence, or three different degrees of confidence.

With respect to data streams the SportsTicker data stream is of particular interest. The SportsTicker includes a set of nested layers according to the SportsTicker specifications. The highest layer retrieves signal messages based on specific start/end delimiter sequences. The highest layer also extracts the KeyCode or SLUG information, which describes what type of message it is, such as ML for Major League Baseball and MLB36 for Major League Baseball Play by Play message. If the message is valid and recognized, then the message is parsed into one or more records. For each record the record type may be extracted and the relevant pieces of a single SportsTicker record are extracted. The number of records within a SportsTicker message may be different than the number of records extracted from the SportsTicker data stream. For example, a single SportsTicker message corresponding to a running movement may be decomposed into a plurality of different records within the system.

By way of example, the parsed messages and records may be assembled with one or more of the following data fields:

Synch Type: An enumerated list describing synchronization event type (e.g., the inning, a pitch, the pitch hit into the field, a base steal in the case of baseball; and the quarter, the game clock in the case of football).

Scoreboard Info: The current state of the game in terms of scoring (e.g., pitch count, inning). For baseball, the fields may include the inning (0-17+), the out count (0-3), the ball count (0-4), and the strike count (0-3).

It is noted that the SportsTicker specification may not explicitly provide the score but rather the system may accumulate the score based upon the data contained within the SportsTicker data stream.

Record Type: One of an enumerated list describing the sport-specific record event type (e.g., strike swinging, strike, foul, ball hit player, foul ball).

SportsTicker Text: Textual data associated with the play. In the case of a graphical user interface, this data may include text that is displayed on the screen. In the case of archiving play history, this data may be the key names/words/phrases that are tested during a query of the processed data. The textual data from the SportsTicker data stream may be further modified to achieve a shorter textual entry suitable for presentation and/or searching purposes.

Comment: Textual data for purposes of readability and debugging purposes.

By way of example, SportsTicker data feed may provide the following, as illustrated in Appendix A. The boxes indicate characters that are not displayable.

The SportsTicker data feed may include a pitch by pitch of events. These events include, for example, pitch results (batter records), runner movement, and the end of game/innings.

The data feed may include sequential notification where the latency may vary, and messages may be corrected by retransmission, with the final notification stream correctly ordered.

The data feed may include structured metadata regarding the play events. This may include the player name, pitch result code, runner movement code, starting/attempted base code, etc.

The data feed may include unstructured textual data summarizing the play, the inning, and the game, plus warm-ups, lineups, etc. This unstructured data substantially duplicates the structured play event data, and thus the unstructured textual data or the play by play of events may be discarded.

The data feed may include transmission time stamps of the time of day time stamp, which is the wall clock time and not related to the actual video itself. Due to the variability in the time lag for the observer to enter the data, and due to re-transmissions, this time stamp is considered only partially reliable.

The analysis of adjacent or otherwise proximate SportsTicker data may be used as the basis to identify groups of SportsTicker data that may have an increased probability of being associated with the same detected play or event.

The data feed may include two proximate synchronization points within different messages. In some cases such synchronization points may be, for example, a hit followed by a base steal. The hit followed by a base steal may be detected in the video as a single play or segment, in which case the two synchronization points may be associated with the same play or segment. In some cases such synchronization points may be, for example, a base steal followed by a base steal. The base steal followed by a base steal may be detected in the video as a single play or segment, in which case the two synchronization points may be associated with the same play or segment.

Referring to FIG. 13A, the SportsTicker data feed generates batter records that have a "Pitch Result" code associated with each pitch. The PitchFld and PitchStp columns indicate the respective synchronization cues generated when the record is parsed. Referring to FIG. 13B, the SportsTicker data feed generates runner movement records that have an "Action causing runner movement" code associated with each runner movement series. It is noted that there may be more than one runner movement in the series, but normally there is only one "action causing" code. The Base-Steal column indicates the respective synchronization cues generated when the record is parsed.

In the case of baseball, there exist other additional primary and/or derived synchronization cues. For example, based on the analysis of the SportsTicker data, the system may also identify groups of SportsTicker plays that have an increased probability of being associated with the same detected play. The following specifications from SportsTicker are hereby incorporated by reference as if the entire text was included herein: NBA/WNBA Play-by-Play & Stats Data Feed; Major League Baseball Stats Data Feed; Major League Baseball Pitch-by-Pitch Data Feed; College Football C-Records; College Football Quarterly Play-by-Play; College Football Quarterly Boxscore CSV; College Football Quarterly Boxscore CSV; NFL In-Progress Data Feed; NFL Statistical Data Feed; NFL Quarterly Boxscore CSV; College Football Statistical Data Feed; NHL In-Progress Play-by-Play Data Feed; College Football In-Progress Data Feed; and Wire Specifications.

The video pre-process module outputs may be parsed to obtain meaningful synchronization points. In the following, using baseball as an example, the play detections results may be pre-processed to generate synchronization information. The result of the summarization process may provide data indicating the starting frame and the ending frame for each segment, together with the number of scene cuts detected for each detected play, where n indicates the number of scene cuts. Generally, where n is greater than one, the pitched ball was hit so there is field activity and the camera angle changes to a field shot. The result of the summarization process may also provide data indicative of one or more types of plays. For example, the plays may include a regular pitch play or a base steal. For example, n=2 may indicate a pitcher raises his arm to throw the ball (first portion), scene cut, throws the ball (second portion), scene cut, and batter hits the ball (third portion).

The scoreboard optical character recognition may associate the corresponding frame or segment within which the scoreboard was detected using the caption detection module. Each scoreboard entry may contain, for example, Inning $\in\{1\text{-}9,?\}$; Top/Bot $\in\{0,1,?\}$; OutCount $\in\{0\text{-}3,?\}$; BallCount $\in\{0\text{-}4,?\}$; StrikeCount $\in\{0\text{-}3,?\}$, where a '?' indicates the entry is not determined. The output generated by the caption detection module may include the following data fields:

Synch type: A description of the type of event that occurred or a set of events that are likely to have occurred.

Scoreboard Range: The range may include, for example, Top/Bot, Which Inning, Number of Outs, Ball Count, and/or Strike Count. In the event that an entry includes a "?" (Unknown value), the system may create a range (or expand the given range) to include the particular scoreboard fields from a previous and a following scoreboard detection.

Start/End Frames The start and end of the frames associated with the scoreboard information may be included. For example, this may include the frames during which the scoreboard is detected, one or more frames during which the scoreboard is detected, or otherwise a segment of the video (e.g., play) associated with the scoreboard.

Comment: Comments maybe provided in this field.

By way of example, baseball play synchronization information may include the following.

(1) The frame references for the start and end of plays. Current modeling of existing detection techniques indicate the probability of missing a play to be less than 5 percent and the probability of false play detection to be less than 10 percent.

(2) A change of inning indication (synch type=Inning) may be based on a long idle time, normally as a result of a commercial break, and a change in the pitcher's uniform. Current modeling indicates the probability of missing an inning change to be less than 25 percent and the probability of false inning detection to be less than 5 percent.

(3) A pitch and field action (sync type=PitchFld) may be based on camera shifting from batter to the field (camera follows the ball, the fielder, and the running batter). It is noted that some baseball hit events will not be classified as hit by the algorithm because all the action remains at the batter and catcher. Such MLB36 pitch result types may be labeled as pitch-no-hit events for synchronization purposes. Current modeling indicates the probability of missing a pitch and field action to be less than 10 percent and the probability of false detection to be less than 5 percent.

(4) A pitch without field action stopped (sync type=PitchStp) may be based on the camera angle remaining on the batter and catcher. It is noted that some baseball pitch-no-hit events will not be properly classified because there may be catcher or pitcher error, or there may be action in the field. Such MLB36 pitch result types may be labeled as hit events for synchronization purposes. Current modeling indicates the probability of missing a pitch without field action to be less than 10 percent and the probability of false detection to be less than 5 percent.

(5) A base steal (sync type=Steal) may be based on camera angle and/or geometry of foreground/background. Current modeling indicates the probability of a base steal to be less than 10 percent and the probability of false detection to be less than 5 percent.

Traditionally scoreboard based optical character recognition would be considered a difficult task because of the limited number of pixels in a video broadcast corresponding to the letters. Accordingly, it may be difficult to distinguish between a "1" and a "7" when only a limited number of pixels are used. However, it turns out that for most sporting broadcasts the scoreboard remains generally unchanged, even among the different sporting events such as baseball and football. In fact, the broadcast networks generally keep their scoreboard in a fixed location with the same style of presentation in order not to confuse the viewer. Therefore the video scoreboard in such cases is more suitable to optical character recognition than what would be generally considered feasible. If desired, the optical character recognition technique may make the assumption that, for a given channel, the locations of the scoreboard is known and that the locations of the game score, the team names, the out count, etc. are likewise generally known. Based upon these assumptions a template-matching-based optical character recognition approach may be used to extract the scoreboard information from the video. For example, in baseball the system may extract counts of inning, out, ball, strike, and top or bottom of an inning. Games scores and current bases occupied can also be extracted using a similar approach. For football, the system may extract quarter numbers and the game clock, which are useful for synchronization. FIG. 14 illustrates an exemplary baseball scoreboard from FOX and FIG. 15 illustrates an exemplary football scoreboard from FOX.

Unfortunately, the scoreboard data obtained on a frame-by-frame basis may contain errors. In such a case, sport-specific knowledge may be utilized to filter the row optical character recognition data in order to obtain more accurate results. For example, in baseball, generally, if the out count reliably changes (goes up during a sub-inning, or is reset at the end of a sub-inning), then the system can determine that the ball-strike count should be reset. Otherwise, the ball-strike count should increase. So if the system determines the ball-strike count going down without an out count change, then the system may presume that a new (lower) value is incorrect, or the previous (higher) value is incorrect (e.g. the ball count is 333313333 or 11113111 respectively). Also, inning changes should be accompanied by the changes of the top and bottom of the inning. In the case of football, the game clock within each quarter should always go down.

To fix isolated errors in a given field (e.g. the out count), one technique is to low pass filter that field (e.g., a temporal low pass filter). If the system makes the cutoff sufficiently low (e.g. less than one second), then the system can be reasonably sure to not to filter out a quick intermediate value. During filtering, the system is interested in bounding the scoreboard range for any time point during the game. This has the practical benefit that it is easier to determine the lower and upper bounds than to decide the single scoreboard value. Although the system can do filtering on the scoreboard data after the recognition process is finished, it is also possible to incorporate the game specific knowledge into the character recognition process. For example, if the optical character recognition module determines the out value for the current video frame is 1, then it should expect the value to be most likely either 1 or 2 (but much less likely 0) in the subsequent frame.

After the scoreboard is processed and analyzed, if desired, the system may augment each detected play (or frame or set of frames) with a numerical set of tags that identifies the status of the game at each play. In most cases, this scoreboard status is unique for each play in the game. In perfect scoreboard processing conditions, this sequence of scoreboard statuses might be sufficient to facilitate the entire synchronization process, without considering other cues.

For baseball, scoreboard data may, for example, provide the following:
(1) Pitch count (ball-strike);
(2) Number of outs;
(3) Inning number (inning top/bot);
(4) Game Score; and
(5) Bases Occupied.

It is noted that except for the inning number and the game score, the corresponding information in the data is derived from the scoreboard, because it is not explicitly provided.

The scoreboard data may be a stream of time-stamped events corresponding to the video from which it originated. It turns out that the timebase for the scoreboard data is the same as the timebase for the video pre-process module (play detection technique), so the two streams may be compared more readily. Because of the difficulty in determining the exact point within a play that causes a scoreboard event, and because the latency for entering the scoreboard event typically varies over a non-negative time range, the system preferably uses the scoreboard data to bound an individual play's associated scoreboard state. The associated scoreboard state may be a single discrete point, or it may be a range.

When the scoreboard cues are associated with the data stream associated with the video analysis provider (e.g., detected play data stream), the single scoreboard state or range of scoreboard states may be more accurately determined. These determinations of the scoreboard states are preferably evaluated in a deliberately broad fashion, resulting in looser, wider ranges being assigned, rather than tight single state assignments. The wider ranges reduces the resolution of this state information for some plays. This reduced resolution makes the comparison with the SportsTicker state information to be less definitive because there may not be a one to one correspondence. However, this is desirable because a comparison test can be performed between the SportsTicker state and the data from the video analysis provider (e.g, detected plays state), and the result may then be applied during the transition evaluation. The alternative (using narrow, single state assignments) may require that the dynamic programming technique examine the adjacent scoreboard states and then apply rules to determine the probability of various matches.

Referring to FIG. 16, the bounding of the scoreboard state for an individual detected play may be determined by one or more of the following rules:
Key:
$t_{start}$=DetectedPlayStartTimePoint
$t_{end}$=DetectedPlayEndTimePoint
$T_{pre}$=PrerollTimePeriod (when pitch count should not change)
$T_{hold}$=HoldTimePeriod (when play event should result in one or zero pitch count changes).

The following three scenarios are primarily for matching scoreboard events with detected plays.
First scenario:
The scoreboard events that occur between $t(n)_{start}+T_{pre}$ and $t(n)_{end}-T_{hold}$ define the range of scoreboard state for play n.
Second scenario:
In the case of multiple plays being concatenated into one detected play, there may be multiple scoreboard events, resulting in a range greater than one state.
Third scenario:
In the case of false alarm detected plays, there may be zero scoreboard events, which may assist in the synchronization process by skipping false alarms.

Figure 17:
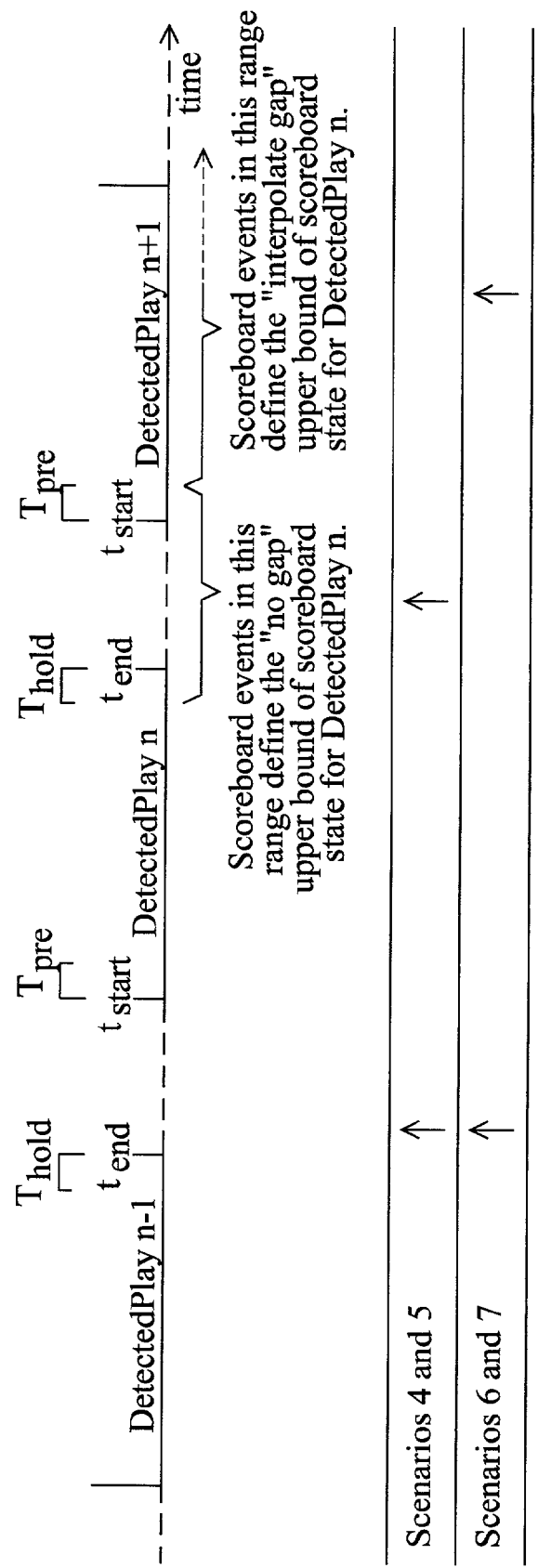
FIG. 17 illustrates a test for consistency.

Referring to FIG. 17, the following four scenarios are primarily used to test for consistency. Such consistency may be used to adjust the scoreboard state (e.g., for scoreboard corrections or drops in the scoreboard stream). Additionally, they may be used to supplement the main scoreboard event info to assist in synchronization. It is noted that all upper and lower bounding described is inclusive.
Fourth scenario:
Scoreboard events that occur after $t(n)_{end}-T_{hold}$ provide an upper bound to the scoreboard state for play n.
Fifth scenario:
Scoreboard events that occur before $t(n)_{start}+T_{pre}$ provide a lower bound to the scoreboard state for play n.

Sixth scenario:
Scoreboard events that occur after $t(n+1)_{start}+T_{pre}$ provide an upper bound to the scoreboard state for play n. If the preceding scoreboard event is not contiguous in value to this scoreboard event, then a gap in scoreboard data is assumed, and the upper bound for play n is set to a derived scoreboard state that would equal the last expected scoreboard value in the gap.

Seventh scenario:
Scoreboard events that occur before $t(n-1)_{end}-T_{hold}$ provide a lower bound the scoreboard state for play n. If the following scoreboard event is not contiguous in value to this scoreboard event, then a gap in scoreboard data is assumed, and the lower bound for play n is set to a derived scoreboard state that would equal the next expected scoreboard value in the gap.

The different sources of synchronization data sources may be merged into single set of synchronization data, having some degree of confidence. The preferred technique to merge the data involves using dynamic programming to search for an optimal path. In dynamic programming the axes of the graph are the sequences of sync cues from the various input data sources. The technique may be generalized to handle combining any two sources of data that comply with any one or more of the inputs previously described. The decision rules for the dynamic programming operation are embodied in the transition matrix. This matrix defines the transitions that are permitted from any node in the graph. The transition probability is a function of the transition arc (e.g. (1,1) corresponds to a diagonal arc), and the sync types for the events (SportsTicker and Detected Plays) associated with the destination of the transition. The preferred dynamic programming technique is described below. The output of the synchronization module provides a list of detected plays, augmented with SportsTicker data. Each line is a single play containing the following data fields:

(1) start and end frame numbers (or a selected set of one or more frames);
(2) play by play textual detection (detailing the play event in a formation that may vary according to the play type);
(3) scoreboard description (a fixed format for the duration of the game);
(4) inter play description (describing a game status or condition that changes between plays);
(5) game description information (such as the team names, the venue, etc.).

The Dynamic Programming grid may be arranged with synchronization cues from the SportsTicker on the X-axis and the Detected Play synchronization cues on the Y-axis. The X/Y grid is evaluated for a set of transitions to determine a suitable merge of the data.

The transitions may be defined in increasing degrees of detail. At each additional level of detail, a subset of the specific transitions may be more specifically defined than they were in the previous generalized level. In this way, the system may ascend through the detail levels to find the highest (most specific) definition for the current transition. The lowest level (most general) should cover more cases.

Each transition preferably has a probability factor (e.g., 0 to 1). When traveling across the grid, a particular path of transitions is evaluated by taking the product of all the individual transition probabilities. Transitions that should never happen may be given probability 0.0. For simplicity, all the transition probabilities out of a start node may be normalized with respect to the largest transition probability.

Figures 18, 19, 20:
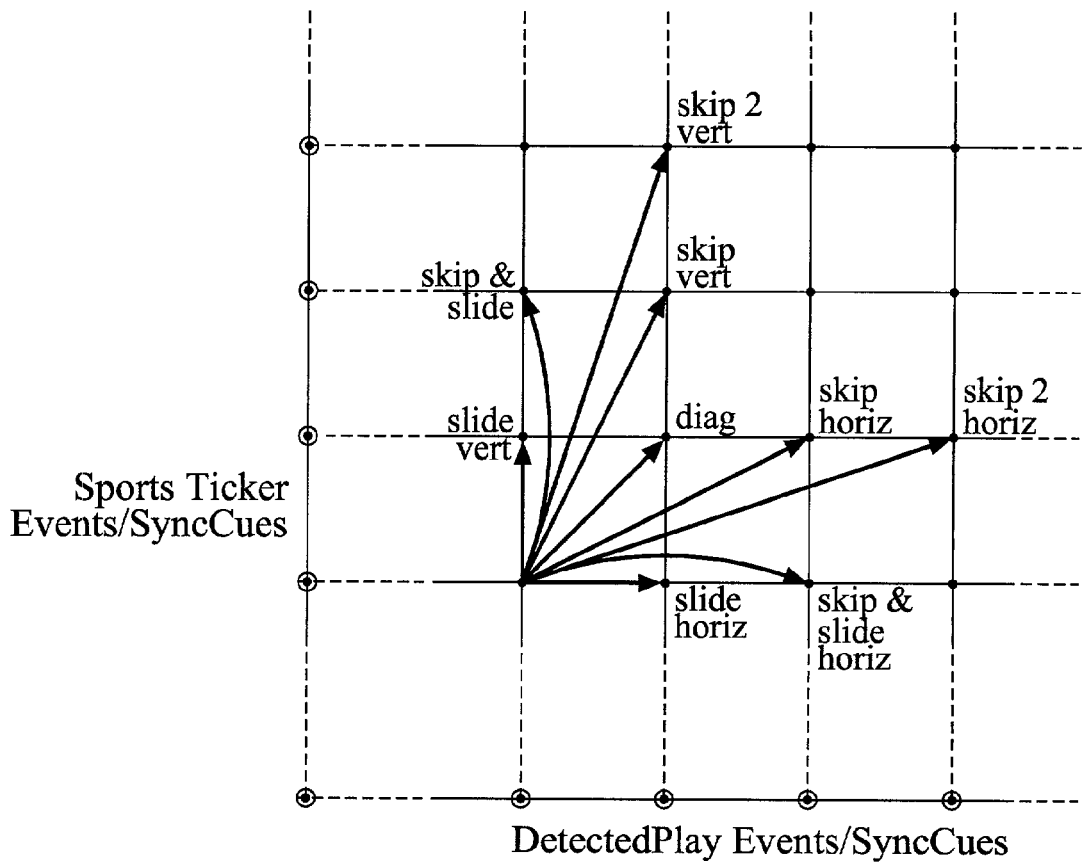
FIG. 18 illustrates a transaction arc.
FIG. 19 illustrates an arc transition matrix.
FIG. 20 illustrates a baseball type transition matrix.

Referring to FIG. 18, the transition arc may be defined as the vector from the start node to the end node for a single transition. It may be described using an x and y offset pair. For this system, one may assume that paths cannot travel backward. This means x and y are non-negative. Additionally, the system may constrain the system such that a transition is non-null, so the 0,0 transition is invalid. FIG. 19 illustrates an exemplary transition arc matrix.

An exemplary list of transitions are described below.

1,1 Diagonal:
This arc doesn't skip any cues from either axis. This should be the highest probability arc in this detail level (which may be normalized to 1.0).

1,0 Slide horizontal:
This arc repeats a Detected Play cue match with another SportsTicker cue. This occurs if one Detected Play actually is two plays concatenated together, or if two SportsTicker cues are generated for a single play. Probability: medium.

0,1 Slide vertical:
This arc repeats a SportsTicker cue match with another Detected Play cue. This occurs if one SportsTicker event actually contains two events, or if an actual play is split into two Detected Plays. Probability: very low.

2,0; 3,0; . . . Skip & Slide horizontal:
This arc skips one or more SportsTicker cues and then repeats a Detected Play cue match with another SportsTicker cue. This occurs if three or more SportsTicker cues in a row are generated for a single play, but the middle one(s) are not recognized by the system. This should not happen because all SportsTicker cues are designed to be recognized. Probability 0.0.

0,2; 0,3; . . . Skip & Slide vertical:
This arc skips one or more Detected Play cues and then repeats a SportsTicker cue match with another Detected Play. This occurs if one SportsTicker event actually contains three events, and the middle detected play is disregarded. We will not allow this to happen. (Instead, a series of 0,1 transitions may be allowed, though of low priority.) This transition has probability 0.0.

2,1; 3,1; . . . Skip horizontal:
This arc skips one or more SportsTicker cues. This occurs if a play is missed (not detected). For multiple missed plays, the probability can be calculated as the probability for 2,1 raised to the number of missed plays. Metrics for this probability are available (expect low).

1,2; 1,3; . . . Skip vertical:
This arc skips one or more Detected Play cues. This occurs if a Detected Play is a false alarm. For multiple false alarm plays, the probability can be calculated as the probability for 1,2 raised to the number of false alarms. Metrics for this probability are available (expect low).

2+,2+, . . . Skip horizontal and vertical:
This arc skips one or more cues from both axes in the same transition. At this detail level, this transition should never happen, so it will have probability 0.0.

The probability of a particular transition may be further described by the pair of sync cues referenced at the end node. In the case of baseball such sync cues may be, for example, as follows:

Key:
H=PitchWithFieldAction,
B=PitchWithoutFieldAction,
S=BaseSteal,
I=InningChange Description of pairs composed of SportsTicker, Detected-Play cue types may include, for example, the following:

H,H; B,B Matching pitch.

S,S Matching steal.

I,I Matching inning change.

H,B Pitch misclassified without Field Action—This occurs, for example, if the system misses a scene cut, if the camera doesn't follow the ball into the field, or if the SportsTicker event has mixed field action status (usually it is in the field but sometimes it is not). Probability: low.

B,H Pitch misclassified with Field Action—This occurs, for example, if the system falsely detects a scene cut, if the camera follows some irregular action that is unexpected by the algorithm, or if the SportsTicker event has mixed field action status (usually it is not in the field but sometimes it is). It is more likely that an irregular action or camera pan will false the detection, so probability is greater than P(H,B). Probability: low to medium.

HorB,S Pitch misclassified as base steal—This occurs, for example, if the system misses the pitcher camera angle and detect the other visual characteristics of a steal. Probability: low.

S,HorB Steal misclassified as a pitch—This occurs, for example, if the system falsely detects the pitcher camera angle, or if the steal is parted of a balked pitch where the pitcher tries to throw the runner out at base. This may be more common than P(HorB,S). Probability: low to medium.

HorBorS,I Play misclassified as inning change—This occurs, for example, if the system misses a long series of plays or there is an exceptionally long break between plays. Probability: low.

I,HorBorS Inning change misclassified as play—This occurs, for example, if the system falsely detects a play during commercial or backhaul video. Probability: low to medium.

FIG. 20 illustrates an exemplary baseball end node cue type transition matrix.

The scoreboard cue information may be available as auxiliary data in the dynamic programming sequences. After evaluating the transition probabilities and scores for each transition, the scoreboard cue information may be compared and the result may be used to further qualify the transition.

For a baseball prototype, there are four exemplary cases:

In range

This is the normal case, with normalized probability 1.0.
"Pitch count" out of range In the iiobs (inning, out, ball, strike) format, this occurs if the delta magnitude $|\Delta|$ is in the range $100>|\Delta|>1$.

"Out count" out of range

This occurs if $1000>|\Delta|>100$.

"Inning count" out of range

This occurs if $10000>|\Delta|>1000$.

The transition matrix inputs may be described, as follows. Referring to FIG. 21, the first section may describe valid transition arcs. Referring to FIG. 22, the next section may describe the sync types for the X axis, sports ticker. The synch labels may be the enumerated synch types from SportsTicker. Referring to FIG. 23, the next section may describe the sync types of the Y axis, detected plays. The synch labels may be the enumerated synch types from SportsTicker. Referring to FIG. 24, the next section may describe the transition probabilities for all the combinations of the given synch types for the X and Y axes. The number should equal $n_a*n_x*n_y$. The TransDesc may be a readable description of this transition. Referring to FIG. 25, the next section may describe the scoreboard transition matrix. The "d" fields are the minimum delta magnitude for that transition (i.e., 0,1,100,1000).

The present inventors came to the conclusion that once rich metadata is synchronized with the video using a suitable technique (automated or manual), it may be used in adapting the video content to channel conditions, device resources, usage conditions, and user preferences. There is an increasing need for such adaptation of content as access to the same content with various different devices, such as cellular phones and personal digital assistants with varying power, processor, and memory capacity, over various wired and wireless networks with different transmission speeds are becoming a reality with the emergence of new wireless communication technologies such as wireless LAN, WAN and next generation cellular networks. Given this complex and dynamic usage environment and the desire to provide the best possible quality of content to users at all times, there is a need for adapting the content accordingly.

The information in the synchronized metadata provides information for enabling smart adaptation of the content so that users receive information that fits best to their usage conditions and their preferences, thus maintaining the best possible quality of content information under changing conditions. In other words, the metadata, once in synchronization with the audiovisual content, provide the hints for how content should be adapted. Content adaptation may be implemented by allocating unequal number of bits, where segments whose contents are less in importance are allocated relatively less number of bits, by employing unequal error protection in error prone channels, by strongly protecting high priority segments, by selective retransmission of only important segments in case of data loss, by transmitter power control (i.e., responding to power restrictions of the transmitting device at any given time), or by dropping segments of less importance by summarizing the video by its important segments only. For example, in transmitting a baseball broadcast video, play segments are of higher priority than non-play segments. On the other hand, the rich metadata provides even finer granularity and control for adaptation. Among the play segments, for example, home runs are highest in priority. The content adaptation process can also utilize known preferences of a particular user, for example by giving higher priority for the plays involving a particular pitcher. Such smart adaptation of content is made possible by using the information provided by the metadata synchronized with the important segments of the audiovisual content using the methods of this invention.

Figure 26:
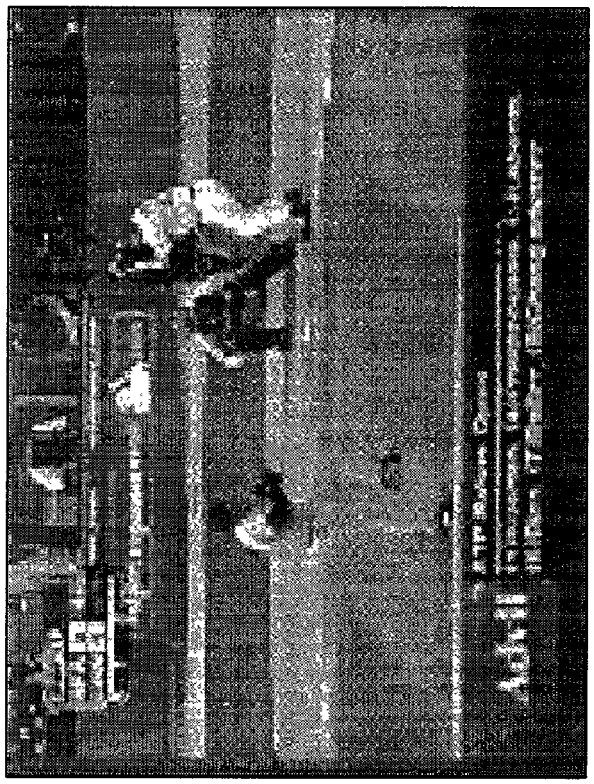
FIG. 26 illustrates a video interface.

Referring to FIG. 26, the summarized video sequence may be presented together with the synchronized data, which was previously unsynchronized. Typically, while presenting a particular segment of the video stream the corresponding synchronized data is likewise presented. In this manner, the viewer may observe the video while simultaneously viewing the associated data in a timely and efficient manner.

In another embodiment, the system permits the viewing of a previously viewed segment of the video, such as by rewinding or otherwise selecting a previous segment in some manner. In the event of viewing a previously viewed segment the corresponding data is likewise presented to the viewer, which was typically previously presented to the viewer when originally viewing the previously viewed segment.

In another embodiment, the system may include a selector (or otherwise selectable) that permits the viewer to modify the associated data that is presented together with the segments. For example, during a particular segment the amount of presented data may be modified. Some viewers may desire a complete or otherwise a significant amount of data to be presented, while other viewers may desire less data to be presented.

In another embodiment, the system may include modification of the amount of data presented to the viewer based, at least in part, upon the duration of the associated segment. For example, a relatively limited amount of data may be presented together with a short segment whereas a relatively large amount of data may be presented together with a long segment, even if the amount of data associated with both the short segment and long segment is the same.

In another embodiment, the system may modify the speed at which the data is presented to the viewer based, at least in part, upon the duration of the associated segment and/or the amount of data. For example, a relatively limited amount of data may be presented at a slower speed for a given segment duration whereas a relatively large amount of data may be presented at a faster rate for the given segment duration. The presentation speed, may be for example, the scrolling speed of the display or otherwise the duration that a message is displayed.

In another embodiment, the system may selectively select the data that is presented to the viewer based upon a profile of the viewer. For example, a user profile that indicates that the viewer is a statistics fanatic may result in the presentation of statistics that would not have otherwise been presented.

In another embodiment, the system or the viewer may select the number of lines of data that is presented and accordingly scrolled with the presentation of the video. For example, if the viewer reads slowly more lines may be suitable. In addition, if a significant number of lines are selected then the viewer may pay closer attention to the video while still being able to periodically read desirable associated data.

In another embodiment, the present inventors came to the conclusion that once rich metadata is synchronized with video and used to form an enriched video description, this rich metadata can be used in indexing the video as it is stored in a database. Users can then place queries for specific play events and retrieve from the database corresponding video and video segments containing the desired events.

Figure 27:
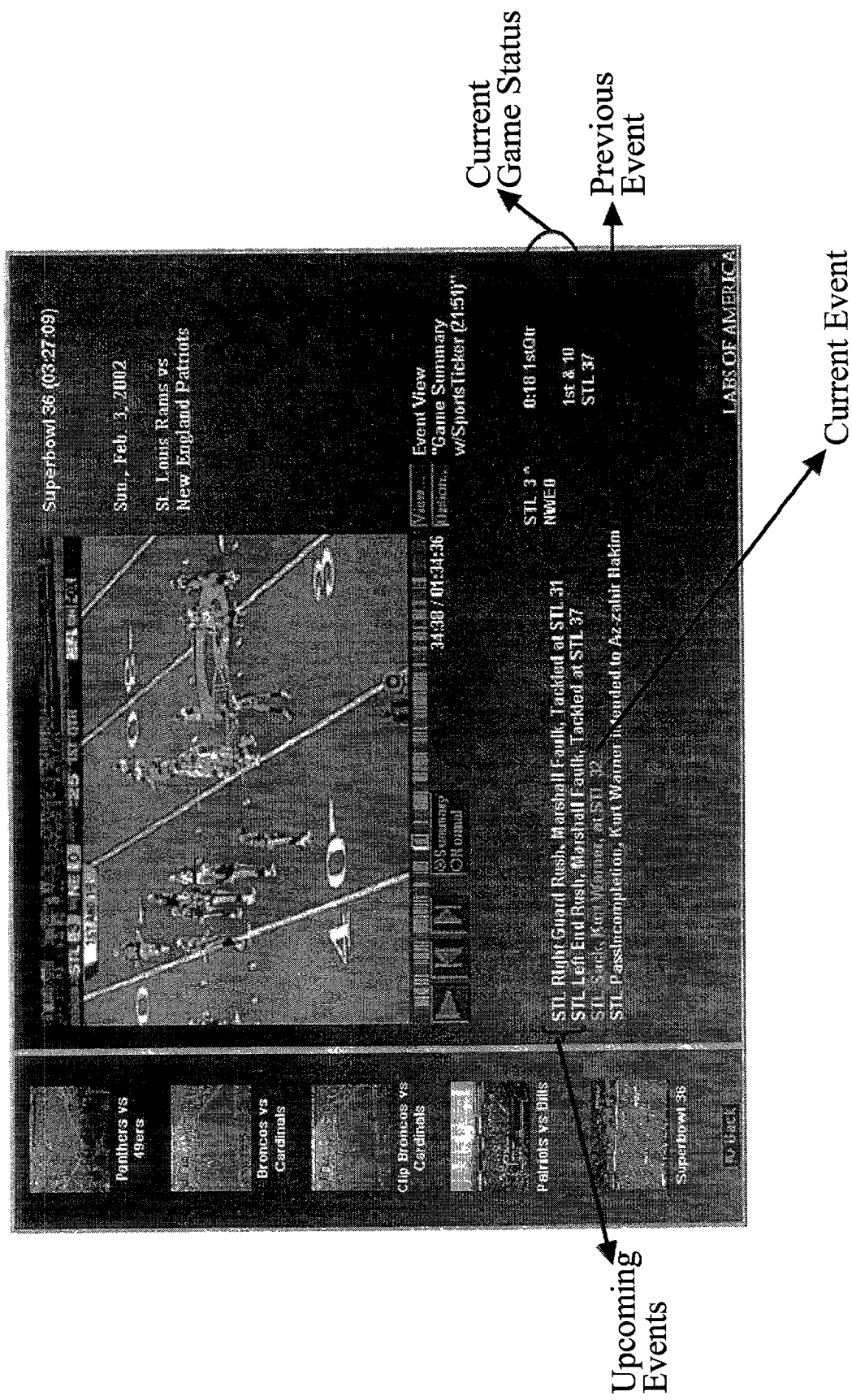
FIG. 27 illustrates a video interface.

Referring to FIG. 27, a particular browser implementation and presentation of data is illustrated. The data dynamically rolls (e.g., scrolls) on the screen in synchronization with the events as the event segments are played one after another. The data window is below the video playback window in the bottom half of the screen and contains textual data that is rolled (e.g., scrolls) downward in synchronization with the video playback. The data for the event that is currently playing back in the video window is preferably displayed in a distinctive color font. In addition, the data may include data for the previous play that has been played back. Also, the data may include data for the next event to be played. The game status information may be at the right hand side of the rolling text window are also synchronized with the video playback and updated accordingly All references cited or referenced herein are hereby incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

APPENDIX A s0301NFLPP r q   bc-nfl-u-newengland STLNWE00000002150033    02-03 0000

FIP,20020203,C,Play,1,1,NWE,0,0,NA,-1,-1,1500,N
FIP,20020203,C,VClub,RAMS,St. Louis Rams,STL
FIP,20020203,C,HClub,PATRIO,New England Patriots,NWE
FIP,20020203,C,Heading,St. Louis Rams vs New England Patriots at Louisiana Superdome,02/03/2002
FIP,20020203,C,CoinToss,NWE,,NWE, st 02-03-02 16:20 et s0301NFLPP
r q   bc-nfl-u-newengland STLNWE00000002PROG33    02-03 0000

FIP,20020203,C,Play,44,44,NWE,0,0,NWE,30,70,1500,N
FIP,20020203,C,Kickoff,4,3351,Adam Vinatieri,N,-1,-1,NA,NWE,30,30,STL,1,99,-1,-1,NA,-1,-1,NA,-1,-1,NA,
FIP,20020203,C,KickoffReturn,83,4767,Yo Murphy,STL,1,99,STL,39,61,38,Tackled,45,2239,Otis Smith,-1,-1,NA,-1,-1,NA,N,N st 02-03-02 18:40 et s0301NFLPP
r q   bc-nfl-u-newengland STLNWE00000002144833    02-03 0000

FIP,20020203,C,Play,66,66,STL,1,10,STL,39,61,1448,N
FIP,20020203,C,PassIncompletion,13,5692,Kurt Warner,88,5904,Torry Holt,-1,-1,NA st 02-03-02 18:40 et s0301NFLPP
r q  bc-nfl-u-newengland STLNWE00000002143933   02-03 0000

FIP,20020203,C,Play,88,88,STL,2,10,STL,39,61,1439,N
FIP,20020203,C,PassCompletion,13,5692,Kurt Warner,18
FIP,20020203,C,PassReception,88,5904,Torry Holt,STL,39,61,NWE,43,43,18,Tackled,34,4910,Tebucky Jones,-1,-1,NA,-1,-1,NA,N,N st 02-03-02 18:41 et s0301NFLPP
r q  bc-nfl-u-newengland STLNWE00000002PROG33   02-03 0000

FIP,20020203,C,Play,109,109,STL,1,10,NWE,43,43,1404,N
FIP,20020203,C,Rush,Left Tackle,28,1712,Marshall Faulk,NWE,43,43,NWE,41,41,2,Tackled,54,3547,Tedy Bruschi,-1,-1,NA,-1,-1,NA,N,N st 02-03-02 18:42 et s0301NFLPP
r q  bc-nfl-u-newengland STLNWE00000002132333   02-03 0000

FIP,20020203,C,Play,134,134,STL,2,8,NWE,41,41,1323,N
FIP,20020203,C,PassIncompletion,13,5692,Kurt Warner,88,5904,Torry Holt,-1,-1,NA
FIP,20020203,C,Penalty,Offensive Pass Interference,STL,84,3502,Ernie Conwell,Accepted,,,-1,-1,NA,,NWE,41,41,STL,49,51,10,N,Y st 02-03-02 18:43 et

```
  s0301NFLPP
r q  bc-nfl-u-newengland STLNWE00000002131233    02-03 0000

FIP,20020203,C,Play,163,163,STL,2,18,STL,49,51,1312,N
FIP,20020203,C,PassIncompletion,13,5692,Kurt Warner,88,5904,Torry Holt,-1,-1,NA st 02-03-02 18:44 et s0301NFLPP
r q  bc-nfl-u-newengland STLNWE00000002130533    02-03 0000

FIP,20020203,C,Play,181,181,STL,3,18,STL,49,51,1305,N
FIP,20020203,C,PassCompletion,13,5692,Kurt Warner,11
FIP,20020203,C,PassReception,28,1712,Marshall
Faulk,STL,49,51,NWE,40,40,11,Tackled,98,3629,Anthony  Pleasant,36,3552,Lawyer
Milloy,-1,-1,NA,N,N st 02-03-02 18:44 et s0301NFLPP
r q  bc-nfl-u-newengland STLNWE00000002122133    02-03 0000

FIP,20020203,C,Play,202,202,STL,4,7,NWE,40,40,1221,N
FIP,20020203,C,Punt,4,7097,John Baker,45,1484,Jeff Robinson,NWE,3,3,-1,-1,NA,-1,-
1,NA,-1,-1,NA,Ball out of bounds st 02-03-02 18:45 et s0301NFLPP
r q  bc-nfl-u-newengland STLNWE00000002PROG33    02-03 0000
```

FIP,20020203,C,Play,224,224,NWE,1,10,NWE,3,97,1213,N
FIP,20020203,C,PassCompletion,12,7042,Tom Brady,21
FIP,20020203,C,PassReception,80,2034,Troy Brown,NWE,3,97,NWE,24,76,21,Tackled,20,3994,Kim Herring,52,7888,Tommy Polley,-1,-1,NA,N,N st 02-03-02 18:48 et s0301NFLPP
r q  bc-nfl-u-newengland STLNWE00000002113933    02-03 0000

FIP,20020203,C,Play,245,245,NWE,1,10,NWE,24,76,1139,N
FIP,20020203,C,Rush,Left End,32,4045,Antowain Smith,NWE,24,76,NWE,33,67,9,Tackled,66,7499,Brian Young,-1,-1,NA,-1,-1,NA,N,N st 02-03-02 18:48 et s0301NFLPP
r q  bc-nfl-u-newengland STLNWE00000002105433    02-03 0000

FIP,20020203,C,Play,270,270,NWE,2,1,NWE,33,67,1054,N
FIP,20020203,C,PassCompletion,12,7042,Tom Brady,10
FIP,20020203,C,PassReception,80,2034,Troy Brown,NWE,33,67,NWE,43,57,10,Tackled,35,1055,Aeneas  Williams,31,7877,Adam Archuleta,-1,-1,NA,N,N st 02-03-02 18:49 et s0301NFLPP
r q  bc-nfl-u-newengland STLNWE00000002101533    02-03 0000

FIP,20020203,C,Play,291,291,NWE,1,10,NWE,43,57,1015,N

FIP,20020203,C,Rush,Right    Guard,32,4045,Antowain Smith,NWE,43,57,NWE,46,54,3,Tackled,59,5718,London Fletcher,-1,-1,NA,-1,-1,NA,N,N st 02-03-02 18:50 et s0301NFLPP
r q  bc-nfl-u-newengland STLNWE00000002093733    02-03 0000

FIP,20020203,C,Play,316,316,NWE,2,7,NWE,46,54,0937,N
FIP,20020203,C,PassCompletion,12,7042,Tom Brady,-1
FIP,20020203,C,PassReception,33,5919,Kevin    Faulk,NWE,46,54,NWE,45,55,-1,Tackled,32,5945,Dre Bly,-1,-1,NA,-1,-1,NA,N,N st 02-03-02 18:50 et s0301NFLPP
r q  bc-nfl-u-newengland STLNWE00000002085233    02-03 0000

FIP,20020203,C,Play,337,337,NWE,3,8,NWE,45,55,0852,N
FIP,20020203,C,Rush,Left    End,12,7042,Tom Brady,NWE,45,55,NWE,48,52,3,Tackled,66,7499,Brian Young,-1,-1,NA,-1,-1,NA,N,N st 02-03-02 18:51 et s0301NFLPP
r q  bc-nfl-u-newengland STLNWE00000002082633    02-03 0000

FIP,20020203,C,Play,358,358,NWE,4,5,NWE,48,52,0826,N
FIP,20020203,C,Punt,13,4092,Ken Walter,66,7061,Lonie Paxton,STL,0,0,-1,-1,NA,-1,-1,NA,-1,-1,NA,Touchback st 02-03-02 18:52 et s0301NFLPP
r q  bc-nfl-u-newengland STLNWE00000002PROG33 02-03 0000

FIP,20020203,C,Play,375,375,STL,1,10,STL,20,80,0815,N
FIP,20020203,C,PassCompletion,13,5692,Kurt Warner,8
FIP,20020203,C,PassReception,88,5904,Torry Holt,STL,20,80,STL,28,72,8,Pushed out of bounds,45,2239,Otis Smith,-1,-1,NA,-1,-1,NA,N,N st 02-03-02 18:54 et s0301NFLPP
r q  bc-nfl-u-newengland STLNWE00000002074733 02-03 0000

FIP,20020203,C,Play,396,396,STL,2,2,STL,28,72,0747,N
FIP,20020203,C,Rush,Right Tackle,28,1712,Marshall Faulk,STL,28,72,STL,30,70,2,Tackled,55,2061,Willie Mcginest,93,8344,Richard Seymour,-1,-1,NA,N,N st 02-03-02 18:55 et s0301NFLPP
r q  bc-nfl-u-newengland STLNWE00000002070433 02-03 0000

FIP,20020203,C,Play,421,421,STL,1,10,STL,30,70,0704,N
FIP,20020203,C,PassCompletion,13,5692,Kurt Warner,3
FIP,20020203,C,PassReception,80,2474,Isaac Bruce,STL,30,70,STL,33,67,3,Tackled,24,2057,Ty Law,-1,-1,NA,-1,-1,NA,N,N st 02-03-02 18:56 et s0301NFLPP
r q  bc-nfl-u-newengland STLNWE00000002062433    02-03 0000

FIP,20020203,C,Play,442,442,STL,2,7,STL,33,67,0624,N
FIP,20020203,C,Rush,Left     End,28,1712,Marshall Faulk,STL,33,67,STL,36,64,3,Tackled,45,2239,Otis Smith,-1,-1,NA,-1,-1,NA,N,N st 02-03-02 18:56 et s0301NFLPP
r q  bc-nfl-u-newengland STLNWE00000002054233    02-03 0000

FIP,20020203,C,Play,467,467,STL,3,4,STL,36,64,0542,N
FIP,20020203,C,PassCompletion,13,5692,Kurt Warner,11
FIP,20020203,C,PassReception,80,2474,Isaac Bruce,STL,36,64,STL,47,53,11,Tackled,36,3552,Lawyer Milloy,-1,-1,NA,-1,-1,NA,N,N
FIP,20020203,C,Penalty,Defensive Holding,NWE,27,1899,Terrell Buckley,Declined,,,-1,-1,NA,,NA,-1,-1,NA,-1,-1,0,N,N st 02-03-02 18:57 et s0301NFLPP
r q  bc-nfl-u-newengland STLNWE00000002PROG33    02-03 0000

FIP,20020203,C,Play,499,499,STL,1,10,STL,47,53,0517,N
FIP,20020203,C,PassCompletion,13,5692,Kurt Warner,14
FIP,20020203,C,PassReception,28,1712,Marshall Faulk,STL,47,53,NWE,39,39,14,Ran out of bounds,93,8344,Richard Seymour,-1,-1,NA,-1,-1,NA,N,N st 02-03-02 18:58 et

```
    s0301NFLPP
r q  bc-nfl-u-newengland STLNWE00000002044833   02-03 0000

FIP,20020203,C,Play,524,524,STL,1,10,NWE,39,39,0448,N
FIP,20020203,C,PassCompletion,13,5692,Kurt Warner,-1
FIP,20020203,C,PassReception,84,3502,Ernie   Conwell,NWE,39,39,NWE,40,40,-
1,Tackled,95,2511,Roman Phifer,91,3677,Bobby Hamilton,-1,-1,NA,N,N st 02-03-02 18:59 et s0301NFLPP
r q  bc-nfl-u-newengland STLNWE00000002040533   02-03 0000

FIP,20020203,C,Play,549,549,STL,2,11,NWE,40,40,0405,N
FIP,20020203,C,PassCompletion,13,5692,Kurt Warner,8
FIP,20020203,C,PassReception,42,6043,James
Hodgins,NWE,40,40,NWE,32,32,8,Tackled,24,2057,Ty Law,-1,-1,NA,-1,-1,NA,N,N st 02-03-02 18:59 et s0301NFLPP
r q  bc-nfl-u-newengland STLNWE00000002032133   02-03 0000

FIP,20020203,C,Play,570,570,STL,3,3,NWE,32,32,0321,N
FIP,20020203,C,PassIncompletion,13,5692,Kurt Warner,87,2775,Ricky Proehl,-1,-1,NA st 02-03-02 19:00 et s0301NFLPP
r q  bc-nfl-u-newengland STLNWE00300002031533   02-03 0000
```

FIP,20020203,C,Play,592,592,STL,4,3,NWE,32,32,0315,N
FIP,20020203,C,FieldGoal,14,3165,Jeff Wilkins,45,1484,Jeff Robinson,87,2775,Ricky Proehl,NWE,40,40,Made field goal,-1,-1,NA, st 02-03-02 19:01 et s0301NFLPP
r q  bc-nfl-u-newengland STLNWE00300002PROG33    02-03 0000

FIP,20020203,C,Play,611,611,STL,0,0,STL,30,70,0310,N
FIP,20020203,C,Kickoff,14,3165,Jeff Wilkins,N,-1,-1,NA,STL,30,30,NWE,-2,102,-1,-1,NA,-1,-1,NA,-1,-1,NA,
FIP,20020203,C,KickoffReturn,35,7060,Patrick    Pass,NWE,-2,102,NWE,19,81,21,Tackled,55,1921,Mark Fields,-1,-1,NA,-1,-1,NA,N,N st 02-03-02 19:04 et s0301NFLPP
r q  bc-nfl-u-newengland STLNWE00300002025933    02-03 0000

FIP,20020203,C,Play,633,633,NWE,1,10,NWE,19,81,0259,N
FIP,20020203,C,PassIncompletion,12,7042,Tom    Brady,85,7181,Jermaine Wiggins,66,7499,Brian Young st 02-03-02 19:06 et s0301NFLPP
r q  bc-nfl-u-newengland STLNWE00300002025533    02-03 0000

FIP,20020203,C,Play,651,651,NWE,2,10,NWE,19,81,0255,N

FIP,20020203,C,Rush,Left Tackle,32,4045,Antowain Smith,NWE,19,81,NWE,24,76,5,Tackled,72,2565,Chidi Ahanotu,31,7877,Adam Archuleta,-1,-1,NA,N,N st 02-03-02 19:06 et s0301NFLPP
r q  bc-nfl-u-newengland STLNWE00300002021333   02-03 0000

FIP,20020203,C,Play,672,672,NWE,3,5,NWE,24,76,0213,N
FIP,20020203,C,PassIncompletion,12,7042,Tom Brady,33,5919,Kevin Faulk,-1,-1,NA st 02-03-02 19:07 et s0301NFLPP
r q  bc-nfl-u-newengland STLNWE00300002020833   02-03 0000

FIP,20020203,C,Play,690,690,NWE,4,5,NWE,24,76,0208,N
FIP,20020203,C,Punt,13,4092,Ken Walter,66,7061,Lonie Paxton,STL,23,23,-1,-1,NA,-1,-1,NA,-1,-1,NA,
FIP,20020203,C,PuntReturn,32,5945,Dre Bly,STL,23,77,STL,22,78,-1,Tackled,20,-1,,-1,-1,NA,-1,-1,NA,N,N st 02-03-02 19:08 et s0301NFLPP
r q  bc-nfl-u-newengland STLNWE00300002PROG33   02-03 0000

FIP,20020203,C,Play,690,690,NWE,4,5,NWE,24,76,0208,N
FIP,20020203,C,Punt,13,4092,Ken Walter,66,7061,Lonie Paxton,STL,23,23,-1,-1,NA,-1,-1,NA,-1,-1,NA, FIP,20020203,C,PuntReturn,32,5945,Dre   Bly,STL,23,77,STL,22,78,-1,Tackled,30,3537,Je'rod Cherry,-1,-1,NA,-1,-1,NA,N,N st 02-03-02 19:09 et s0301NFLPP
r q  bc-nfl-u-newengland STLNWE00300002PROG33   02-03 0000

FIP,20020203,C,Play,715,715,STL,1,10,STL,22,78,0159,N
FIP,20020203,C,Rush,Left    Guard,28,1712,Marshall Faulk,STL,22,78,STL,29,71,7,Tackled,95,2511,Roman Phifer,34,4910,Tebucky Jones,-1,-1,NA,N,N st 02-03-02 19:10 et s0301NFLPP
r q  bc-nfl-u-newengland STLNWE00300002013033   02-03 0000

FIP,20020203,C,Play,736,736,STL,2,3,STL,29,71,0130,N
FIP,20020203,C,Rush,Right    Guard,28,1712,Marshall Faulk,STL,29,71,STL,31,69,2,Tackled,98,3629,Anthony    Pleasant,-1,-1,NA,-1,-1,NA,N,N st 02-03-02 19:11 et s0301NFLPP
r q  bc-nfl-u-newengland STLNWE00300002005533   02-03 0000

FIP,20020203,C,Play,757,757,STL,3,1,STL,31,69,0055,N
FIP,20020203,C,Rush,Left    End,28,1712,Marshall Faulk,STL,31,69,STL,37,63,6,Tackled,24,2057,Ty Law,-1,-1,NA,-1,-1,NA,N,N st 02-03-02 19:12 et s0301NFLPP
r q  bc-nfl-u-newengland STLNWE00300002001833    02-03 0000

FIP,20020203,C,Play,778,778,STL,1,10,STL,37,63,0018,N
FIP,20020203,C,Sack,13,5692,Kurt Warner,STL,37,63,STL,32,68,-5,N,91,3677,Bobby Hamilton,-1,-1,NA st 02-03-02 19:12 et s0301NFLPP
r q  bc-nfl-u-newengland STLNWE00300002150033    02-03 0000

FIP,20020203,C,Play,797,797,NWE,0,0,NA,-1,-1,1500,N
FIP,20020203,C,QtrSum,1,STL,3,951,2,3,0,5,4,2,0,0,NWE,0,509,0,2,0,2,2,0,0,0 st 02-03-02 19:13 et s0301NFLPP
r q  bc-nfl-u-newengland STLNWE00300004PROG33    02-03 0000

FIP,20020203,C,Play,813,813,STL,2,15,STL,32,68,1500,N
FIP,20020203,C,PassIncompletion,13,5692,Kurt   Warner,81,5700,Az-zahir Hakim,22,2936,Terrance Shaw st 02-03-02 19:16 et s0301NFLPP
r q  bc-nfl-u-newengland STLNWE00300004145433    02-03 0000

FIP,20020203,C,Play,831,831,STL,3,15,STL,32,68,1454,N
FIP,20020203,C,PassCompletion,13,5692,Kurt Warner,29
FIP,20020203,C,PassReception,81,5700,Az-zahir Hakim,STL,32,68,NWE,39,39,29,Tackled,27,1899,Terrell Buckley,-1,-1,NA,-1,-1,NA,N,N st 02-03-02 19:19 et s0301NFLPP
r q bc-nfl-u-newengland STLNWE00300004140833    02-03 0000

FIP,20020203,C,Play,852,852,STL,1,10,NWE,39,39,1408,N
FIP,20020203,C,PassIncompletion,13,5692,Kurt Warner,84,3502,Ernie Conwell,36,3552,Lawyer Milloy st 02-03-02 19:19 et s0301NFLPP
r q bc-nfl-u-newengland STLNWE00300004140233    02-03 0000

FIP,20020203,C,Play,874,874,STL,2,10,NWE,39,39,1402,N
FIP,20020203,C,Rush,Up the Middle,13,5692,Kurt Warner,NWE,39,39,NWE,34,34,5,Tackled,98,3629,Anthony Pleasant,-1,-1,NA,-1,-1,NA,N,N st 02-03-02 19:20 et s0301NFLPP
r q bc-nfl-u-newengland STLNWE00300004132233    02-03 0000

```
FIP,20020203,C,Play,895,895,STL,3,5,NWE,34,34,1322,N
FIP,20020203,C,PassIncompletion,13,5692,Kurt    Warner,-1,-1,NA,93,8344,Richard
Seymour st 02-03-02 19:21 et s0301NFLPP
r q  bc-nfl-u-newengland STLNWE00300004PROG33    02-03 0000

FIP,20020203,C,Play,895,895,STL,3,5,NWE,34,34,1322,N
FIP,20020203,C,PassIncompletion,13,5692,Kurt    Warner,81,5700,Az-zahir
Hakim,93,8344,Richard Seymour st 02-03-02 19:21 et s0301NFLPP
r q  bc-nfl-u-newengland STLNWE00300004131733    02-03 0000

FIP,20020203,C,Play,913,913,STL,4,5,NWE,34,34,1317,N
FIP,20020203,C,FieldGoal,14,3165,Jeff Wilkins,45,1484,Jeff Robinson,87,2775,Ricky
Proehl,NWE,42,58,Missed field goal,-1,-1,NA,Wide Left st 02-03-02 19:22 et s0301NFLPP
r q  bc-nfl-u-newengland STLNWE00300004PROG33    02-03 0000

FIP,20020203,C,Play,933,933,NWE,1,10,NWE,42,58,1312,N
FIP,20020203,C,Rush,Right    End,32,4045,Antowain
Smith,NWE,42,58,NWE,46,54,4,Tackled,52,7888,Tommy Polley,-1,-1,NA,-1,-1,NA,N,N
``` st 02-03-02 19:24 et s0301NFLPP
r q  bc-nfl-u-newengland STLNWE00300004123633    02-03 0000

FIP,20020203,C,Play,954,954,NWE,2,6,NWE,46,54,1236,N
FIP,20020203,C,Rush,Left    Guard,32,4045,Antowain
Smith,NWE,46,54,NWE,49,51,3,Tackled,90,2463,Jeff Zgonina,72,2565,Chidi Ahanotu,-
1,-1,NA,N,N st 02-03-02 19:25 et s0301NFLPP
r q  bc-nfl-u-newengland STLNWE00300004115733    02-03 0000

FIP,20020203,C,Play,975,975,NWE,3,3,NWE,49,51,1157,N
FIP,20020203,C,PassIncompletion,12,7042,Tom    Brady,86,4483,David
Patten,20,3994,Kim Herring
FIP,20020203,C,Penalty,Defensive Holding,STL,20,3994,Kim Herring,Accepted,,,-1,-
1,NA,,NWE,49,49,STL,46,54,5,N,Y st 02-03-02 19:26 et s0301NFLPP
r q  bc-nfl-u-newengland STLNWE00300004115033    02-03 0000

FIP,20020203,C,Play,1004,1004,NWE,1,10,STL,46,46,1150,N
FIP,20020203,C,PassIncompletion,12,7042,Tom Brady,33,5919,Kevin Faulk,-1,-1,NA
FIP,20020203,C,Penalty,Offensive Holding,NWE,77,1511,Mike Compton,Accepted,,,-1,-
1,NA,,STL,46,46,NWE,44,56,10,N,Y st 02-03-02 19:27 et

```
    s0301NFLPP
r q  bc-nfl-u-newengland STLNWE00300004114533    02-03 0000

FIP,20020203,C,Play,1033,1033,NWE,1,20,NWE,44,56,1145,N
FIP,20020203,C,Rush,Right    End,32,4045,Antowain    Smith,NWE,44,56,NWE,41,59,-
3,Tackled,21,4513,Dexter Mccleon,31,7877,Adam Archuleta,-1,-1,NA,N,N st 02-03-02 19:27 et s0301NFLPP
r q  bc-nfl-u-newengland STLNWE00300004110833    02-03 0000

FIP,20020203,C,Play,1054,1054,NWE,2,23,NWE,41,59,1108,N
F I P , 2 0 0 2 0 2 0 3 , C , R u s h , L e f t     G u a r d , 3 2 , 4 0 4 5 , A n t o w a i n
Smith,NWE,41,59,NWE,47,53,6,Tackled,59,5718,London Fletcher,58,2241,Don Davis,-
1,-1,NA,N,N st 02-03-02 19:28 et s0301NFLPP
r q  bc-nfl-u-newengland STLNWE00300004102733    02-03 0000

FIP,20020203,C,Play,1075,1075,NWE,3,17,NWE,47,53,1027,N
FIP,20020203,C,PassIncompletion,12,7042,Tom Brady,-1,-1,NA,-1,-1,NA st 02-03-02 19:29 et s0301NFLPP
r q  bc-nfl-u-newengland STLNWE00300004102033    02-03 0000
```

FIP,20020203,C,Play,1093,1093,NWE,4,17,NWE,47,53,1020,N
FIP,20020203,C,Punt,13,4092,Ken Walter,66,7061,Lonie Paxton,STL,12,12,-1,-1,NA,-1,-1,NA,-1,-1,NA,
FIP,20020203,C,PuntReturn,32,5945,Dre Bly,STL,12,88,STL,19,81,7,Tackled,50,4623,Mike Vrabel,-1,-1,NA,-1,-1,NA,N,N st 02-03-02 19:30 et s0301NFLPP
r q  bc-nfl-u-newengland STLNWE00300004PROG33    02-03 0000

FIP,20020203,C,Play,1118,1118,STL,1,10,STL,19,81,1008,N
FIP,20020203,C,Rush,Left Tackle,28,1712,Marshall Faulk,STL,19,81,STL,24,76,5,Tackled,51,1910,Bryan Cox,-1,-1,NA,-1,-1,NA,N,N st 02-03-02 19:32 et s0301NFLPP
r q  bc-nfl-u-newengland STLNWE00300004093033    02-03 0000

FIP,20020203,C,Play,1139,1139,STL,2,5,STL,24,76,0930,N
FIP,20020203,C,Rush,Right End,28,1712,Marshall Faulk,STL,24,76,STL,39,61,15,Ran out of bounds,34,4910,Tebucky Jones,-1,-1,NA,-1,-1,NA,N,N st 02-03-02 19:33 et s0301NFLPP
r q  bc-nfl-u-newengland STLNWE00300604085833    02-03 0000

FIP,20020203,C,Play,1160,1160,STL,1,10,STL,39,61,0858,N
FIP,20020203,C,PassInterception,13,5692,Kurt Warner FIP,20020203,C,PassInterceptionReturn,24,2057,Ty Law,STL,47,47,STL,0,0,47,Touchdown,-1,-1,NA,-1,-1,NA,-1,-1,NA,N,N st 02-03-02 19:34 et s0301NFLPP
r q  bc-nfl-u-newengland STLNWE00300704PROG33    02-03 0000

FIP,20020203,C,Play,1180,1180,NWE,0,0,STL,2,2,0849,N
FIP,20020203,C,ExtraPoint,4,3351,Adam Vinatieri,66,7061,Lonie Paxton,13,4092,Ken Walter,Score (Good),-1,-1,NA st 02-03-02 19:34 et s0301NFLPP
r q  bc-nfl-u-newengland STLNWE00300704PROG33    02-03 0000

FIP,20020203,C,Play,1196,1196,NWE,0,0,NWE,30,70,0849,N
FIP,20020203,C,Kickoff,4,3351,Adam Vinatieri,N,-1,-1,NA,NWE,30,30,STL,7,93,-1,-1,NA,-1,-1,NA,-1,-1,NA,
FIP,20020203,C,KickoffReturn,83,4767,Yo Murphy,STL,7,93,STL,28,72,21,Tackled,30,3537,Je'rod Cherry,-1,-1,NA,-1,-1,NA,N,N st 02-03-02 19:37 et s0301NFLPP
r q  bc-nfl-u-newengland STLNWE00300704083933    02-03 0000

FIP,20020203,C,Play,1218,1218,STL,1,10,STL,28,72,0839,N
FIP,20020203,C,Rush,Left End,28,1712,Marshall Faulk,STL,28,72,STL,30,70,2,Tackled,50,4623,Mike Vrabel,-1,-1,NA,-1,-1,NA,N,N st 02-03-02 19:38 et s0301NFLPP
r q  bc-nfl-u-newengland STLNWE00300704080233   02-03 0000

FIP,20020203,C,Play,1239,1239,STL,2,8,STL,30,70,0802,N
FIP,20020203,C,PassCompletion,13,5692,Kurt Warner,11
FIP,20020203,C,PassReception,88,5904,Torry Holt,STL,30,70,STL,41,59,11,Ran out of bounds,24,2057,Ty Law,-1,-1,NA,-1,-1,NA,N,N st 02-03-02 19:39 et s0301NFLPP
r q  bc-nfl-u-newengland STLNWE00300704PROG33   02-03 0000

FIP,20020203,C,Play,1260,1260,STL,1,10,STL,41,59,0733,N
FIP,20020203,C,PassCompletion,13,5692,Kurt Warner,9
FIP,20020203,C,PassReception,81,5700,Az-zahir Hakim,STL,41,59,NWE,50,50,9,Ran out of bounds,27,1899,Terrell Buckley,-1,-1,NA,-1,-1,NA,N,N st 02-03-02 19:40 et s0301NFLPP
r q  bc-nfl-u-newengland STLNWE00300704070133   02-03 0000

FIP,20020203,C,Play,1285,1285,STL,2,1,NWE,50,50,0701,N
FIP,20020203,C,Rush,Right End,28,1712,Marshall Faulk,NWE,50,50,NWE,50,50,0,Tackled,54,3547,Tedy Bruschi,-1,-1,NA,-1,-1,NA,N,N st 02-03-02 19:40 et

```
    s0301NFLPP
r q  bc-nfl-u-newengland STLNWE00300704062233    02-03 0000

FIP,20020203,C,Play,1310,1310,STL,3,1,NWE,50,50,0622,N
FIP,20020203,C,PassIncompletion,13,5692,Kurt     Warner,87,2775,Ricky
Proehl,36,3552,Lawyer Milloy st 02-03-02 19:41 et s0301NFLPP
r q  bc-nfl-u-newengland STLNWE00300704061533    02-03 0000

FIP,20020203,C,Play,1328,1328,STL,4,1,NWE,50,50,0615,N
FIP,20020203,C,Punt,4,7097,John Baker,45,1484,Jeff Robinson,NWE,15,15,-1,-1,NA,-
1,-1,NA,80,2474,Isaac Bruce,Fair catch st 02-03-02 19:41 et s0301NFLPP
r q  bc-nfl-u-newengland STLNWE00300704PROG33    02-03 0000

FIP,20020203,C,Play,1347,1347,NWE,1,10,NWE,15,85,0610,N
FIP,20020203,C,Rush,Left     End,32,4045,Antowain
Smith,NWE,15,85,NWE,26,74,11,Tackled,20,3994,Kim Herring,90,2463,Jeff Zgonina,-
1,-1,NA,N,N st 02-03-02 19:42 et s0301NFLPP
r q  bc-nfl-u-newengland STLNWE00300704052533    02-03 0000
```

FIP,20020203,C,Play,1368,1368,NWE,1,10,NWE,26,74,0525,N
FIP,20020203,C,PassCompletion,12,7042,Tom Brady,5
FIP,20020203,C,PassReception,44,4536,Marc Edwards,NWE,26,74,NWE,31,69,5,Tackled,52,7888,Tommy Polley,-1,-1,NA,-1,-1,NA,N,N st 02-03-02 19:43 et s0301NFLPP
r q  bc-nfl-u-newengland STLNWE00300704044633    02-03 0000

FIP,20020203,C,Play,1389,1389,NWE,2,5,NWE,31,69,0446,N
FIP,20020203,C,Rush,Right End,32,4045,Antowain Smith,NWE,31,69,NWE,35,65,4,Tackled,52,7888,Tommy Polley,-1,-1,NA,-1,-1,NA,N,N st 02-03-02 19:44 et s0301NFLPP
r q  bc-nfl-u-newengland STLNWE00300704041033    02-03 0000

FIP,20020203,C,Play,1414,1414,NWE,3,1,NWE,35,65,0410,N
FIP,20020203,C,Rush,Right Guard,44,4536,Marc Edwards,NWE,35,65,NWE,37,63,2,Tackled,98,4919,Grant Wistrom,-1,-1,NA,-1,-1,NA,N,N st 02-03-02 19:44 et s0301NFLPP
r q  bc-nfl-u-newengland STLNWE00300704032833    02-03 0000

FIP,20020203,C,Play,1435,1435,NWE,1,10,NWE,37,63,0328,N

FIP,20020203,C,Rush,Right    Guard,44,4536,Marc Edwards,NWE,37,63,NWE,40,60,3,Tackled,91,6730,Leonard    Little,-1,-1,NA,-1,-1,NA,N,N st 02-03-02 19:45 et s0301NFLPP
r q  bc-nfl-u-newengland STLNWE00300704025333    02-03 0000

FIP,20020203,C,Play,1456,1456,NWE,2,7,NWE,40,60,0253,N
FIP,20020203,C,Rush,Right    End,32,4045,Antowain    Smith,NWE,40,60,NWE,39,61,-1,Tackled,66,7499,Brian Young,-1,-1,NA,-1,-1,NA,N,N st 02-03-02 19:46 et s0301NFLPP
r q  bc-nfl-u-newengland STLNWE00300704021333    02-03 0000

FIP,20020203,C,Play,1477,1477,NWE,0,0,NA,-1,-1,0213,N
FIP,20020203,C,TimeOut,STL,0213 st 02-03-02 19:46 et s0301NFLPP
r q  bc-nfl-u-newengland STLNWE00300704PROG33    02-03 0000

FIP,20020203,C,Play,1494,1494,NWE,3,8,NWE,39,61,0213,N
FIP,20020203,C,Sack,12,7042,Tom Brady,NWE,39,61,NWE,32,68,-7,N,91,6730,Leonard Little,97,1957,Tyoka Jackson st 02-03-02 19:48 et

```
   s0301NFLPP
r q  bc-nfl-u-newengland STLNWE00300704020033    02-03 0000

FIP,20020203,C,Play,1513,1513,NWE,0,0,NA,-1,-1,0200,N
FIP,20020203,C,TimeOut,TV,0200 st 02-03-02 19:48 et s0301NFLPP
r q  bc-nfl-u-newengland STLNWE00300704PROG33    02-03 0000

FIP,20020203,C,Play,1534,1534,NWE,4,15,NWE,32,68,0200,N
FIP,20020203,C,Punt,13,4092,Ken Walter,66,7061,Lonie Paxton,STL,15,15,-1,-1,NA,-
1,-1,NA,32,4045,Antowain Smith,Fair catch st 02-03-02 19:51 et s0301NFLPP
r q  bc-nfl-u-newengland STLNWE00300704PROG33    02-03 0000

FIP,20020203,C,Play,1553,1553,NWE,0,0,NA,-1,-1,0152,N
FIP,20020203,C,TimeOut,NWE,0152 st 02-03-02 19:51 et s0301NFLPP
r q  bc-nfl-u-newengland STLNWE00300704PROG33    02-03 0000

FIP,20020203,C,Play,1570,1570,STL,1,10,STL,15,85,0152,N
```

FIP,20020203,C,Rush,Left  End,81,5700,Az-zahir Hakim,STL,15,85,STL,20,80,5,Tackled,23,7051,Antwan Harris,-1,-1,NA,-1,-1,NA,N,N st 02-03-02 19:53 et s0301NFLPP
r q  bc-nfl-u-newengland STLNWE00300704013333   02-03 0000

FIP,20020203,C,Play,1591,1591,STL,2,5,STL,20,80,0133,N
FIP,20020203,C,Penalty,Neutral  Zone  Infraction,NWE,50,4623,Mike Vrabel,Accepted,,,-1,-1,NA,,STL,20,20,STL,25,25,5,N,Y st 02-03-02 19:53 et s0301NFLPP
r q  bc-nfl-u-newengland STLNWE00300704PROG33   02-03 0000

FIP,20020203,C,Play,1614,1614,STL,1,10,STL,25,75,0133,N
FIP,20020203,C,PassCompletion,13,5692,Kurt Warner,15
FIP,20020203,C,PassReception,87,2775,Ricky Proehl,STL,25,75,STL,40,60,15,Fumble,23,7051,Antwan Harris,-1,-1,NA,-1,-1,NA,N,N
FIP,20020203,C,Fumble,87,2775,Ricky Proehl,STL,40,40,23,7051,Antwan Harris,NA,-1,-1,NWE,27,1899,Terrell Buckley,Other Team,N
FIP,20020203,C,OpponentFumbleRecovery,27,1899,Terrell Buckley,NWE,45,45,STL,40,40,15,Tackled,88,5904,Torry Holt,-1,-1,NA,-1,-1,NA,N,N st 02-03-02 19:54 et s0301NFLPP
r q  bc-nfl-u-newengland STLNWE00300704PROG33   02-03 0000

FIP,20020203,C,Play,1646,1646,NWE,1,10,STL,40,40,0120,N

```
FIP,20020203,C,PassCompletion,12,7042,Tom Brady,16
FIP,20020203,C,PassReception,80,2034,Troy
Brown,STL,40,40,STL,24,24,16,Tackled,98,4919,Grant Wistrom,20,3994,Kim Herring,-
1,-1,NA,N,N st 02-03-02 19:55 et s0301NFLPP
r q  bc-nfl-u-newengland STLNWE00300704011233    02-03 0000

FIP,20020203,C,Play,1667,1667,NWE,0,0,NA,-1,-1,0112,N
FIP,20020203,C,TimeOut,NWE,0112 st 02-03-02 19:55 et s0301NFLPP
r q  bc-nfl-u-newengland STLNWE00300704PROG33    02-03 0000

FIP,20020203,C,Play,1684,1684,NWE,0,0,NA,-1,-1,0112,N
FIP,20020203,C,TimeOut,STL,0112 st 02-03-02 19:56 et s0301NFLPP
r q  bc-nfl-u-newengland STLNWE00300704PROG33    02-03 0000

FIP,20020203,C,Play,1701,1701,NWE,1,10,STL,24,24,0112,N
FIP,20020203,C,PassCompletion,12,7042,Tom Brady,8
FIP,20020203,C,PassReception,85,7181,Jermaine
Wiggins,STL,24,24,STL,16,16,8,Tackled,91,6730,Leonard    Little,35,1055,Aeneas
Williams,-1,-1,NA,N,N
``` st 02-03-02 19:57 et s0301NFLPP
r q  bc-nfl-u-newengland STLNWE00300704004633   02-03 0000

FIP,20020203,C,Play,1722,1722,NWE,2,2,STL,16,16,0046,N
FIP,20020203,C,PassIncompletion,12,7042,Tom Brady,86,4483,David Patten,-1,-1,NA st 02-03-02 19:57 et s0301NFLPP
r q  bc-nfl-u-newengland STLNWE00300704PROG33   02-03 0000

FIP,20020203,C,Play,1740,1740,NWE,3,2,STL,16,16,0041,N
FIP,20020203,C,Rush,Left End,33,5919,Kevin Faulk,STL,16,16,STL,8,8,8,Pushed out
of bounds,32,5945,Dre Bly,-1,-1,NA,-1,-1,NA,N,N st 02-03-02 19:58 et s0301NFLPP
r q  bc-nfl-u-newengland STLNWE00300704003633   02-03 0000

FIP,20020203,C,Play,1769,1769,NWE,0,0,NA,-1,-1,0036,N
FIP,20020203,C,TimeOut,NWE,0036 st 02-03-02 19:59 et s0301NFLPP
r q  bc-nfl-u-newengland STLNWE00301304PROG33   02-03 0000

FIP,20020203,C,Play,1786,1786,NWE,1,8,STL,8,8,0036,N
FIP,20020203,C,PassCompletion,12,7042,Tom Brady,8
FIP,20020203,C,PassReception,86,4483,David Patten,STL,8,8,STL,0,0,8,Touchdown,-1,-1,NA,-1,-1,NA,-1,-1,NA,N,N st 02-03-02 20:00 et s0301NFLPP
r q  bc-nfl-u-newengland STLNWE00300704PROG33   02-03 0000

FIP,20020203,C,Play,1614,1614,STL,1,10,STL,25,75,0133,N
FIP,20020203,C,PassCompletion,13,5692,Kurt Warner,15
FIP,20020203,C,PassReception,87,2775,Ricky Proehl,STL,25,75,STL,40,60,15,Fumble,23,7051,Antwan Harris,-1,-1,NA,-1,-1,NA,N,N
FIP,20020203,C,Fumble,87,2775,Ricky Proehl,STL,40,40,23,7051,Antwan Harris,NA,-1,-1,NWE,27,1899,Terrell Buckley,Other Team,N
FIP,20020203,C,OpponentFumbleRecovery,27,1899,Terrell Buckley,NWE,45,45,STL,40,40,15,Tackled,-1,-1,NA,-1,-1,NA,-1,-1,NA,N,N st 02-03-02 20:01 et s0301NFLPP
r q  bc-nfl-u-newengland STLNWE00301304PROG33   02-03 0000

FIP,20020203,C,Play,1814,1814,NWE,0,0,STL,2,2,0031,N
FIP,20020203,C,ExtraPoint,4,3351,Adam Vinatieri,66,7061,Lonie Paxton,13,4092,Ken Walter,,-1,-1,NA st 02-03-02 20:02 et s0301NFLPP
r q  bc-nfl-u-newengland STLNWE00301404PROG33   02-03 0000

```
FIP,20020203,C,Play,1814,1814,NWE,0,0,STL,2,2,0031,N
FIP,20020203,C,ExtraPoint,4,3351,Adam Vinatieri,66,7061,Lonie Paxton,13,4092,Ken
Walter,Score (Good),-1,-1,NA st 02-03-02 20:03 et s0301NFLPP
r q  bc-nfl-u-newengland STLNWE00301404PROG33    02-03 0000

FIP,20020203,C,Play,1848,1848,NWE,0,0,NWE,30,70,0031,N
FIP,20020203,C,Kickoff,4,3351,Adam Vinatieri,N,-1,-1,NA,NWE,30,30,STL,5,95,-1,-
1,NA,-1,-1,NA,-1,-1,NA,
FIP,20020203,C,KickoffReturn,28,1712,Marshall Faulk,STL,5,95,STL,6,94,1,Ran out
of bounds,-1,-1,NA,-1,-1,NA,-1,-1,NA,N,N st 02-03-02 20:05 et s0301NFLPP
r q  bc-nfl-u-newengland STLNWE00301404PROG33    02-03 0000

FIP,20020203,C,Play,1879,1879,STL,1,10,STL,6,94,0031,N
FIP,20020203,C,Rush,Up the Middle,13,5692,Kurt Warner,STL,6,94,STL,5,95,-
1,Tackled,-1,-1,NA,-1,-1,NA,-1,-1,NA,N,N st 02-03-02 20:05 et s0301NFLPP
r q  bc-nfl-u-newengland STLNWE00301404150033    02-03 0000

FIP,20020203,C,Play,1900,1900,NWE,0,0,NA,-1,-1,1500,N
```

FIP,20020203,C,QtrSum,2,STL,3,649,1,2,1,4,3,1,0,0,NWE,14,811,3,2,1,6,4,2,0,0
FIP,20020203,C,CoinToss,NWE,Receive,STL,South st 02-03-02 20:06 et s0301NFLPP
r q  bc-nfl-u-newengland STLNWE00301406PROG33   02-03 0000

FIP,20020203,C,Play,1239,1239,STL,2,8,STL,30,70,0802,N
FIP,20020203,C,Rush,,13,5692,Kurt  Warner,STL,30,70,STL,28,72,-999,Fumble,-1,-1,NA,-1,-1,NA,-1,-1,NA,N,N
FIP,20020203,C,Fumble,13,5692,Kurt   Warner,STL,28,72,-1,-1,NA,NA,-1,-1,STL,13,5692,Kurt Warner,Same player,N
FIP,20020203,C,OwnFumbleRecovery,13,5692,Kurt Warner,STL,28,72,STL,28,72,0,,-1,-1,NA,-1,-1,NA,-1,-1,NA,N,N
FIP,20020203,C,Rush,,13,5692,Kurt Warner,STL,28,72,NA,-1,-1,-999,,-1,-1,NA,-1,-1,NA,-1,-1,NA,N,N
FIP,20020203,C,PassCompletion,13,5692,Kurt Warner,11
FIP,20020203,C,PassReception,88,5904,Torry Holt,STL,30,70,STL,41,59,11,Ran out of bounds,24,2057,Ty Law,-1,-1,NA,-1,-1,NA,N,N st 02-03-02 20:27 et s0301NFLPP
r q  bc-nfl-u-newengland STLNWE00301406PROG33   02-03 0000

FIP,20020203,C,Play,1239,1239,STL,2,8,STL,30,70,0802,N
FIP,20020203,C,AbortedSnap,0,3044,Team,STL,30,70
FIP,20020203,C,Fumble,0,3044,Team,STL,28,72,-1,-1,NA,NA,-1,-1,STL,13,5692,Kurt Warner,Same Team,Y
FIP,20020203,C,OwnFumbleRecovery,13,5692,Kurt Warner,STL,28,72,STL,28,72,0,,-1,-1,NA,-1,-1,NA,-1,-1,NA,N,N
FIP,20020203,C,PassCompletion,13,5692,Kurt Warner,11
FIP,20020203,C,PassReception,88,5904,Torry Holt,STL,30,70,STL,41,59,11,Ran out of bounds,24,2057,Ty Law,-1,-1,NA,-1,-1,NA,N,N st 02-03-02 20:32 et s0301NFLPP
r q  bc-nfl-u-newengland STLNWE00301406PROG33   02-03 0000

FIP,20020203,C,Play,1239,1239,STL,2,8,STL,30,70,0802,N
FIP,20020203,C,AbortedSnap,13,5692,Kurt Warner,STL,30,70
FIP,20020203,C,Fumble,13,5692,Kurt   Warner,STL,28,72,-1,-1,NA,NA,-1,-1,STL,13,5692,Kurt Warner,Same player,Y
FIP,20020203,C,OwnFumbleRecovery,13,5692,Kurt Warner,STL,28,72,STL,28,72,0,,-1,-1,NA,-1,-1,NA,-1,-1,NA,N,N
FIP,20020203,C,AbortedSnap,13,5692,Kurt Warner,STL,28,72
FIP,20020203,C,PassCompletion,13,5692,Kurt Warner,11
FIP,20020203,C,PassReception,88,5904,Torry Holt,STL,30,70,STL,41,59,11,Ran out of bounds,24,2057,Ty Law,-1,-1,NA,-1,-1,NA,N,N st 02-03-02 20:33 et s0301NFLPP
r q  bc-nfl-u-newengland STLNWE00301406PROG33   02-03 0000

FIP,20020203,C,Play,1916,1916,STL,0,0,STL,30,70,1500,N
FIP,20020203,C,Kickoff,14,3165,Jeff Wilkins,N,-1,-1,NA,STL,30,30,NWE,-3,103,-1,-1,NA,-1,-1,NA,-1,-1,NA,
FIP,20020203,C,KickoffReturn,35,7060,Patrick Pass,NWE,-3,103,NWE,32,68,35,Pushed out of bounds,25,5695,Robert Holcombe,-1,-1,NA,-1,-1,NA,N,N st 02-03-02 20:34 et s0301NFLPP
r q  bc-nfl-u-newengland STLNWE00301406144733   02-03 0000

```
FIP,20020203,C,Play,1956,1956,NWE,1,10,NWE,32,68,1447,N
FIP,20020203,C,Rush,Right    End,32,4045,Antowain
Smith,NWE,32,68,NWE,40,60,8,Tackled,90,2463,Jeff Zgonina,-1,-1,NA,-1,-1,NA,N,N st 02-03-02 20:35 et s0301NFLPP
r q  bc-nfl-u-newengland STLNWE00301406PROG33    02-03 0000

FIP,20020203,C,Play,1956,1956,NWE,1,10,NWE,32,68,1447,N
FIP,20020203,C,Rush,Right    End,32,4045,Antowain
Smith,NWE,32,68,NWE,41,59,9,Tackled,90,2463,Jeff Zgonina,-1,-1,NA,-1,-1,NA,N,N st 02-03-02 20:35 et s0301NFLPP
r q  bc-nfl-u-newengland STLNWE00301406140933    02-03 0000

FIP,20020203,C,Play,1977,1977,NWE,2,1,NWE,41,59,1409,N
FIP,20020203,C,Rush,Left    Guard,32,4045,Antowain
Smith,NWE,41,59,STL,47,47,12,Tackled,20,3994,Kim    Herring,35,1055,Aeneas
Williams,-1,-1,NA,N,N st 02-03-02 20:36 et s0301NFLPP
r q  bc-nfl-u-newengland STLNWE00301406132933    02-03 0000

FIP,20020203,C,Play,1998,1998,NWE,1,10,STL,47,47,1329,N
FIP,20020203,C,PassIncompletion,12,7042,Tom Brady,86,4483,David Patten,-1,-1,NA
``` st 02-03-02 20:36 et s0301NFLPP
r q  bc-nfl-u-newengland STLNWE00301406132233   02-03 0000

FIP,20020203,C,Play,2016,2016,NWE,2,10,STL,47,47,1322,N
FIP,20020203,C,Rush,Left    Guard,21,6845,Jr    Redmond,STL,47,47,NWE,49,51,-4,Tackled,98,4919,Grant Wistrom,-1,-1,NA,-1,-1,NA,N,N st 02-03-02 20:37 et s0301NFLPP
r q  bc-nfl-u-newengland STLNWE00301406124333   02-03 0000

FIP,20020203,C,Play,2037,2037,NWE,3,14,NWE,49,51,1243,N
FIP,20020203,C,PassCompletion,12,7042,Tom Brady,8
FIP,20020203,C,PassReception,80,2034,Troy Brown,NWE,49,51,STL,43,43,8,Tackled,52,7888,Tommy Polley,58,2241,Don Davis,-1,-1,NA,N,N st 02-03-02 20:38 et s0301NFLPP
r q  bc-nfl-u-newengland STLNWE00301406PROG33   02-03 0000

FIP,20020203,C,Play,2058,2058,NWE,4,6,STL,43,43,1206,N
FIP,20020203,C,Punt,13,4092,Ken Walter,66,7061,Lonie Paxton,STL,16,16,-1,-1,NA,-1,-1,NA,32,4045,Antowain Smith,Fair catch st 02-03-02 20:39 et s0301NFLPP
r q  bc-nfl-u-newengland STLNWE00301406PROG33    02-03 0000

FIP,20020203,C,Play,2081,2081,STL,1,10,STL,16,84,1158,N
FIP,20020203,C,PassCompletion,13,5692,Kurt Warner,18
FIP,20020203,C,PassReception,88,5904,Torry Holt,STL,16,84,STL,34,66,18,Tackled,34,4910,Tebucky Jones,-1,-1,NA,-1,-1,NA,N,N
FIP,20020203,C,Penalty,Offensive Holding,STL,84,3502,Ernie Conwell,Accepted,,,-1,-1,NA,,STL,16,84,STL,8,92,8,N,Y st 02-03-02 20:41 et s0301NFLPP
r q  bc-nfl-u-newengland STLNWE00301406113433    02-03 0000

FIP,20020203,C,Play,2113,2113,STL,1,18,STL,8,92,1134,N
FIP,20020203,C,PassCompletion,13,5692,Kurt Warner,20
FIP,20020203,C,PassReception,81,5700,Az-zahir Hakim,STL,8,92,STL,28,72,20,Tackled,34,4910,Tebucky Jones,-1,-1,NA,-1,-1,NA,N,N st 02-03-02 20:42 et s0301NFLPP
r q  bc-nfl-u-newengland STLNWE00301406PROG33    02-03 0000

FIP,20020203,C,Play,2134,2134,STL,1,10,STL,28,72,1055,N
FIP,20020203,C,PassCompletion,13,5692,Kurt Warner,22
FIP,20020203,C,PassReception,80,2474,Isaac Bruce,STL,28,72,NWE,50,50,22,Tackled,36,3552,Lawyer Milloy,-1,-1,NA,-1,-1,NA,N,N st 02-03-02 20:43 et s0301NFLPP
r q  bc-nfl-u-newengland STLNWE00301406101033   02-03 0000

FIP,20020203,C,Play,2159,2159,STL,1,10,NWE,50,50,1010,N
FIP,20020203,C,PassIncompletion,13,5692,Kurt Warner,88,5904,Torry Holt,-1,-1,NA
FIP,20020203,C,Penalty,Defensive    Pass    Interference,NWE,45,2239,Otis Smith,Accepted,,,-1,-1,NA,,NWE,50,50,NWE,41,59,9,N,Y st 02-03-02 20:44 et s0301NFLPP
r q  bc-nfl-u-newengland STLNWE00301406100633   02-03 0000

FIP,20020203,C,Play,2192,2192,STL,1,10,NWE,41,41,1006,N
FIP,20020203,C,Sack,13,5692,Kurt Warner,NWE,41,41,NWE,48,48,-7,N,93,8344,Richard Seymour,50,4623,Mike Vrabel st 02-03-02 20:44 et s0301NFLPP
r q  bc-nfl-u-newengland STLNWE00301406095233   02-03 0000

FIP,20020203,C,Play,2211,2211,NWE,0,0,NA,-1,-1,0952,N
FIP,20020203,C,TimeOut,STL,0952 st 02-03-02 20:44 et s0301NFLPP
r q  bc-nfl-u-newengland STLNWE00301406PROG33   02-03 0000

```
FIP,20020203,C,Play,2228,2228,STL,2,17,NWE,48,48,0952,N
FIP,20020203,C,PassIncompletion,13,5692,Kurt Warner,88,5904,Torry Holt,-1,-1,NA
``` st 02-03-02 20:47 et s0301NFLPP
r q   bc-nfl-u-newengland STLNWE00301406094633    02-03 0000

```
FIP,20020203,C,Play,2246,2246,STL,3,17,NWE,48,48,0946,N
FIP,20020203,C,PassIncompletion,13,5692,Kurt Warner,-1,-1,NA,95,2511,Roman Phifer
``` st 02-03-02 20:48 et s0301NFLPP
r q   bc-nfl-u-newengland STLNWE00301406PROG33    02-03 0000

```
FIP,20020203,C,Play,2264,2264,STL,4,17,NWE,48,48,0946,N
FIP,20020203,C,Penalty,Delay   of   Game,STL,-1,-1,NA,Accepted,,,-1,-1,NA,,NWE,48,48,STL,47,53,5,N,Y
``` st 02-03-02 20:49 et s0301NFLPP
r q   bc-nfl-u-newengland STLNWE00301406093933    02-03 0000

```
FIP,20020203,C,Play,2291,2291,STL,4,22,STL,47,53,0939,N
FIP,20020203,C,Punt,4,7097,John Baker,45,1484,Jeff Robinson,NWE,15,15,-1,-1,NA,-1,-1,NA,-1,-1,NA,
FIP,20020203,C,PuntReturn,80,2034,Troy Brown,NWE,15,85,NWE,19,81,4,Tackled,45,1484,Jeff Robinson,-1,-1,NA,-1,-1,NA,N,N
``` st 02-03-02 20:50 et s0301NFLPP
r q  bc-nfl-u-newengland STLNWE00301406PROG33    02-03 0000

FIP,20020203,C,Play,2319,2319,NWE,1,10,NWE,19,81,0931,N
FIP,20020203,C,Rush,Right     End,32,4045,Antowain Smith,NWE,19,81,NWE,36,64,17,Tackled,91,6730,Leonard Little,-1,-1,NA,-1,-1,NA,N,N st 02-03-02 20:52 et s0301NFLPP
r q  bc-nfl-u-newengland STLNWE00301406085033    02-03 0000

FIP,20020203,C,Play,2340,2340,NWE,1,10,NWE,36,64,0850,N
FIP,20020203,C,Rush,Right     End,86,4483,David Patten,NWE,36,64,STL,42,42,22,Tackled,52,7888,Tommy Polley,-1,-1,NA,-1,-1,NA,N,N st 02-03-02 20:53 et s0301NFLPP
r q  bc-nfl-u-newengland STLNWE00301406081133    02-03 0000

FIP,20020203,C,Play,2361,2361,NWE,1,10,STL,42,42,0811,N
FIP,20020203,C,Rush,Right     Guard,32,4045,Antowain Smith,STL,42,42,STL,37,37,5,Tackled,72,2565,Chidi Ahanotu,-1,-1,NA,-1,-1,NA,N,N st 02-03-02 20:53 et s0301NFLPP
r q  bc-nfl-u-newengland STLNWE00301406073533    02-03 0000

FIP,20020203,C,Play,2382,2382,NWE,2,5,STL,37,37,0735,N
FIP,20020203,C,Rush,Right Guard,32,4045,Antowain Smith,STL,37,37,STL,36,36,1,Tackled,90,2463,Jeff Zgonina,72,2565,Chidi Ahanotu,-1,-1,NA,N,N st 02-03-02 20:54 et s0301NFLPP
r q  bc-nfl-u-newengland STLNWE00301406065333    02-03 0000

FIP,20020203,C,Play,2403,2403,NWE,3,4,STL,36,36,0653,N
FIP,20020203,C,PassIncompletion,12,7042,Tom Brady,86,4483,David Patten,32,5945,Dre Bly st 02-03-02 20:55 et s0301NFLPP
r q  bc-nfl-u-newengland STLNWE00301406065033    02-03 0000

FIP,20020203,C,Play,2421,2421,NWE,4,4,STL,36,36,0650,N
FIP,20020203,C,Punt,13,4092,Ken Walter,66,7061,Lonie Paxton,STL,0,0,-1,-1,NA,-1,-1,NA,-1,-1,NA,Touchback st 02-03-02 20:55 et s0301NFLPP
r q  bc-nfl-u-newengland STLNWE00301406PROG33    02-03 0000

FIP,20020203,C,Play,2438,2438,STL,1,10,STL,20,80,0640,N

FIP,20020203,C,Rush,Right Guard,28,1712,Marshall Faulk,STL,20,80,STL,32,68,12,Tackled,98,3629,Anthony Pleasant,-1,-1,NA,-1,-1,NA,N,N st 02-03-02 20:58 et s0301NFLPP
r q  bc-nfl-u-newengland STLNWE00301406060333  02-03 0000

FIP,20020203,C,Play,2459,2459,NWE,0,0,NA,-1,-1,0603,N
FIP,20020203,C,TimeOut,STL,0603 st 02-03-02 20:58 et s0301NFLPP
r q  bc-nfl-u-newengland STLNWE00301406PROG33  02-03 0000

FIP,20020203,C,Play,2476,2476,STL,1,10,STL,32,68,0603,N
FIP,20020203,C,Rush,Left End,28,1712,Marshall Faulk,STL,32,68,STL,38,62,6,Tackled,36,3552,Lawyer Milloy,-1,-1,NA,-1,-1,NA,N,N st 02-03-02 21:01 et s0301NFLPP
r q  bc-nfl-u-newengland STLNWE00301406052733  02-03 0000

FIP,20020203,C,Play,2497,2497,NWE,0,0,NA,-1,-1,0527,N
FIP,20020203,C,TimeOut,NWE,0527 st 02-03-02 21:01 et s0301NFLPP
r q  bc-nfl-u-newengland STLNWE00301406PROG33    02-03 0000

FIP,20020203,C,Play,2514,2514,STL,2,4,STL,38,62,0527,N
FIP,20020203,C,Rush,Left End,28,1712,Marshall Faulk,STL,38,62,NWE,50,50,12,Ran out of bounds,34,4910,Tebucky Jones,-1,-1,NA,-1,-1,NA,N,N st 02-03-02 21:03 et s0301NFLPP
r q  bc-nfl-u-newengland STLNWE00301406045933    02-03 0000

FIP,20020203,C,Play,2535,2535,STL,1,10,NWE,50,50,0459,N
FIP,20020203,C,Rush,Right Guard,28,1712,Marshall Faulk,NWE,50,50,NWE,50,50,0,Tackled,98,3629,Anthony Pleasant,91,3677,Bobby Hamilton,-1,-1,NA,N,N st 02-03-02 21:03 et s0301NFLPP
r q  bc-nfl-u-newengland STLNWE00301406041933    02-03 0000

FIP,20020203,C,Play,2556,2556,STL,2,10,NWE,50,50,0419,N
FIP,20020203,C,PassCompletion,13,5692,Kurt Warner,5
FIP,20020203,C,PassReception,88,5904,Torry Holt,NWE,50,50,NWE,45,45,5,Tackled,45,2239,Otis Smith,-1,-1,NA,-1,-1,NA,N,N st 02-03-02 21:04 et s0301NFLPP
r q  bc-nfl-u-newengland STLNWE00301406PROG33    02-03 0000

FIP,20020203,C,Play,2577,2577,STL,3,5,NWE,45,45,0335,N
FIP,20020203,C,PassInterception,13,5692,Kurt Warner
FIP,20020203,C,PassInterceptionReturn,45,2239,Otis Smith,NWE,37,63,STL,33,33,30,Tackled,13,5692,Kurt Warner,-1,-1,NA,-1,-1,NA,N,N st 02-03-02 21:05 et s0301NFLPP
r q  bc-nfl-u-newengland STLNWE00301406PROG33    02-03 0000

FIP,20020203,C,Play,2605,2605,NWE,1,10,STL,33,33,0325,N
FIP,20020203,C,PassCompletion,12,7042,Tom Brady,11
FIP,20020203,C,PassReception,80,2034,Troy Brown,STL,33,33,STL,22,22,11,Tackled,31,7877,Adam Archuleta,-1,-1,NA,-1,-1,NA,N,N st 02-03-02 21:06 et s0301NFLPP
r q  bc-nfl-u-newengland STLNWE00301406024833    02-03 0000

FIP,20020203,C,Play,2626,2626,NWE,1,10,STL,22,22,0248,N
FIP,20020203,C,Sack,33,5919,Kevin Faulk,STL,22,22,STL,26,26,-4,N,98,4919,Grant Wistrom,-1,-1,NA st 02-03-02 21:06 et s0301NFLPP
r q  bc-nfl-u-newengland STLNWE00301406020533    02-03 0000

FIP,20020203,C,Play,2649,2649,NWE,2,14,STL,26,26,0205,N

FIP,20020203,C,PassIncompletion,12,7042,Tom Brady,85,7181,Jermaine Wiggins,-1,-1,NA st 02-03-02 21:07 et s0301NFLPP
r q  bc-nfl-u-newengland STLNWE00301406020033    02-03 0000

FIP,20020203,C,Play,2667,2667,NWE,3,14,STL,26,26,0200,N
FIP,20020203,C,Rush,Right End,33,5919,Kevin Faulk,STL,26,26,STL,19,19,7,Tackled,59,5718,London Fletcher,-1,-1,NA,-1,-1,NA,N,N st 02-03-02 21:08 et s0301NFLPP
r q  bc-nfl-u-newengland STLNWE00301706012233    02-03 0000

FIP,20020203,C,Play,2688,2688,NWE,4,7,STL,19,19,0122,N
FIP,20020203,C,FieldGoal,4,3351,Adam Vinatieri,66,7061,Lonie Paxton,13,4092,Ken Walter,STL,27,27,Made field goal,-1,-1,NA, st 02-03-02 21:08 et s0301NFLPP
r q  bc-nfl-u-newengland STLNWE00301706PROG33    02-03 0000

FIP,20020203,C,Play,2707,2707,NWE,0,0,NWE,30,70,0118,N
FIP,20020203,C,Kickoff,4,3351,Adam Vinatieri,N,-1,-1,NA,NWE,30,30,STL,1,99,-1,-1,NA,-1,-1,NA,-1,-1,NA,
FIP,20020203,C,KickoffReturn,83,4767,Yo Murphy,STL,1,99,STL,23,77,22,Tackled,30,3537,Je'rod Cherry,-1,-1,NA,-1,-1,NA,N,N st 02-03-02 21:10 et s0301NFLPP
r q  bc-nfl-u-newengland STLNWE00301706010533    02-03 0000

FIP,20020203,C,Play,2729,2729,STL,1,10,STL,23,77,0105,N
FIP,20020203,C,PassCompletion,13,5692,Kurt Warner,15
FIP,20020203,C,PassReception,80,2474,Isaac Bruce,STL,23,77,STL,38,62,15,Tackled,54,3547,Tedy Bruschi,-1,-1,NA,-1,-1,NA,N,N st 02-03-02 21:11 et s0301NFLPP
r q  bc-nfl-u-newengland STLNWE00301706003333    02-03 0000

FIP,20020203,C,Play,2750,2750,STL,1,10,STL,38,62,0033,N
FIP,20020203,C,PassCompletion,13,5692,Kurt Warner,7
FIP,20020203,C,PassReception,28,1712,Marshall Faulk,STL,38,62,STL,45,55,7,Tackled,45,2239,Otis Smith,96,4410,Brandon Mitchell,-1,-1,NA,N,N st 02-03-02 21:11 et s0301NFLPP
r q  bc-nfl-u-newengland STLNWE00301706150033    02-03 0000

FIP,20020203,C,Play,2775,2775,NWE,0,0,NA,-1,-1,1500,N
FIP,20020203,C,QtrSum,3,STL,3,700,2,3,1,6,2,0,0,0,NWE,17,800,3,1,0,4,3,0,0,0 st 02-03-02 21:12 et s0301NFLPP
r q  bc-nfl-u-newengland STLNWE00301708PROG33    02-03 0000

FIP,20020203,C,Play,2795,2795,STL,2,3,STL,45,55,1500,N
FIP,20020203,C,Rush,Right    Guard,28,1712,Marshall Faulk,STL,45,55,STL,47,53,2,Tackled,54,3547,Tedy Bruschi,-1,-1,NA,-1,-1,NA,N,N st 02-03-02 21:15 et s0301NFLPP
r q  bc-nfl-u-newengland STLNWE00301708142433    02-03 0000

FIP,20020203,C,Play,2816,2816,STL,3,1,STL,47,53,1424,N
FIP,20020203,C,Penalty,False    Start,STL,45,1484,Jeff    Robinson,Accepted,,,-1,-1,NA,,STL,47,53,STL,42,58,5,N,Y st 02-03-02 21:15 et s0301NFLPP
r q  bc-nfl-u-newengland STLNWE00301708PROG33    02-03 0000

FIP,20020203,C,Play,2816,2816,STL,3,1,STL,47,53,1424,N
FIP,20020203,C,Penalty,False    Start,STL,45,1484,Jeff    Robinson,Accepted,,,-1,-1,NA,,STL,47,53,STL,43,57,4,N,Y st 02-03-02 21:15 et s0301NFLPP
r q  bc-nfl-u-newengland STLNWE00301708140933    02-03 0000

FIP,20020203,C,Play,2844,2844,STL,3,5,STL,43,57,1409,N
FIP,20020203,C,PassCompletion,13,5692,Kurt Warner,14
FIP,20020203,C,PassReception,81,5700,Az-zahir Hakim,STL,43,57,NWE,43,43,14,Tackled,36,3552,Lawyer Milloy,27,1899,Terrell Buckley,-1,-1,NA,N,N st 02-03-02 21:16 et s0301NFLPP
r q  bc-nfl-u-newengland STLNWE00301708133633   02-03 0000

FIP,20020203,C,Play,2865,2865,STL,1,10,NWE,43,43,1336,N
FIP,20020203,C,PassCompletion,13,5692,Kurt Warner,9
FIP,20020203,C,PassReception,84,3502,Ernie Conwell,NWE,43,43,NWE,34,34,9,Tackled,95,2511,Roman Phifer,24,2057,Ty Law,-1,-1,NA,N,N st 02-03-02 21:17 et s0301NFLPP
r q  bc-nfl-u-newengland STLNWE00301708124633   02-03 0000

FIP,20020203,C,Play,2890,2890,STL,2,1,NWE,34,34,1246,N
FIP,20020203,C,Rush,Right Guard,42,6043,James Hodgins,NWE,34,34,NWE,31,31,3,Tackled,91,3677,Bobby Hamilton,55,2061,Willie Mcginest,-1,-1,NA,N,N st 02-03-02 21:17 et s0301NFLPP
r q  bc-nfl-u-newengland STLNWE00301708120533   02-03 0000

```
FIP,20020203,C,Play,2915,2915,STL,1,10,NWE,31,31,1205,N
FIP,20020203,C,PassCompletion,13,5692,Kurt Warner,22
FIP,20020203,C,PassReception,28,1712,Marshall
Faulk,NWE,31,31,NWE,9,9,22,Tackled,34,4910,Tebucky Jones,-1,-1,NA,-1,-1,NA,N,N
``` st 02-03-02 21:18 et s0301NFLPP
r q  bc-nfl-u-newengland STLNWE00301708112133    02-03 0000

```
FIP,20020203,C,Play,2936,2936,STL,1,9,NWE,9,9,1121,N
FIP,20020203,C,PassCompletion,13,5692,Kurt Warner,6
FIP,20020203,C,PassReception,45,1484,Jeff
Robinson,NWE,9,9,NWE,3,3,6,Tackled,36,3552,Lawyer Milloy,-1,-1,NA,-1,-1,NA,N,N
``` st 02-03-02 21:19 et s0301NFLPP
r q  bc-nfl-u-newengland STLNWE00301708103933    02-03 0000

```
FIP,20020203,C,Play,2961,2961,STL,2,3,NWE,3,3,1039,N
FIP,20020203,C,PassIncompletion,13,5692,Kurt    Warner,81,5700,Az-zahir
Hakim,36,3552,Lawyer Milloy
``` st 02-03-02 21:20 et s0301NFLPP
r q  bc-nfl-u-newengland STLNWE00301708103433    02-03 0000

```
FIP,20020203,C,Play,2983,2983,STL,3,3,NWE,3,3,1034,N
FIP,20020203,C,PassIncompletion,13,5692,Kurt    Warner,80,2474,Isaac
Bruce,24,2057,Ty Law
``` st 02-03-02 21:20 et s0301NFLPP
r q bc-nfl-u-newengland STLNWE00301708102933    02-03 0000

FIP,20020203,C,Play,3001,3001,NWE,0,0,NA,-1,-1,1029,N
FIP,20020203,C,TimeOut,STL,1029 st 02-03-02 21:20 et s0301NFLPP
r q bc-nfl-u-newengland STLNWE00301708PROG33    02-03 0000

FIP,20020203,C,Play,3018,3018,STL,4,3,NWE,3,3,1029,N
FIP,20020203,C,Rush,Right End,13,5692,Kurt Warner,NWE,3,3,NWE,2,2,0,Fumble,95,2511,Roman Phifer,-1,-1,NA,-1,-1,NA,N,N
FIP,20020203,C,Fumble,13,5692,Kurt Warner,NWE,2,98,95,2511,Roman Phifer,NWE,3,97,NWE,34,4910,Tebucky Jones,Other Team,N
FIP,20020203,C,OpponentFumbleRecovery,34,4910,Tebucky Jones,NWE,3,3,STL,0,0,97,Touchdown,-1,-1,NA,-1,-1,NA,-1,-1,NA,N,N
FIP,20020203,C,Penalty,Defensive Holding,NWE,55,2061,Willie Mcginest,Accepted,,,-1,-1,NA,,NWE,3,97,NWE,1,99,2,N,Y st 02-03-02 21:25 et s0301NFLPP
r q bc-nfl-u-newengland STLNWE00301708PROG33    02-03 0000

FIP,20020203,C,Play,3018,3018,STL,4,3,NWE,3,3,1029,N
FIP,20020203,C,Rush,Right End,13,5692,Kurt Warner,NWE,3,3,NWE,2,2,0,Fumble,95,2511,Roman Phifer,-1,-1,NA,-1,-1,NA,N,N FIP,20020203,C,Fumble,13,5692,Kurt Warner,NWE,2,98,95,2511,Roman Phifer,NWE,3,97,NWE,34,4910,Tebucky Jones,Other Team,N
FIP,20020203,C,OpponentFumbleRecovery,34,4910,Tebucky Jones,NWE,3,3,STL,0,0,97,Touchdown,-1,-1,NA,-1,-1,NA,-1,-1,NA,N,N
FIP,20020203,C,Penalty,Defensive Holding,NWE,55,2061,Willie Mcginest,Accepted,,,-1,-1,NA,,NWE,3,97,NWE,2,98,1,N,Y st 02-03-02 21:25 et s0301NFLPP
r q bc-nfl-u-newengland STLNWE00301708100933 02-03 0000

FIP,20020203,C,Play,3057,3057,STL,1,1,NWE,1,1,1009,N
FIP,20020203,C,Rush,Right Guard,28,1712,Marshall Faulk,NWE,1,1,NWE,2,2,-1,Tackled,55,2061,Willie Mcginest,51,1910,Bryan Cox,-1,-1,NA,N,N st 02-03-02 21:26 et s0301NFLPP
r q bc-nfl-u-newengland STLNWE00301708093333 02-03 0000

FIP,20020203,C,Play,3078,3078,NWE,0,0,NA,-1,-1,0933,N
FIP,20020203,C,TimeOut,NWE,0933 st 02-03-02 21:26 et s0301NFLPP
r q bc-nfl-u-newengland STLNWE00901708PROG33 02-03 0000

FIP,20020203,C,Play,3095,3095,STL,2,2,NWE,2,2,0933,N
FIP,20020203,C,Rush,Up the Middle,13,5692,Kurt Warner,NWE,2,2,NWE,0,0,2,Touchdown,-1,-1,NA,-1,-1,NA,-1,-1,NA,N,N st 02-03-02 21:29 et s0301NFLPP
r q  bc-nfl-u-newengland STLNWE01001708PROG33   02-03 0000

FIP,20020203,C,Play,3112,3112,STL,0,0,NWE,2,2,0931,N
FIP,20020203,C,ExtraPoint,14,3165,Jeff    Wilkins,45,1484,Jeff Robinson,87,2775,Ricky Proehl,Score (Good),-1,-1,NA st 02-03-02 21:30 et s0301NFLPP
r q  bc-nfl-u-newengland STLNWE01001708PROG33   02-03 0000

FIP,20020203,C,Play,3128,3128,STL,0,0,STL,30,70,0931,N
FIP,20020203,C,Kickoff,14,3165,Jeff Wilkins,N,-1,-1,NA,STL,30,30,NWE,-4,104,-1,-1,NA,-1,-1,NA,-1,-1,NA,
FIP,20020203,C,KickoffReturn,35,7060,Patrick    Pass,NWE,-4,104,NWE,25,75,29,Tackled,24,6848,Trung Canidate,-1,-1,NA,-1,-1,NA,N,N st 02-03-02 21:32 et s0301NFLPP
r q  bc-nfl-u-newengland STLNWE01001708092033   02-03 0000

FIP,20020203,C,Play,3150,3150,NWE,1,10,NWE,25,75,0920,N
FIP,20020203,C,PassCompletion,12,7042,Tom Brady,2
FIP,20020203,C,PassReception,44,4536,Marc Edwards,NWE,25,75,NWE,27,73,2,Tackled,31,7877,Adam    Archuleta,-1,-1,NA,-1,-1,NA,N,N st 02-03-02 21:34 et s0301NFLPP
r q  bc-nfl-u-newengland STLNWE01001708084433    02-03 0000

FIP,20020203,C,Play,3171,3171,NWE,2,8,NWE,27,73,0844,N
FIP,20020203,C,Rush,Right End,32,4045,Antowain Smith,NWE,27,73,NWE,33,67,6,Tackled,35,1055,Aeneas  Williams,59,5718,London Fletcher,-1,-1,NA,N,N st 02-03-02 21:34 et s0301NFLPP
r q  bc-nfl-u-newengland STLNWE01001708075933    02-03 0000

FIP,20020203,C,Play,3196,3196,NWE,3,2,NWE,33,67,0759,N
FIP,20020203,C,PassIncompletion,12,7042,Tom Brady,35,7060,Patrick Pass,-1,-1,NA st 02-03-02 21:35 et s0301NFLPP
r q  bc-nfl-u-newengland STLNWE01001708075533    02-03 0000

FIP,20020203,C,Play,3214,3214,NWE,4,2,NWE,33,67,0755,N
FIP,20020203,C,Punt,13,4092,Ken Walter,66,7061,Lonie Paxton,STL,14,14,-1,-1,NA,-1,-1,NA,-1,-1,NA,
FIP,20020203,C,PuntReturn,32,5945,Dre Bly,STL,14,86,STL,25,75,0,Tackled,34,4910,Tebucky Jones,-1,-1,NA,-1,-1,NA,N,N
FIP,20020203,C,Penalty,Offensive Holding,STL,57,3419,O.j. Brigance,Accepted,,,-1,-1,NA,,STL,14,86,STL,7,93,7,N,N st 02-03-02 21:36 et s0301NFLPP
r q  bc-nfl-u-newengland STLNWE01001708PROG33   02-03 0000

FIP,20020203,C,Play,3250,3250,STL,1,10,STL,7,93,0744,N
FIP,20020203,C,PassIncompletion,13,5692,Kurt   Warner,88,5904,Torry Holt,45,2239,Otis Smith st 02-03-02 21:39 et s0301NFLPP
r q  bc-nfl-u-newengland STLNWE01001708074033   02-03 0000

FIP,20020203,C,Play,3268,3268,STL,2,10,STL,7,93,0740,N
FIP,20020203,C,PassCompletion,13,5692,Kurt Warner,7
FIP,20020203,C,PassReception,88,5904,Torry Holt,STL,7,93,STL,14,86,7,Pushed out of bounds,95,2511,Roman Phifer,-1,-1,NA,-1,-1,NA,N,N st 02-03-02 21:39 et s0301NFLPP
r q  bc-nfl-u-newengland STLNWE01001708070833   02-03 0000

FIP,20020203,C,Play,3289,3289,STL,3,3,STL,14,86,0708,N
FIP,20020203,C,PassCompletion,13,5692,Kurt Warner,5
FIP,20020203,C,PassReception,80,2474,Isaac Bruce,STL,14,86,STL,19,81,5,Tackled,24,2057,Ty Law,-1,-1,NA,-1,-1,NA,N,N st 02-03-02 21:40 et s0301NFLPP
r q  bc-nfl-u-newengland STLNWE01001708PROG33    02-03 0000

FIP,20020203,C,Play,3314,3314,STL,1,10,STL,19,81,0628,N
FIP,20020203,C,PassIncompletion,13,5692,Kurt Warner,88,5904,Torry Holt,-1,-1,NA st 02-03-02 21:41 et s0301NFLPP
r q  bc-nfl-u-newengland STLNWE01001708061733    02-03 0000

FIP,20020203,C,Play,3336,3336,STL,2,10,STL,19,81,0617,N
FIP,20020203,C,PassCompletion,13,5692,Kurt Warner,30
FIP,20020203,C,PassReception,87,2775,Ricky Proehl,STL,19,81,STL,49,51,30,Pushed
out of bounds,24,2057,Ty Law,-1,-1,NA,-1,-1,NA,N,N st 02-03-02 21:42 et s0301NFLPP
r q  bc-nfl-u-newengland STLNWE01001708PROG33    02-03 0000

FIP,20020203,C,Play,3357,3357,STL,1,10,STL,49,51,0545,N
FIP,20020203,C,PassCompletion,13,5692,Kurt Warner,12
FIP,20020203,C,PassReception,45,1484,Jeff Robinson,STL,49,51,NWE,39,39,12,Pushed
out of bounds,50,4623,Mike Vrabel,-1,-1,NA,-1,-1,NA,N,N st 02-03-02 21:43 et s0301NFLPP
r q  bc-nfl-u-newengland STLNWE01001708051333    02-03 0000

FIP,20020203,C,Play,3382,3382,STL,1,10,NWE,39,39,0513,N
FIP,20020203,C,Rush,Right Guard,28,1712,Marshall Faulk,NWE,39,39,NWE,38,38,1,Tackled,95,2511,Roman Phifer,50,4623,Mike Vrabel,-1,-1,NA,N,N st 02-03-02 21:43 et s0301NFLPP
r q  bc-nfl-u-newengland STLNWE01001708043233   02-03 0000

FIP,20020203,C,Play,3407,3407,STL,2,9,NWE,38,38,0432,N
FIP,20020203,C,Sack,13,5692,Kurt Warner,NWE,38,38,STL,46,54,-16,N,55,2061,Willie Mcginest,-1,-1,NA st 02-03-02 21:44 et s0301NFLPP
r q  bc-nfl-u-newengland STLNWE01001708040133   02-03 0000

FIP,20020203,C,Play,3426,3426,NWE,0,0,NA,-1,-1,0401,N
FIP,20020203,C,TimeOut,NWE,0401 st 02-03-02 21:45 ct s0301NFLPP
r q  bc-nfl-u-newengland STLNWE01001708PROG33   02-03 0000

FIP,20020203,C,Play,3443,3443,STL,3,25,STL,46,54,0401,N
FIP,20020203,C,Penalty,Neutral Zone Infraction,NWE,93,8344,Richard Seymour,Accepted,,,-1,-1,NA,,STL,46,46,NWE,49,51,5,N,Y st 02-03-02 21:46 et s0301NFLPP
r q  bc-nfl-u-newengland STLNWE01001708PROG33    02-03 0000

FIP,20020203,C,Play,3466,3466,STL,3,20,NWE,49,49,0401,N
FIP,20020203,C,PassIncompletion,13,5692,Kurt  Warner,88,5904,Torry Holt,45,2239,Otis Smith st 02-03-02 21:47 et s0301NFLPP
r q  bc-nfl-u-newengland STLNWE01001708PROG33    02-03 0000

FIP,20020203,C,Play,3484,3484,STL,4,20,NWE,49,49,0401,N
FIP,20020203,C,Punt,4,7097,John Baker,45,1484,Jeff Robinson,NWE,0,0,-1,-1,NA,-1,-1,NA,-1,-1,NA,Touchback st 02-03-02 21:47 et s0301NFLPP
r q  bc-nfl-u-newengland STLNWE01001708PROG33    02-03 0000

FIP,20020203,C,Play,3501,3501,NWE,1,10,NWE,20,80,0344,N
FIP,20020203,C,Rush,Right  Guard,32,4045,Antowain  Smith,NWE,20,80,NWE,18,82,-2,Tackled,31,7877,Adam Archuleta,-1,-1,NA,-1,-1,NA,N,N st 02-03-02 21:48 et s0301NFLPP
r q  bc-nfl-u-newengland STLNWE01001708030233    02-03 0000

```
FIP,20020203,C,Play,3522,3522,NWE,2,12,NWE,18,82,0302,N
FIP,20020203,C,PassCompletion,12,7042,Tom Brady,4
FIP,20020203,C,PassReception,32,4045,Antowain Smith,NWE,18,82,NWE,22,78,4,Tackled,59,5718,London Fletcher,66,7499,Brian Young,-1,-1,NA,N,N
```

```
st 02-03-02 21:49 et s0301NFLPP
r q  bc-nfl-u-newengland STLNWE01001708021533    02-03 0000
```

```
FIP,20020203,C,Play,3543,3543,NWE,3,8,NWE,22,78,0215,N
FIP,20020203,C,Rush,Right End,32,4045,Antowain Smith,NWE,22,78,NWE,25,75,3,Tackled,98,4919,Grant Wistrom,-1,-1,NA,-1,-1,NA,N,N
```

```
st 02-03-02 21:50 et s0301NFLPP
r q  bc-nfl-u-newengland STLNWE01001708020033    02-03 0000
```

```
FIP,20020203,C,Play,3568,3568,NWE,0,0,NA,-1,-1,0200,N
FIP,20020203,C,TimeOut,TV,0200
```

```
st 02-03-02 21:50 et s0301NFLPP
r q  bc-nfl-u-newengland STLNWE01001708PROG33    02-03 0000
```

```
FIP,20020203,C,Play,3585,3585,NWE,4,5,NWE,25,75,0200,N
```

FIP,20020203,C,Punt,13,4092,Ken Walter,66,7061,Lonie Paxton,STL,45,45,-1,-1,NA,-1,-1,NA,-1,-1,NA,Ball out of bounds
FIP,20020203,C,Penalty,Defensive Holding,NWE,34,4910,Tebucky Jones,Declined,,,-1,-1,NA,,NA,-1,-1,NA,-1,-1,0,N,N st 02-03-02 21:53 et s0301NFLPP
r q  bc-nfl-u-newengland STLNWE01001708PROG33   02-03 0000

FIP,20020203,C,Play,3618,3618,STL,1,10,STL,45,55,0151,N
FIP,20020203,C,PassCompletion,13,5692,Kurt Warner,18
FIP,20020203,C,PassReception,81,5700,Az-zahir Hakim,STL,45,55,NWE,37,37,18,Pushed out of bounds,36,3552,Lawyer Milloy,-1,-1,NA,-1,-1,NA,N,N st 02-03-02 21:54 et s0301NFLPP
r q  bc-nfl-u-newengland STLNWE01001708014233   02-03 0000

FIP,20020203,C,Play,3639,3639,STL,1,10,NWE,37,37,0142,N
FIP,20020203,C,PassCompletion,13,5692,Kurt Warner,11
FIP,20020203,C,PassReception,83,4767,Yo Murphy,NWE,37,37,NWE,26,26,11,Ran out of bounds,24,2057,Ty Law,-1,-1,NA,-1,-1,NA,N,N st 02-03-02 21:55 et s0301NFLPP
r q  bc-nfl-u-newengland STLNWE01601708013733   02-03 0000

FIP,20020203,C,Play,3664,3664,STL,1,10,NWE,26,26,0137,N
FIP,20020203,C,PassCompletion,13,5692,Kurt Warner,26

FIP,20020203,C,PassReception,87,2775,Ricky Proehl,NWE,26,26,NWE,0,0,26,Touchdown,-1,-1,NA,-1,-1,NA,-1,-1,NA,N,N st 02-03-02 21:55 et s0301NFLPP
r q  bc-nfl-u-newengland STLNWE01701708PROG33   02-03 0000

FIP,20020203,C,Play,3685,3685,STL,0,0,NWE,2,2,0130,N
FIP,20020203,C,ExtraPoint,14,3165,Jeff Wilkins,45,1484,Jeff Robinson,87,2775,Ricky Proehl,Score (Good),-1,-1,NA st 02-03-02 21:56 et s0301NFLPP
r q  bc-nfl-u-newengland STLNWE01701708PROG33   02-03 0000

FIP,20020203,C,Play,3705,3705,STL,0,0,STL,30,70,0130,N
FIP,20020203,C,Kickoff,14,3165,Jeff Wilkins,N,-1,-1,NA,STL,30,30,NWE,2,98,-1,-1,NA,-1,-1,NA,-1,-1,NA,
FIP,20020203,C,KickoffReturn,80,2034,Troy Brown,NWE,2,98,NWE,17,83,15,Tackled,77,3371,Sean Moran,-1,-1,NA,-1,-1,NA,N,N st 02-03-02 21:58 et s0301NFLPP
r q  bc-nfl-u-newengland STLNWE01701708012133   02-03 0000

FIP,20020203,C,Play,3727,3727,NWE,1,10,NWE,17,83,0121,N
FIP,20020203,C,PassCompletion,12,7042,Tom Brady,5

FIP,20020203,C,PassReception,21,6845,Jr Redmond,NWE,17,83,NWE,22,78,5,Tackled,32,5945,Dre Bly,59,5718,London Fletcher,-1,-1,NA,N,N st 02-03-02 21:58 et s0301NFLPP
r q  bc-nfl-u-newengland STLNWE01701708PROG33    02-03 0000

FIP,20020203,C,Play,3748,3748,NWE,2,5,NWE,22,78,0057,N
FIP,20020203,C,PassCompletion,12,7042,Tom Brady,8
FIP,20020203,C,PassReception,21,6845,Jr Redmond,NWE,22,78,NWE,30,70,8,Tackled,35,1055,Aeneas Williams,52,7888,Tommy Polley,-1,-1,NA,N,N st 02-03-02 21:59 et s0301NFLPP
r q  bc-nfl-u-newengland STLNWE01701708004133    02-03 0000

FIP,20020203,C,Play,3773,3773,NWE,1,10,NWE,30,70,0041,N
FIP,20020203,C,PassIncompletion,12,7042,Tom Brady,-1,-1,NA,-1,-1,NA st 02-03-02 21:59 et s0301NFLPP
r q  bc-nfl-u-newengland STLNWE01701708PROG33    02-03 0000

FIP,20020203,C,Play,3791,3791,NWE,2,10,NWE,30,70,0041,N
FIP,20020203,C,PassCompletion,12,7042,Tom Brady,11
FIP,20020203,C,PassReception,21,6845,Jr Redmond,NWE,30,70,NWE,41,59,11,Pushed out of bounds,52,7888,Tommy Polley,20,3994,Kim Herring,-1,-1,NA,N,N st 02-03-02 22:00 et s0301NFLPP
r q  bc-nfl-u-newengland STLNWE01701708PROG33    02-03 0000

FIP,20020203,C,Play,3816,3816,NWE,1,10,NWE,41,59,0033,N
FIP,20020203,C,PassIncompletion,12,7042,Tom Brady,-1,-1,NA,-1,-1,NA st 02-03-02 22:00 et s0301NFLPP
r q  bc-nfl-u-newengland STLNWE01701708002933    02-03 0000

FIP,20020203,C,Play,3838,3838,NWE,2,10,NWE,41,59,0029,N
FIP,20020203,C,PassCompletion,12,7042,Tom Brady,-5
FIP,20020203,C,PassReception,80,2034,Troy Brown,NWE,41,59,NWE,36,64,-5,Ran out
of bounds,31,7877,Adam Archuleta,-1,-1,NA,-1,-1,NA,N,N st 02-03-02 22:02 et s0301NFLPP
r q  bc-nfl-u-newengland STLNWE01701708PROG33    02-03 0000

FIP,20020203,C,Play,3838,3838,NWE,2,10,NWE,41,59,0029,N
FIP,20020203,C,PassCompletion,12,7042,Tom Brady,23
FIP,20020203,C,PassReception,80,2034,Troy Brown,NWE,41,59,STL,36,36,23,Ran out
of bounds,31,7877,Adam Archuleta,-1,-1,NA,-1,-1,NA,N,N st 02-03-02 22:02 et s0301NFLPP
r q  bc-nfl-u-newengland STLNWE01701708PROG33   02-03 0000

FIP,20020203,C,Play,3859,3859,NWE,3,15,NWE,36,64,0021,N
FIP,20020203,C,PassCompletion,12,7042,Tom Brady,-6
FIP,20020203,C,PassReception,85,7181,Jermaine    Wiggins,NWE,36,64,NWE,30,70,-
6,Tackled,21,4513,Dexter Mccleon,91,6730,Leonard Little,-1,-1,NA,N,N st 02-03-02 22:02 et s0301NFLPP
r q  bc-nfl-u-newengland STLNWE01701708000733   02-03 0000

FIP,20020203,C,Play,3884,3884,NWE,4,21,NWE,30,70,0007,N
FIP,20020203,C,PassIncompletion,12,7042,Tom Brady,-1,-1,NA,-1,-1,NA st 02-03-02 22:02 et s0301NFLPP
r q  bc-nfl-u-newengland STLNWE01701708PROG33   02-03 0000

FIP,20020203,C,Play,3859,3859,NWE,3,15,STL,36,36,0021,N
FIP,20020203,C,PassCompletion,12,7042,Tom Brady,-34
FIP,20020203,C,PassReception,85,7181,Jermaine    Wiggins,STL,36,36,NWE,30,70,-
34,Tackled,21,4513,Dexter Mccleon,91,6730,Leonard Little,-1,-1,NA,N,N st 02-03-02 22:02 et s0301NFLPP
r q  bc-nfl-u-newengland STLNWE01701708PROG33   02-03 0000

FIP,20020203,C,Play,3859,3859,NWE,3,15,STL,36,36,0021,N
FIP,20020203,C,PassCompletion,12,7042,Tom Brady,6
FIP,20020203,C,PassReception,85,7181,Jermaine Wiggins,STL,36,36,STL,30,30,6,Tackled,21,4513,Dexter Mccleon,91,6730,Leonard Little,-1,-1,NA,N,N st 02-03-02 22:02 et s0301NFLPP
r q  bc-nfl-u-newengland STLNWE01702008PROG33    02-03 0000

FIP,20020203,C,Play,3902,3902,NWE,3,4,STL,30,30,0007,N
FIP,20020203,C,FieldGoal,4,3351,Adam Vinatieri,66,7061,Lonie Paxton,13,4092,Ken Walter,STL,38,38,Made field goal,-1,-1,NA, st 02-03-02 22:03 et s0301NFLPP
r q  bc-nfl-u-newengland STLNWE01702008PROG33    02-03 0000

FIP,20020203,C,Play,3925,3925,NWE,0,0,NA,-1,-1,0000,N
FIP,20020203,C,QtrSum,4,STL,17,950,2,8,1,11,4,2,0,0,NWE,20,510,0,3,0,3,2,0,0,0 st 02-03-02 22:04 et

The invention claimed is:

1. A method of analyzing video comprising:
   (a) identifying a plurality of events of said video, wherein at least one of said events contains a sports activity;
   (b) identifying a region of at least one frame of said video containing scoring related information;
   (c) identifying at least one value of said scoring related information based upon character recognition; and
   (d) synchronizing said at least one value with at least one of said events in a manner free from manual association of said at least one value with at least one of said events.

2. The method of claim 1 further comprising:
   (a) identifying a region of at least another one frame of said video containing additional scoring related information;
   (b) identifying at least one value of said additional scoring related information based upon character recognition;
   (c) associating said at least one value of said additional scoring related information with at least another one of said events; and
   (d) modifying at least a portion of said scoring related information based upon said scoring related information.

3. The method of claim 2 further comprising:
   (a) identifying a region of at least another one frame of said video containing additional scoring related information;
   (b) identifying at least one value of said additional scoring related information based upon character recognition; and
   (c) associating said at least one value of said additional scoring related information with said at least one of said events.

4. The method of claim 2 further comprising low pass filtering said scoring related information and said additional scoring related information.

5. The method of claim 2 further comprising analyzing said scoring related information and said additional scoring related information to determine appropriate scoring related information.

6. The method of claim 2 further comprising modifying at least one of said scoring related information and said additional scoring related information based upon the type of content of said video.

* * * * *